(12) United States Patent
Hu et al.

(10) Patent No.: US 12,095,038 B2
(45) Date of Patent: Sep. 17, 2024

(54) SECONDARY BATTERY

(71) Applicant: MURATA MANUFACTURING CO., LTD., Kyoto (JP)

(72) Inventors: Qiaoshu Hu, Kyoto (JP); Takumi Hiasa, Kyoto (JP); Kazumasa Takeshi, Kyoto (JP); Graham Sandford, Durham (GB); Joshua Walton, Durham (GB); Nadejda Krasteva, Stuttgart (DE); Silvia Rosselli, Stuttgart (DE); Gabriele Nelles, Stuttgart (DE); David Danner, Stuttgart (DE); Vitor Deichmann, Stuttgart (DE); Dennis Chercka, Stuttgart (DE); William Ford, Stuttgart (DE); Clemens Wall, Stuttgart (DE)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 17/825,588

(22) Filed: May 26, 2022

(65) Prior Publication Data

US 2022/0302500 A1    Sep. 22, 2022

Related U.S. Application Data

(60) Division of application No. 16/588,050, filed on Sep. 30, 2019, now abandoned, which is a continuation of
(Continued)

(30) Foreign Application Priority Data

Mar. 31, 2017  (EP) .................................... 17164208
Aug. 29, 2017  (JP) ............................... 2017-164109

(51) Int. Cl.
    *H01M 10/0525*   (2010.01)
    *H01M 4/36*      (2006.01)
    (Continued)

(52) U.S. Cl.
    CPC ... *H01M 10/0567* (2013.01); *H01M 10/0525* (2013.01); *H01G 11/64* (2013.01);
    (Continued)

(58) Field of Classification Search
    None
    See application file for complete search history.

(56) References Cited

U.S. PATENT DOCUMENTS 6,045,950 A    4/2000  Chang
6,174,628 B1   1/2001  Umemoto et al.
(Continued)

FOREIGN PATENT DOCUMENTS

CN    102017240       4/2011
EP    0948073 A1     10/1999
(Continued)

OTHER PUBLICATIONS

Chinese Office Action issued Jun. 23, 2022 in corresponding Chinese Application No. 201880023206.2.
(Continued)

*Primary Examiner* — Carlos Barcena
(74) *Attorney, Agent, or Firm* — K&L Gates LLP

(57) ABSTRACT

A secondary battery is provided. The secondary battery includes a cathode; an anode; and an electrolytic solution including a cyano compound.

8 Claims, 12 Drawing Sheets

Related U.S. Application Data application No. PCT/JP2018/013531, filed on Mar. 30, 2018.

(51) Int. Cl.
  *H01M 4/38* (2006.01)
  *H01M 4/525* (2010.01)
  *H01M 4/587* (2010.01)
  *H01M 10/0567* (2010.01)
  *H01G 11/64* (2013.01)

(52) U.S. Cl.
  CPC .......... *H01M 4/364* (2013.01); *H01M 4/386* (2013.01); *H01M 4/525* (2013.01); *H01M 4/587* (2013.01); *H01M 2300/0037* (2013.01)

(56) References Cited

U.S. PATENT DOCUMENTS

| | | |
|---|---|---|
| 2012/0171581 A1 | 7/2012 | Abe et al. |
| 2013/0330582 A1 | 12/2013 | Ihara et al. |
| 2018/0191031 A1* | 7/2018 | Yu .................... H01M 10/0567 |
| 2018/0273458 A1 | 9/2018 | Strautmann et al. |

FOREIGN PATENT DOCUMENTS

| | | |
|---|---|---|
| EP | 2037468 A1 | 3/2009 |
| JP | H08148159 A | 6/1996 |
| JP | 2005317403 A | 11/2005 |
| JP | 2013-257958 | 12/2013 |
| JP | 2018-528930 | 10/2018 |
| KR | 20140065108 A | 5/2014 |
| WO | 200001027 A1 | 1/2000 |
| WO | 200211229 A1 | 2/2002 |
| WO | 2009/136589 | 11/2009 |
| WO | 2011034067 A1 | 2/2013 |
| WO | 2016052542 A1 | 7/2017 |

OTHER PUBLICATIONS

International Search Report for Application No. PCT/JP2018/013531, dated Aug. 6, 2018.
Chinese Office Action issued Dec. 24, 2021 in corresponding Chinese Application No. 201880023206.2.
Japanese Office Action issued Dec. 22, 2020 in corresponding Japanese Application No. 2019-553591.

* cited by examiner

SECONDARY BATTERY

CROSS REFERENCE TO RELATED APPLICATIONS

This present application is a divisional application of U.S. patent application Ser. No. 16/588,050, filed on Sep. 30, 2019, which application is a continuation of PCT Application No. PCT/JP2018/013531, filed on Mar. 30, 2018, which claims priority to Japanese Patent Application No. JP 2017-164109 filed on Aug. 29, 2017 and European Patent Application No. EP17164208.5 filed on Mar. 31, 2017, the entire contents of which are being incorporated herein by reference.

BACKGROUND

The field of the DISCLOSURE lies in materials for secondary batteries.

The present application relates to non-aqueous electrolytes for secondary batteries and their uses in electrochemical devices or electric devices.

The disclosure relates to a secondary battery that includes the non-aqueous electrolyte.

Moreover, the disclosure relates to an electric device that includes the secondary battery.

The disclosure relates to an electrolytic solution used for a secondary battery and a secondary battery that uses the electrolytic solution, and to a battery pack, an electric vehicle, an electric power storage system, an electric power tool, and an electronic apparatus each of which uses the secondary battery.

Various electronic apparatuses such as mobile phones have been widely used, and it has been demanded to further reduce size and weight of the electronic apparatuses and to achieve their longer lives. Accordingly, small and lightweight secondary batteries capable of providing high energy density have been developed as electric power sources for the electronic apparatuses.

Applications of the secondary batteries are not limited to the electronic apparatuses described above, and it has been also considered to apply the secondary batteries to various other applications. Examples of such other applications may include: a battery pack attachably and detachably mounted on, for example, an electronic apparatus; an electric vehicle such as an electric automobile; an electric power storage system such as a home electric power server; and an electric power tool such as an electric drill.

The secondary battery includes a cathode, an anode, and electrolytic solution. The configuration of the electrolytic solution exerts a large influence on battery characteristics. Accordingly, various studies have been conducted on the configuration of the electrolytic solution.

More specifically, in order to improve electrochemical characteristics in a wide temperature range, the electrolytic solution includes carboxylate ester.

SUMMARY

In association with higher performance and more multi-functionality of electronic apparatuses and other apparatuses including the secondary batteries, the electronic apparatuses and the other apparatuses are more frequently used, and usage environment thereof expands. For this reason, there is still room for improvement in battery characteristics of the secondary batteries.

It is therefore desirable to provide a secondary battery-use electrolytic solution, a secondary battery, a battery pack, an electric vehicle, an electric power storage system, an electric power tool, and an electronic apparatus each of which makes it possible to achieve superior battery characteristics.

According to an embodiment of the present disclosure, a non-aqueous electrolyte for secondary batteries is provided. The non-aqueous electrolyte includes:
  a polar aprotic solvent;
  an alkali metal salt; and
  at least one additive in which the at least one additive is at least one compound selected from compounds represented by chemical formula I:

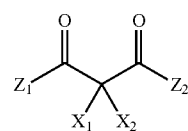

I in which $Z_1$, $Z_2$ represent one of alkyl ($-C_nH_{2n+1}$), cycloalkyl, alkenyl ($C_nH_{2n}$), aryl ($-Ar$), heteroaryl; halogenated alkyl (($-C_nX_{2n+1}$) or ($-CH_2-C_nX_{2n+1}$)), halogenated cycloalkyl (($-C_nX_{2n}$) or ($-CH_2-C_nX_{2n}$)), halogenated alkenyl ($C_nX_n$), halogenated aryl ($-Ar-X$), halogenated heteroaryl with halogen X being F, Cl, Br or I; alkoxy, aryloxy, heteroaryloxy, halogenated aryloxy; —CN-substituted-alkyl, -cycloalkyl, -aryl, -heteroaryl; —$NO_2$-substituted-alkyl, -cycloalkyl, -aryl, -heteroaryl; halogen; and nitrile (—CN);

in which $X_1$, $X_2$ represent one of hydrogen; halogen X; halogenated alkyl, alkenyl, aryl, heteroaryl; —CN-substituted-alkyl, -alkenyl, -aryl, -heteroaryl; —$NO_2$-substituted-alkyl, -alkenyl, -aryl and -heteroaryl.

According to an embodiment of the present disclosure, a non-aqueous electrolyte for secondary batteries is presented. The non-aqueous electrolyte includes:
  a polar aprotic solvent;
  an alkali metal salt; and
  at least one additive in which the at least one additive is at least one compound selected from compounds represented by chemical formula I-IV:

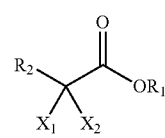

I-IV in which $R_1$ represents one of alkyl ($-C_nH_{2n+1}$), cycloalkyl, alkenyl ($C_nH_{2n}$), aryl ($-Ar$), heteroaryl; halogenated cycloalkyl (($-C_nX_{2n}$) or ($-CH_2-C_nX_{2n}$)), halogenated alkenyl ($C_nX_n$), halogenated aryl ($-Ar-X$), halogenated heteroaryl with halogen X being F, Cl, Br or I; halogen (—F, —Cl, —Br, —I) and nitrile (—CN);

in which $R_2$ represents one of alkyl ($-C_nH_{2n+1}$), cycloalkyl, alkenyl ($C_nH_{2n}$), aryl ($-Ar$), heteroaryl; halogenated cycloalkyl (($-C_nX_{2n}$) or ($-CH_2-C_nX_{2n}$)), halogenated alkenyl ($C_nX_n$), halogenated aryl ($-Ar-X$), halogenated heteroaryl with halogen X being F, Cl, Br or I; alkoxy, aryloxy, heteroaryloxy, halogenated aryloxy; —CN-substituted-alkyl, -cycloalkyl, -aryl, -heteroaryl; —NO$_2$-substituted-alkyl, -cycloalkyl, -aryl, -heteroaryl; halogen (—F, —Cl, —Br, —I) and nitrile (—CN);

in which R$_1$, R$_2$ is each not a halogenated alkyl;

in which X$_1$, X$_2$ represents one of hydrogen; halogen X; halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl and -heteroaryl;

in which X$_1$ and X$_2$ are not hydrogen concurrently.

According to an embodiment of the present disclosure, there is provided use of the non-aqueous electrolyte according to the embodiments described herein, in
an electrochemical device,
such as, but not limited to, a secondary battery, a super capacitor, an electric device,
such as, but not limited to, a battery pack, an electric vehicle, an electric power storage system, an electric power tool, an electronic apparatus.

According to an embodiment of the present disclosure, there is provided a secondary battery including:
a cathode,
an anode, and
a non-aqueous electrolyte according to the embodiments described herein, in which the secondary battery includes a secondary Li-ion battery.

According to an embodiment of the present disclosure, there is provided an electric device including a secondary battery according to the embodiments as described herein.

The foregoing paragraphs have been provided by way of general introduction, and are not intended to limit the scope of the following claims. The described embodiments, together with further advantages, will be best understood by reference to the following detailed description taken in conjunction with the accompanying drawings.

According to an embodiment of the present disclosure, a electrolytic solution for a secondary battery is provided. The electrolytic solution includes a cyano compound represented by chemical formula (1).

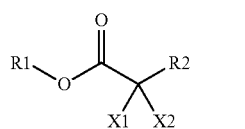

(1)

where R1 represents one of a monovalent hydrocarbon group and a monovalent halogenated hydrocarbon group, R2 represents one of a cyano group, a monovalent chain hydrocarbon cyano group, and a monovalent halogenated chain hydrocarbon cyano group, X1 represents a halogen group, X2 represents one of a hydrogen group, a halogen group, a monovalent hydrocarbon group, and a monovalent halogenated hydrocarbon group.

According to an embodiment of the present disclosure, a secondary battery is provided. The secondary battery includes: a cathode; an anode; and an electrolytic solution, and the electrolytic solution has a configuration similar to that of the electrolytic solution according to the embodiments as described herein.

According to an embodiment of the present disclosure, there are provided a battery pack, an electric vehicle, an electric power storage system, an electric power tool, and an electronic apparatus each of which includes a secondary battery, and the secondary battery has a configuration similar to that of the secondary battery according to the embodiments as described herein.

Herein, the "monovalent chain hydrocarbon cyano group" described above is a generic name of a group in which one or more cyano groups are introduced into a monovalent chain hydrocarbon group. In other words, the monovalent chain hydrocarbon cyano group is a group in which one or more hydrogen groups in a monovalent chain hydrocarbon group are substituted by one or more cyano groups.

It is to be noted that a position where the one or more cyano groups are introduced into the monovalent chain hydrocarbon group is not particularly limited.

The "monovalent chain hydrocarbon group" described herein is a generic name of a monovalent chain group including carbon (C) and hydrogen (H), and may be a straight-chain group or a branched group having one or more side chains. The monovalent chain hydrocarbon group may include one or more carbon-carbon unsaturated bonds, or may not include the carbon-carbon unsaturated bond. It should be understood that non-limiting examples of the carbon-carbon unsaturated bond may include a carbon-carbon double bond (>C=C<) and a carbon-carbon triple bond (—C≡C—).

Moreover, the "monovalent halogenated chain hydrocarbon cyano group" described above is a group in which one or more hydrogen groups in the foregoing monovalent chain hydrocarbon cyano group are substituted by a halogen group. The halogen group may be of one kind or of two or more kinds.

According to the electrolytic solution and the secondary battery of the respective embodiment as described herein, the electrolytic solution includes the foregoing cyano compound, which makes it possible to achieve superior battery characteristics. Moreover, in each of the battery pack, the electric vehicle, the electric power storage system, the electric power tool, and the electronic apparatus of the respective embodiments of the disclosure, similar effects are achievable.

It should be understood that effects described herein are non-limiting. Effects achieved by the disclosure may be one or more of effects described in the disclosure.

It is to be understood that both the foregoing general description and the following detailed description are exemplary, and are provided to provide further explanation of the technology as claimed.

BRIEF DESCRIPTION OF THE FIGURES

The accompanying drawings are included to provide a further understanding of the technology, and are incorporated in and constitute a part of this specification. The drawings show illustrative embodiments and, together with the specification, serve to explain various principles of the technology.

FIG. 5 is a block diagram illustrating a configuration of an application example (a battery pack) of the secondary battery according to an embodiment of the present disclosure. For example, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60. The housing 60 may be made, for example, of a plastic material or the like.

DETAILED DESCRIPTION

Figure 1:
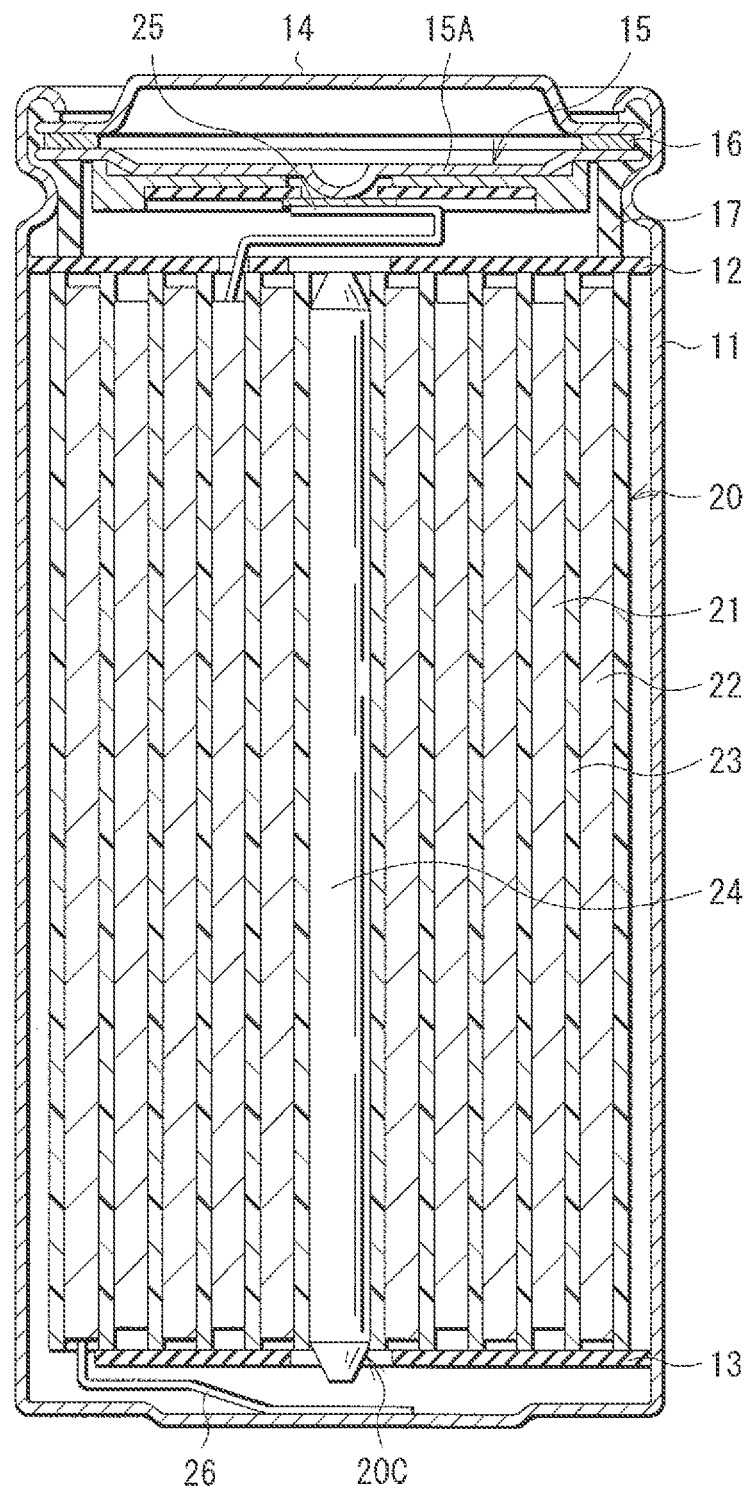
FIG. 1 is a cross-sectional view illustrating a configuration of a secondary battery (of a cylindrical type) that uses the non-aqueous electrolyte according an embodiment of the present disclosure.

As described herein, the present disclosure will be described based on examples with reference to the drawings, but the present disclosure is not to be considered limited to the examples, and various numerical values and materials in the examples are considered by way of example.

The non-aqueous electrolyte for secondary batteries according to the disclosure includes:
a polar aprotic solvent;
an alkali metal salt; and
at least one additive,
in which the additive is at least one compound selected from compounds with general formula I

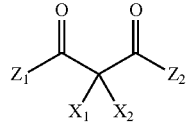

I in which $Z_1$, $Z_2$ is alkyl (—$C_nH_{2n+1}$), cycloalkyl, alkenyl ($C_nH_{2n}$), aryl (—Ar), heteroaryl; halogenated alkyl ((—$C_nX_{2n+1}$) or (—$CH_2$—$C_nX_{2n+1}$)), halogenated cycloalkyl ((—$C_nX_{2n}$) or (—$CH_2$—$C_nX_{2n}$)), halogenated alkenyl ($C_nX_n$), halogenated aryl (—Ar—X), halogenated heteroaryl with halogen X being F, Cl, Br or I; alkoxy, aryloxy, heteroaryloxy, halogenated aryloxy; —CN-substituted-alkyl, -cycloalkyl, -aryl, -heteroaryl; —$NO_2$-substituted-alkyl, -cycloalkyl, -aryl, -heteroaryl; halogen (—F, —Cl, —Br, —I); or nitrile (—CN);
in which $X_1$, $X_2$ is H; halogen X (X being F, Cl, Br or I); halogenated alkyl, -alkenyl, -aryl, -heteroaryl; —CN-substituted-alkyl, -alkenyl, -aryl, -heteroaryl; —$NO_2$-substituted-alkyl, -alkenyl, -aryl or -heteroaryl;
in which $Z_1$ and $Z_2$ can be equal or different; and
in which $X_1$ and $X_2$ can be equal or different.

In an embodiment, the non-aqueous electrolyte for secondary batteries according to the disclosure includes at least one additive, which is at least one compound selected from compounds with general formula I,

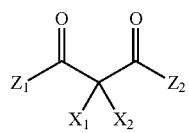

I in which $Z_1$, $Z_2$ is alkyl (—$C_nH_{2n+1}$), cycloalkyl, alkenyl ($C_nH_{2n}$), aryl (—Ar), heteroaryl; halogenated alkyl ((—$C_nX_{2n+1}$) or (—$CH_2$—$C_nX_{2n+1}$)), halogenated cycloalkyl ((—$C_nX_{2n}$) or (—$CH_2$—$C_nX_{2n}$)), halogenated alkenyl ($C_nX_n$), halogenated aryl (—Ar—X), halogenated heteroaryl with halogen X being F, Cl, Br or I; —CN-substituted-alkyl, -cycloalkyl, -aryl, -heteroaryl; —NO$_2$— substituted-alkyl, -cycloalkyl, -aryl, -heteroaryl; halogen (—F, —Cl, —Br, —I) or nitrile (—CN);

in which $Z_1$, $Z_2$ is not alkoxy, aryloxy, heteroaryloxy or halogenated aryloxy;

in which $X_1$, $X_2$ is H; halogen X (X being F, Cl, Br or I); halogenated alkyl, -alkenyl, -aryl, -heteroaryl; —CN substituted-alkyl, -alkenyl, -aryl, -heteroaryl; —NO$_2$-substituted-alkyl, -alkenyl, -aryl or -heteroaryl;

in which $Z_1$ and $Z_2$ can be equal or different; and in which $X_1$ and $X_2$ can be equal or different.

In an embodiment, the non-aqueous electrolyte for secondary batteries according to the disclosure includes at least one additive, which is at least one compound selected from compounds with general formula I,

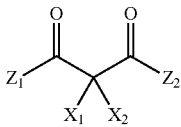

I in which $Z_1$, $Z_2$ is alkyl (—$C_nH_{2n+1}$), cycloalkyl, alkenyl ($C_nH_{2n}$), aryl (—Ar), heteroaryl; halogenated alkyl ((—$C_nX_{2n+1}$) or (—$CH_2$—$C_nX_{2n+1}$)), halogenated cycloalkyl ((—$C_nX_{2n}$) or (—$CH_2$—$C_nX_{2n}$)), halogenated alkenyl ($C_nX_n$), halogenated aryl (—Ar—X), halogenated heteroaryl with halogen X being F, Cl, Br or I; alkoxy, aryloxy, heteroaryloxy, halogenated aryloxy; —CN-substituted-alkyl, -cycloalkyl, -aryl, -heteroaryl; —NO$_2$-substituted-alkyl, -cycloalkyl, -aryl, -heteroaryl; halogen (—F, —Cl, —Br, —I) or nitrile (—CN);

in which $X_1$, $X_2$ is H; halogen X (X being F, Cl, Br or I); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

but in which $X_1$ and $X_2$ are not hydrogen H concurrently;

in which $Z_1$ and $Z_2$ can be equal or different; and in which $X_1$ and $X_2$ can be equal or different.

In an embodiment, the non-aqueous electrolyte for secondary batteries according to the disclosure includes at least one additive, which is at least one compound selected from compounds with general formula I,

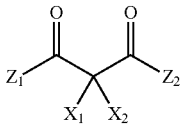

I in which $Z_1$, $Z_2$ is alkyl (—$C_nH_{2n+1}$), cycloalkyl, alkenyl ($C_nH_{2n}$), aryl (—Ar), heteroaryl; halogenated alkyl ((—$C_nX_{2n+1}$) or (—$CH_2$—$C_nX_{2n+1}$)), halogenated cycloalkyl ((—$C_nX_{2n}$) or (—$CH_2$—$C_nX_{2n}$)), halogenated alkenyl ($C_nX_n$), halogenated aryl (—Ar—X), halogenated heteroaryl with halogen X being F, Cl, Br or I; —CN-substituted-alkyl, -cycloalkyl, -aryl, -heteroaryl; —NO$_2$-substituted-alkyl, -cycloalkyl, -aryl, -heteroaryl; halogen (—F, —Cl, —Br, —I) or nitrile (—CN);

in which $Z_1$, $Z_2$ is not alkoxy, aryloxy, heteroaryloxy or halogenated aryloxy;

in which $X_1$, $X_2$ is H; halogen X (X being F, Cl, Br or I); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

but in which $X_1$ and $X_2$ are not hydrogen H concurrently;

in which $Z_1$ and $Z_2$ can be equal or different; and in which $X_1$ and $X_2$ can be equal or different.

In an embodiment, the non-aqueous electrolyte for secondary batteries according to the disclosure includes at least one additive, which is at least one compound selected from compounds with general formula I-I,

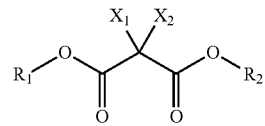

I-I in which $R_1$, $R_2$ is alkyl (—$C_nH_{2n+1}$), cycloalkyl, alkenyl ($C_nH_{2n}$), aryl (—Ar), heteroaryl; halogenated alkyl ((—$C_nX_{2n+1}$) or (—$CH_2$—$C_nX_{2n+1}$)), halogenated cycloalkyl ((—$C_nX_{2n}$) or (—$CH_2$—$C_nX_{2n}$)), halogenated alkenyl ($C_nX_n$), halogenated aryl (—Ar—X) or halogenated heteroaryl with halogen X being F, Cl, Br or I; and in which $X_1$, $X_2$ is H; halogen X (X being F, Cl, Br or F); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

in which $R_1$, $R_2$ can be equal or different; and in which $X_1$, $X_2$ can be equal or different.

In one embodiment, the non-aqueous electrolyte for secondary batteries according to the disclosure includes at least one additive, which is at least one compound selected from compounds with general formula I-I,

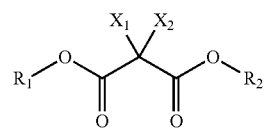

I-I in which $R_1$, $R_2$ is alkyl (—$C_nH_{2n+1}$), cycloalkyl, alkenyl ($C_nH_{2n}$), aryl (—Ar), heteroaryl; halogenated alkyl ((—$C_nX_{2n+1}$) or (—$CH_2$—$C_nX_{2n+1}$)), halogenated cycloalkyl ((—$C_nX_{2n}$) or (—$CH_2$—$C_nX_{2n}$)), halogenated alkenyl ($C_nX_n$), halogenated aryl (—Ar—X) or halogenated heteroaryl with halogen X being F, Cl, Br or I;

in which $R_1$, $R_2$ do not contain one or more Si-containing substituent(s); and in which $X_1$, $X_2$ is H; halogen X (X being F, Cl, Br or F); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

in which $R_1$, $R_2$ can be equal or different; and in which $X_1$, $X_2$ can be equal or different.

In one embodiment, the non-aqueous electrolyte for secondary batteries according to the disclosure includes at least one additive, which is at least one compound selected from compounds with general formula I-I,

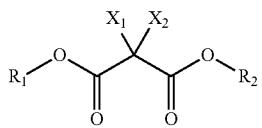

in which $R_1$, $R_2$ is alkyl ($-C_nH_{2n+1}$), cycloalkyl, alkenyl ($C_nH_{2n}$), aryl ($-Ar$), heteroaryl; halogenated alkyl (($-C_nX_{2n+1}$) or ($-CH_2-C_nX_{2n+1}$)), halogenated cycloalkyl (($-C_nX_{2n}$) or ($-CH_2-C_nX_{2n}$)), halogenated alkenyl ($C_nX_n$), halogenated aryl ($-Ar-X$) or halogenated heteroaryl with halogen X being F, Cl, Br or I;

in which $R_1$ and $R_2$ do not form a cyclic compound together; and in which $X_1$, $X_2$ is H; halogen X (X being F, Cl, Br or I); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

in which $R_1$, $R_2$ can be equal or different; and in which $X_1$, $X_2$ can be equal or different.

In one embodiment, the non-aqueous electrolyte for secondary batteries according to the disclosure includes at least one additive, which is at least one compound selected from compounds with general formula I-I,

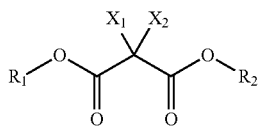

in which $R_1$, $R_2$ is alkyl ($-C_nH_{2n+1}$), cycloalkyl, alkenyl ($C_nH_{2n}$), aryl ($-Ar$), heteroaryl; halogenated alkyl (($-C_nX_{2n+1}$) or ($-CH_2-C_nX_{2n+1}$)), halogenated cycloalkyl (($-C_nX_{2n}$) or ($-CH_2-C_nX_{2n}$)), halogenated alkenyl ($C_nX_n$), halogenated aryl ($-Ar-X$) or halogenated heteroaryl with halogen X being F, Cl, Br or I;

in which $R_1$, $R_2$ do not contain one or more Si-containing substituent(s) and in which $R_1$ and $R_2$ do not form a cyclic compound together; and in which $X_1$, $X_2$ is H; halogen X (X being F, Cl, Br or F); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

in which $R_1$, $R_2$ can be equal or different; and in which $X_1$, $X_2$ can be equal or different.

In an embodiment, the non-aqueous electrolyte for secondary batteries according to the disclosure includes at least one additive, which is at least one compound selected from compounds with general formula I-I,

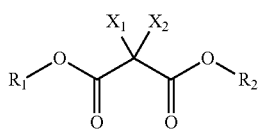

in which $R_1$, $R_2$ is alkyl ($-C_nH_{2n+1}$), cycloalkyl, alkenyl ($C_nH_{2n}$), aryl ($-Ar$), heteroaryl; halogenated alkyl (($-C_nX_{2n+1}$) or ($-CH_2-C_nX_{2n+1}$)), halogenated cycloalkyl (($-C_nX_{2n}$) or ($-CH_2-C_nX_{2n}$)), halogenated alkenyl ($C_nX_n$), halogenated aryl ($-Ar-X$) or halogenated heteroaryl with halogen X being F, Cl, Br or I; and in which $X_1$, $X_2$ is H; halogen X (X being F, Cl, Br or I); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl; and in which $X_1$ and $X_2$ are not hydrogen H concurrently;

in which $R_1$, $R_2$ can be equal or different; and in which $X_1$, $X_2$ can be equal or different.

In an embodiment, the non-aqueous electrolyte for secondary batteries according to the disclosure includes at least one additive, which is at least one compound selected from compounds with general formula I-I,

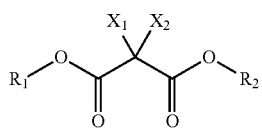

in which $R_1$, $R_2$ is alkyl ($-C_nH_{2n+1}$), cycloalkyl, alkenyl ($C_nH_{2n}$), aryl ($-Ar$), heteroaryl; halogenated alkyl (($-C_nX_{2n+1}$) or ($-CH_2-C_nX_{2n+1}$)), halogenated cycloalkyl (($-C_nX_{2n}$) or ($-CH_2-C_nX_{2n}$)), halogenated alkenyl ($C_nX_n$), halogenated aryl ($-Ar-X$) or halogenated heteroaryl with halogen X being F, Cl, Br or I;

in which $R_1$, $R_2$ do not contain one or more Si-containing substituent(s); and in which $X_1$, $X_2$ is H; halogen X (X being F, Cl, Br or F); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl; and but in which $X_1$ and $X_2$ are not hydrogen H concurrently;

in which $R_1$, $R_2$ can be equal or different; and in which $X_1$, $X_2$ can be equal or different.

In an embodiment, the non-aqueous electrolyte for secondary batteries according to the disclosure includes at least one additive, which is at least one compound selected from compounds with general formula I-I,

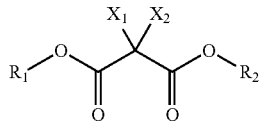

in which $R_1$, $R_2$ is alkyl ($-C_nH_{2n+1}$), cycloalkyl, alkenyl ($C_nH_{2n}$), aryl ($-Ar$), heteroaryl; halogenated alkyl (($-C_nX_{2n+1}$) or ($-CH_2-C_nX_{2n+1}$)), halogenated cycloalkyl (($-C_nX_{2n}$) or ($-CH_2-C_nX_{2n}$)), halogenated alkenyl ($C_nX_n$), halogenated aryl ($-Ar-X$) or halogenated heteroaryl with halogen X being F, Cl, Br or I;

in which $R_1$ and $R_2$ do not form a cyclic compound together;

in which $X_1$, $X_2$ is H; halogen X (X being F, Cl, Br or I); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

but in which $X_1$ and $X_2$ are not hydrogen H concurrently;

in which $R_1$, $R_2$ can be equal or different; and in which $X_1$, $X_2$ can be equal or different.

In an embodiment, the non-aqueous electrolyte for secondary batteries according to the disclosure includes at least one additive, which is at least one compound selected from compounds with general formula I-I,

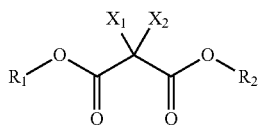

I-I in which $R_1$, $R_2$ is alkyl ($—C_nH_{2n+1}$), cycloalkyl, alkenyl ($C_nH_{2n}$), aryl (—Ar), heteroaryl; halogenated alkyl (($—C_nX_{2n+1}$) or ($—CH_2—C_nX_{2n+1}$)), halogenated cycloalkyl (($—C_nX_{2n}$) or ($—CH_2—C_nX_{2n}$)), halogenated alkenyl ($C_nX_n$), halogenated aryl (—Ar—X) or halogenated heteroaryl with halogen X being F, Cl, Br or I;

in which $R_1$, $R_2$ do not contain one or more Si-containing substituent(s) and in which $R_1$ and $R_2$ do not form a cyclic compound together, in which $X_1$, $X_2$ is H; halogen X (X being F, Cl, Br or I); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

but in which $X_1$ and $X_2$ are not hydrogen H concurrently;

in which $R_1$, $R_2$ can be equal or different; and in which $X_1$, $X_2$ can be equal or different.

Preferred embodiments of formula I-I:

In an preferred embodiment, the at least one additive is one or more compound(s) with general formula I-I selected from:

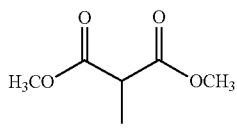

dimethyl 2-methlymalonate

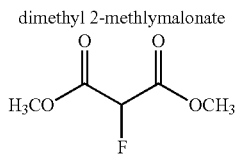

Dimethylfluoromalonate

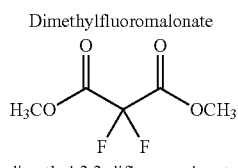

dimethyl 2,2-difluoromalonate

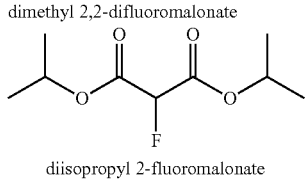

diisopropyl 2-fluoromalonate

-continued

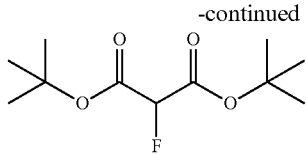

di-tert-butyl 2-fluoromalonate

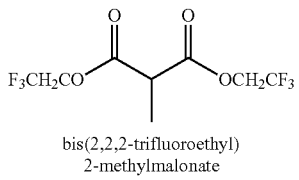

bis(2,2,2-trifluoroethyl) 2-methylmalonate

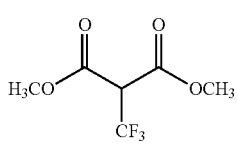

dimethyl 2-(trifluoromethyl)malonate

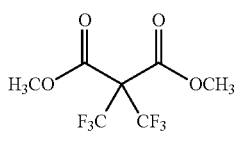

dimethyl 2,2-bis(trifluoromethyl)malonate

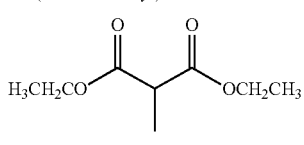

diethyl 2-methylmalonate

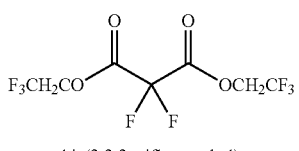

bis(2,2,2-trifluoroethyl) 2,2-difluoromalonate

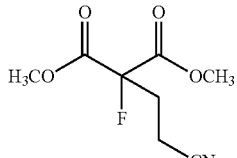

Dimethyl 2-(2-cyanoethyl)-2-fluoromalonate

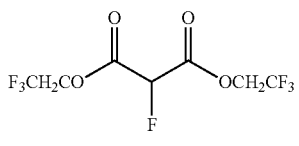

Bis [2,2,2-trifluoroethyl] 2-fluoromalonate

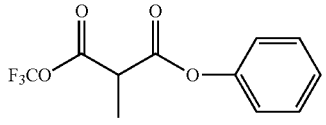

1-phenyl 3-(trifluoromethyl) 2-methylmalonate

-continued

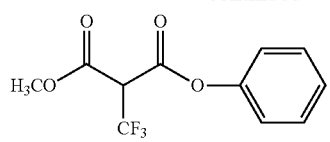
1-methyl 3-phenyl 2-(trifluoromethyl)malonate

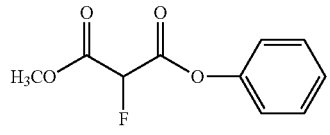
1-methyl 3-phenyl 2-fluoromalonate

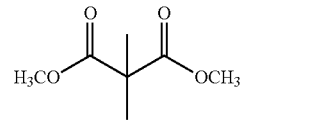
dimethyl 2,2-dimethylmalonate

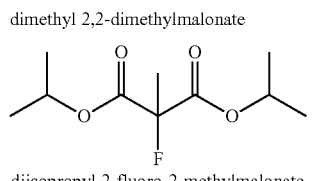
diisopropyl 2-fluoro-2-methylmalonate

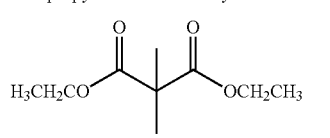
diethyl 2,2-dimethylmalonate

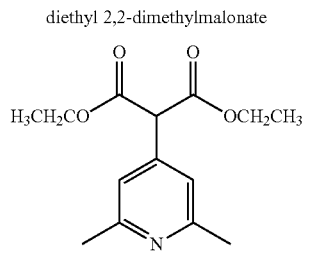
diethyl 2-(2,6-dimethylpyridin-4-yl)malonate

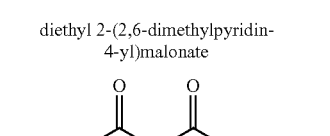
diethyl 2-phenylmalonate

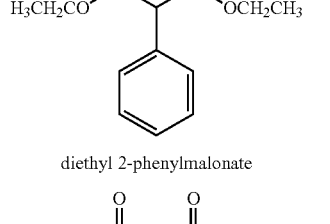
diethyl 2-(perfluorophenyl)malonate

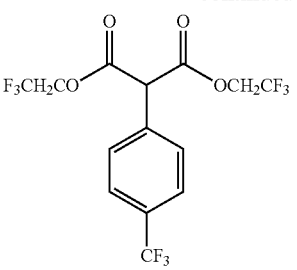
bis(2,2,2-trifluoroethyl) 2-(4-(trifluoromethyl)phenyl)malonate

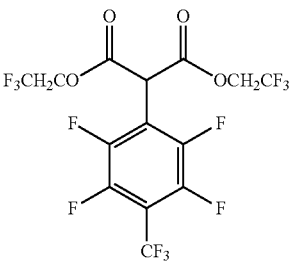
bis(2,2,2-trifluoroethyl) 2-(2,3,5,6-tetrafluoro-4-(trifluoromethyl)phenyl)malonate

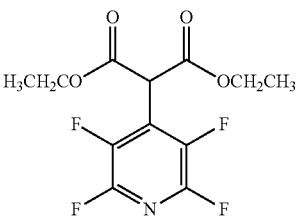
diethyl 2-(perfluoropyridin-4-yl)malonate

In a further preferred embodiment, the at least one additive is one or more compound(s) with general formula I-I selected from:

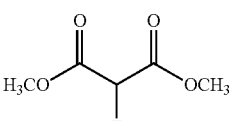
Dimethylfluoromalonate

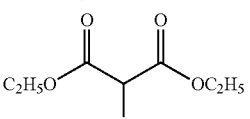
Diethylfluoromalonate

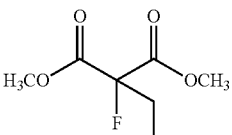
Dimethyl 2-(2-cyanoethyl)-2-fluoromalonate

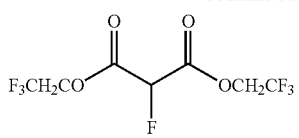

Bis [2,2,2-trifluoroethyl]
2-fluoromalonate

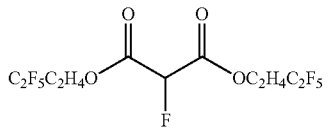

Bis [4,4,4,3,3,-pentafluorobutyl]
2-fluoromalonate

In one embodiment, the at least one non-aqueous electrolyte for secondary batteries according to the disclosure includes at least one additive, which is at least one compound selected from compounds with general formula I-II,

I-II

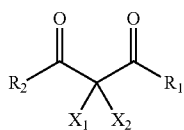

in which $R_1$, $R_2$ is alkyl ($-C_nH_{2n+1}$), cycloalkyl, alkenyl ($C_nH_{2n}$), aryl (—Ar), heteroaryl; halogenated alkyl (($-C_nX_{2n+1}$) or ($-CH_2-C_nX_{2n+1}$)), halogenated cycloalkyl (($-C_nX_{2n}$) or ($-CH_2-C_nX_{2n}$)), halogenated alkenyl ($C_nX_n$), halogenated aryl (—Ar—X), halogenated heteroaryl with halogen X being F, Cl, Br or I; —CN-substituted-alkyl, -cycloalkyl, -aryl, -heteroaryl; —NO$_2$-substituted-alkyl, -cycloalkyl, -aryl, -heteroaryl; halogen (—F, —Cl, —Br, —I) or nitrile (—CN); and in which $X_1$, $X_2$ is H; halogen X (X being F, Cl, Br or I); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

in which $R_1$, $R_2$ can be equal or different; and in which $X_1$, $X_2$ can be equal or different.

In an embodiment, the at least one additive is one or more compound(s) with general formula I-II selected from:

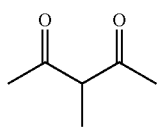

3-methylpentane

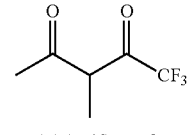

1,1,1-trifluoro-3-
methylpentane-2,4-dione

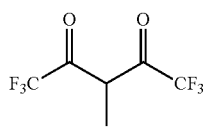

1,1,1,5,5,5-hexafluoro-3-
methylpentane-2,4-dione

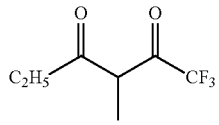

1,1,1-trifluoro-3-
methylhexane-2,4-dione

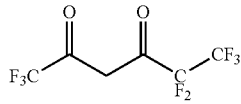

1,1,1,5,5,6,6,6-
octafluorohexane-2,4-dione

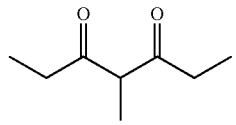

4-methylheptane-3,5-dione

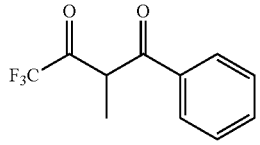

4,4,4-trifluoro-2-methyl-1-
phenylbutane-1,3-dione

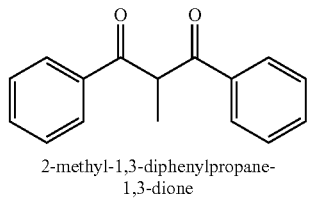

2-methyl-1,3-diphenylpropane-
1,3-dione

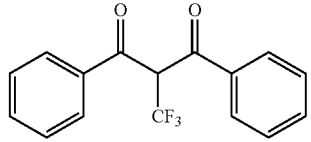

1,3-diphenyl-2-
(trifluoromethyl)propane-1,3-dione

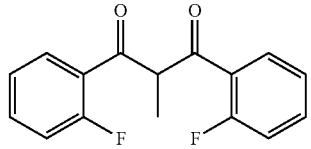

1,3-bis(2-fluorophenyl)-2-
methylpropane-1,3-dione

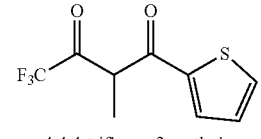

4,4,4-trifluoro-2-methyl-
1-(thiophen-2-yl)butane-1,3-dione

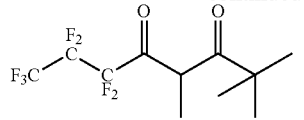

6,6,7,7,8,8,8-heptafluoro-2,2,4-trimethyloctane-3,5-dione

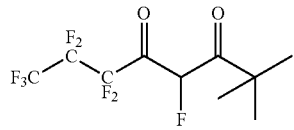

4,6,6,7,7,8,8,8-octafluoro-2,2-dimethyloctane-3,5-dione

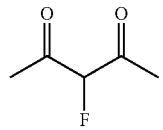

3-fluoropentane-2,4-dione

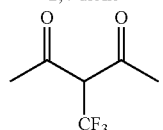

3-(trifluoromethyl)pentane-2,4-dione

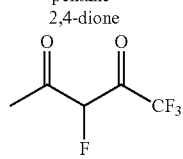

1,1,1,3-tetrafluoropentane-2,4-dione

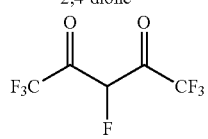

1,1,1,3,5,5,5-heptafluoropentane-2,4-dione

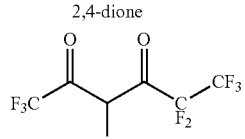

1,1,1,3,5,5,5,6,6,6-nonafluorohexane-2,4-dione

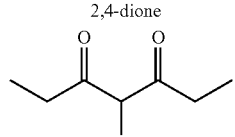

4-fluoroheptane-3,5-dione

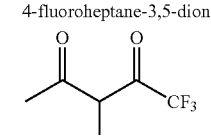

1,1,1-tetrafluoropentane-2,4-dione

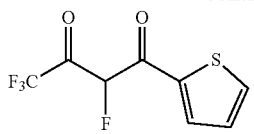

2,4,4,4-tetrafluoro-1-(thiophen-2-yl)butane-1,3-dione

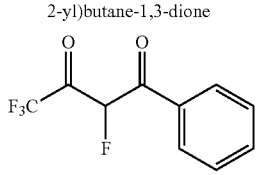

2,4,4,4-tetrafluoro-1-phenylbutane-1,3-dione

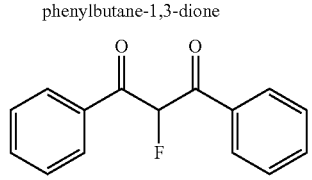

2-fluoro-1,3-diphenylpropane-1,3-dione

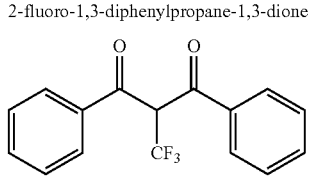

1,3-diphenyl-2-(trifluoromethyl)propane-1,3-dione

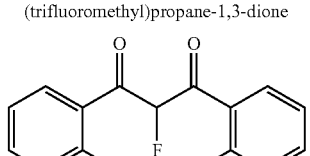

2-fluoro-1,3-bis(2-fluorophenyl)propane-1,3-dione

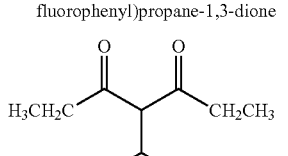

4-(4-(trifluoromethyl)phenyl)heptane-3,5-dione

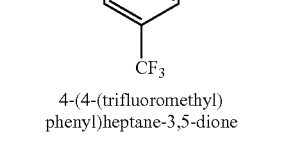

4(perfluorophenyl)heptane-3,5-dione

-continued

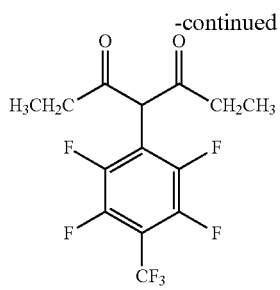
4-(2,3,5,6-tetrafluoro-4-(trifluoromethyl)pheny)heptane-3,5-dione

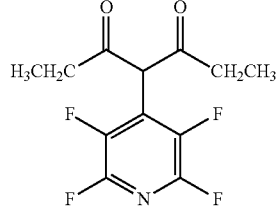
4-(perfluoropyridin-4-yl)heptane-3,5-dione

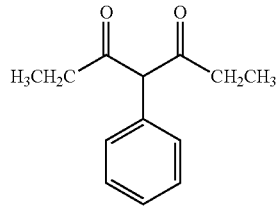
4-phenylheptane-3,5-dione

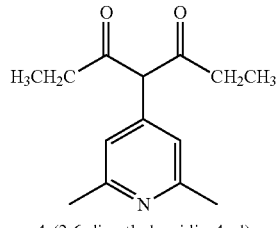
4-(2,6-dimethylpyridin-4-yl)heptane-3,5-dione

In one embodiment, the at least one non-aqueous electrolyte for secondary batteries according to the disclosure includes at least one additive, which is at least one compound selected from compounds with general formula I-III, I-III
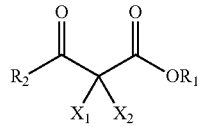

in which $R_1$ is alkyl ($-C_nH_{2n+1}$), cycloalkyl, alkenyl ($C_nH_{2n}$), aryl ($-Ar$), heteroaryl; halogenated alkyl (($-C_nX_{2n+1}$) or ($-CH_2-C_nX_{2n+1}$)), halogenated cycloalkyl (($-C_nX_{2n}$) or ($-CH_2-C_nX_{2n}$)), halogenated alkenyl ($C_nX_n$), halogenated aryl ($-Ar-X$), halogenated heteroaryl with halogen X being F, Cl, Br or I;

in which $R_2$ is alkyl ($-C_nH_{2n+1}$), cycloalkyl, alkenyl ($C_nH_{2n}$), aryl ($-Ar$), heteroaryl; halogenated alkyl (($-C_nX_{2n+1}$) or ($-CH_2-C_nX_{2n+1}$)), halogenated cycloalkyl (($-C_nX_{2n}$) or ($-CH_2-C_nX_{2n}$)), halogenated alkenyl ($C_nX_n$), halogenated aryl ($-Ar-X$), halogenated heteroaryl with halogen X being F, Cl, Br or I; $-CN$-substituted-alkyl, -cycloalkyl, -aryl, -heteroaryl; $-NO_2$-substituted-alkyl, -cycloalkyl, -aryl, -heteroaryl; halogen ($-F$, $-Cl$, $-Br$, $-I$) or nitrile ($-CN$); and in which $X_1$, $X_2$ is H; halogen X (X being F, Cl, Br or I); halogenated alkyl, -alkenyl, -aryl, -heteroaryl; $-CN$-substituted-alkyl, -alkenyl, -aryl, -heteroaryl; $-NO_2$-substituted-alkyl, -alkenyl, -aryl or -heteroaryl;

in which $R_1$, $R_2$ can be equal or different; and in which $X_1$, $X_2$ can be equal or different.

In an embodiment, the at least one additive is one or more compound(s) with general formula I-III selected from:

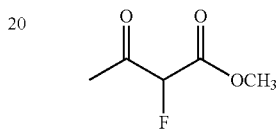
methyl 2-fluoro-3-oxobutanoate

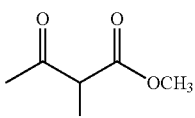
methyl 3-oxo-2-(trifluoromethyl)butanoate

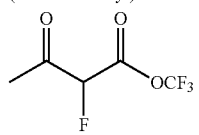
trifluoromethyl 2-fluoro-3-oxobutanoate

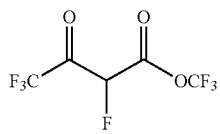
trifluoromethyl 2,4,4,4-tetrafluoro-3-oxobutanoate

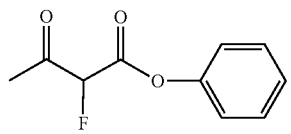
phenyl 2-fluoro-3-oxobutanoate

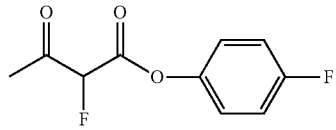
4-fluorophenyl 2-fluoro-3-oxopropanoate

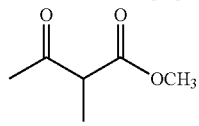
methyl 2-methyl-3-oxobutanoate

-continued

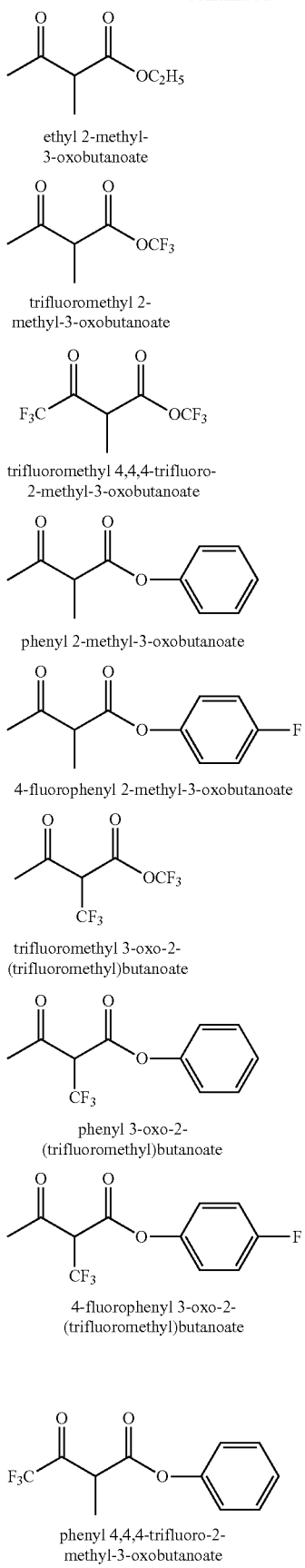

ethyl 2-methyl-3-oxobutanoate trifluoromethyl 2-methyl-3-oxobutanoate trifluoromethyl 4,4,4-trifluoro-2-methyl-3-oxobutanoate phenyl 2-methyl-3-oxobutanoate 4-fluorophenyl 2-methyl-3-oxobutanoate trifluoromethyl 3-oxo-2-(trifluoromethyl)butanoate phenyl 3-oxo-2-(trifluoromethyl)butanoate 4-fluorophenyl 3-oxo-2-(trifluoromethyl)butanoate phenyl 4,4,4-trifluoro-2-methyl-3-oxobutanoate -continued

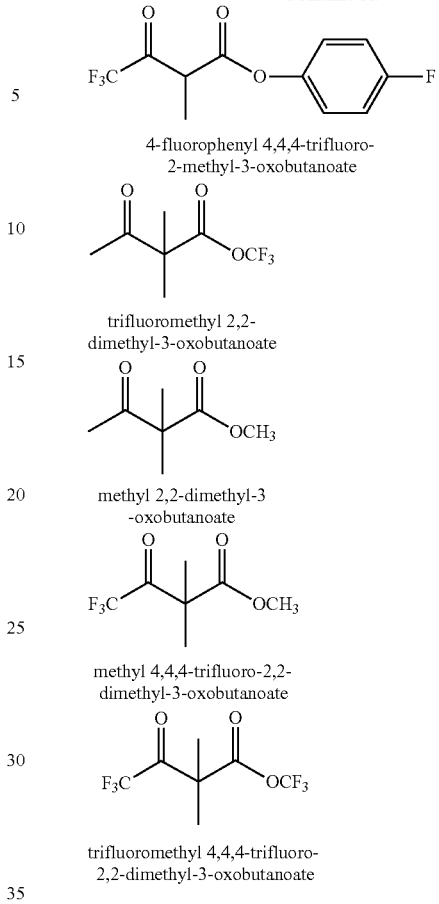

4-fluorophenyl 4,4,4-trifluoro-2-methyl-3-oxobutanoate trifluoromethyl 2,2-dimethyl-3-oxobutanoate methyl 2,2-dimethyl-3-oxobutanoate methyl 4,4,4-trifluoro-2,2-dimethyl-3-oxobutanoate trifluoromethyl 4,4,4-trifluoro-2,2-dimethyl-3-oxobutanoate In one embodiment, the at least one non-aqueous electrolyte for secondary batteries according to the disclosure includes at least one additive, which is at least one compound selected from compounds with general formula I-IV,

I-IV

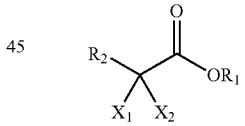

in which $R_1$ is alkyl ($—C_nH_{2n+1}$), cycloalkyl, alkenyl ($C_nH_{2n}$), aryl (—Ar), heteroaryl; halogenated alkyl (($—C_nX_{2n+1}$) or ($—CH_2—C_nX_{2n+1}$)), halogenated cycloalkyl (($—C_nX_{2n}$) or ($—CH_2—C_nX_{2n}$)), halogenated alkenyl ($C_nX_n$), halogenated aryl (—Ar—X), halogenated heteroaryl with halogen X being F, Cl, Br or I; halogen (—F, —Cl, —Br, —I) or nitrile (—CN);
in which R2 is alkyl ($—C_nH_{2n+1}$), cycloalkyl, alkenyl ($C_nH_{2n}$), aryl (—Ar), heteroaryl; halogenated alkyl (($—C_nX_{2n+1}$) or ($—CH_2—C_nX_{2n+1}$)), halogenated cycloalkyl (($—C_nX_{2n}$) or ($—CH_2—C_nX_{2n}$)), halogenated alkenyl ($C_nX_n$), halogenated aryl (—Ar—X), halogenated heteroaryl with halogen X being F, Cl, Br or I; alkoxy, aryloxy, heteroaryloxy, halogenated aryloxy; —CN-substituted-alkyl, -cycloalkyl, -aryl, -heteroaryl; —NO$_2$-substituted-alkyl, -cycloalkyl, -aryl, -heteroaryl; halogen (—F, —Cl, —Br, —I) or nitrile (—CN);

in which $X_1$, $X_2$ is H; halogen X (X being F, Cl, Br or I); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

in which $R_1$, $R_2$ can be equal or different; and in which $X_1$, $X_2$ can be equal or different.

In one embodiment, the at least one non-aqueous electrolyte for secondary batteries according to the disclosure includes at least one additive, which is at least one compound selected from compounds with general formula I-IV,

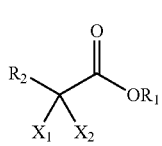

I-IV in which $R_1$ is alkyl (—C$_n$H$_{2n+1}$), cycloalkyl, alkenyl (C$_n$H$_{2n}$), aryl (—Ar), heteroaryl; halogenated alkyl ((—C$_n$X$_{2n+1}$) or (—CH$_2$—C$_n$X$_{2n+1}$)), halogenated cycloalkyl ((—C$_n$X$_{2n}$) or (—CH$_2$—C$_n$X$_{2n}$)), halogenated alkenyl (C$_n$X$_n$), halogenated aryl (—Ar—X), halogenated heteroaryl with halogen X being F, Cl, Br or I; halogen (—F, —Cl, —Br, —I) or nitrile (—CN);

in which $R_2$ is alkyl (—C$_n$H$_{2n+1}$), cycloalkyl, alkenyl (C$_n$H$_{2n}$), aryl (—Ar), heteroaryl; halogenated alkyl ((—C$_n$X$_{2n+1}$) or (—CH$_2$—C$_n$X$_{2n+1}$)), halogenated cycloalkyl ((—C$_n$X$_{2n}$) or (—CH$_2$—C$_n$X$_{2n}$)), halogenated alkenyl (C$_n$X$_n$), halogenated aryl (—Ar—X), halogenated heteroaryl with halogen X being F, Cl, Br or I; alkoxy, aryloxy, heteroaryloxy, halogenated aryloxy; —CN-substituted-alkyl, -cycloalkyl, -aryl, -heteroaryl; —NO$_2$-substituted-alkyl, -cycloalkyl, -aryl, -heteroaryl; halogen (—F, —Cl, —Br, —I) or nitrile (—CN);

in which X1, X2 is H; halogen X (X being F, Cl, Br or I); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

in which $X_1$ and $X_2$ are not hydrogen H concurrently;

in which $R_1$, $R_2$ can be equal or different; and in which $X_1$, $X_2$ can be equal or different.

In one embodiment, the at least one non-aqueous electrolyte for secondary batteries according to the disclosure includes at least one additive, which is at least one compound selected from compounds with general formula I-IV,

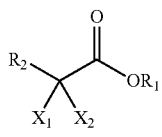

I-IV in which $R_1$ is alkyl (—C$_n$H$_{2n+1}$), cycloalkyl, alkenyl (C$_n$H$_{2n}$), aryl (—Ar), heteroaryl; halogenated cycloalkyl ((—C$_n$X$_{2n}$) or (—CH$_2$—C$_n$X$_{2n}$)), halogenated alkenyl (C$_n$X$_n$), halogenated aryl (—Ar—X), halogenated heteroaryl with halogen X being F, Cl, Br or I; halogen (—F, —Cl, —Br, —I) or nitrile (—CN);

in which $R_2$ is alkyl (—C$_n$H$_{2n+1}$), cycloalkyl, alkenyl (C$_n$H$_{2n}$), aryl (—Ar), heteroaryl; halogenated alkyl ((—C$_n$X$_{2n+1}$) or (—CH$_2$—C$_n$X$_{2n+1}$)), halogenated cycloalkyl ((—C$_n$X$_{2n}$) or (—CH$_2$—C$_n$X$_{2n}$)), halogenated alkenyl (C$_n$X$_n$), halogenated aryl (—Ar—X), halogenated heteroaryl with halogen X being F, Cl, Br or I; alkoxy, aryloxy, heteroaryloxy, halogenated aryloxy; —CN-substituted-alkyl, -cycloalkyl, -aryl, -heteroaryl; —NO$_2$-substituted-alkyl, -cycloalkyl, -aryl, -heteroaryl; halogen (—F, —Cl, —Br, —I) or nitrile (—CN);

but in which $R_1$, $R_2$ is each not a halogenated alkyl;

in which $X_1$, $X_2$ is H; halogen X (X being F, Cl, Br or I); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

in which $R_1$, $R_2$ can be equal or different; and in which $X_1$, $X_2$ can be equal or different.

In one embodiment, the at least one non-aqueous electrolyte for secondary batteries according to the disclosure includes at least one additive, which is at least one compound selected from compounds with general formula I-IV,

I-IV in which $R_1$ is alkyl (—C$_n$H$_{2n+1}$), cycloalkyl, alkenyl (C$_n$H$_{2n}$), aryl (—Ar), heteroaryl; halogenated cycloalkyl ((—C$_n$X$_{2n}$) or (—CH$_2$—C$_n$X$_{2n}$)), halogenated alkenyl (C$_n$X$_n$), halogenated aryl (—Ar—X), halogenated heteroaryl with halogen X being F, Cl, Br or I; halogen (—F, —Cl, —Br, —I) or nitrile (—CN);

in which R2 is alkyl (—C$_n$H$_{2n+1}$), cycloalkyl, alkenyl (C$_n$H$_{2n}$), aryl (—Ar), heteroaryl; halogenated cycloalkyl ((—C$_n$X$_{2n}$) or (—CH$_2$—C$_n$X$_{2n}$)), halogenated alkenyl (C$_n$X$_n$), halogenated aryl (—Ar—X), halogenated heteroaryl with halogen X being F, Cl, Br or I; alkoxy, aryloxy, heteroaryloxy, halogenated aryloxy; —CN-substituted-alkyl, -cycloalkyl, -aryl, -heteroaryl; —NO$_2$-substituted-alkyl, -cycloalkyl, -aryl, -heteroaryl; halogen (—F, —Cl, —Br, —I) or nitrile (—CN);

but in which $R_1$, $R_2$ is each not a halogenated alkyl;

in which $X_1$, $X_2$ is H; halogen X (X being F, Cl, Br or I); halogenated alkyl, -alkenyl, -aryl, -heteroaryl; —CN-substituted-alkyl, -alkenyl, -aryl, -heteroaryl; —NO$_2$-substituted-alkyl, -alkenyl, -aryl or -heteroaryl;

but in which $X_1$ and $X_2$ are not hydrogen H concurrently;

in which $R_1$, $R_2$ can be equal or different; and in which $X_1$, $X_2$ can be equal or different.

In an embodiment, the at least one additive is one or more compound(s) with general formula I-IV selected from:

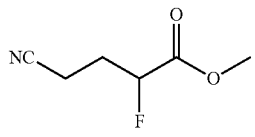

methyl 4-cyano-2-fluorobutanoate

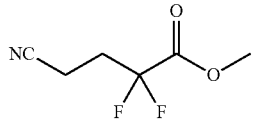

methyl 4-cyano-2,2-difluorobutanoate

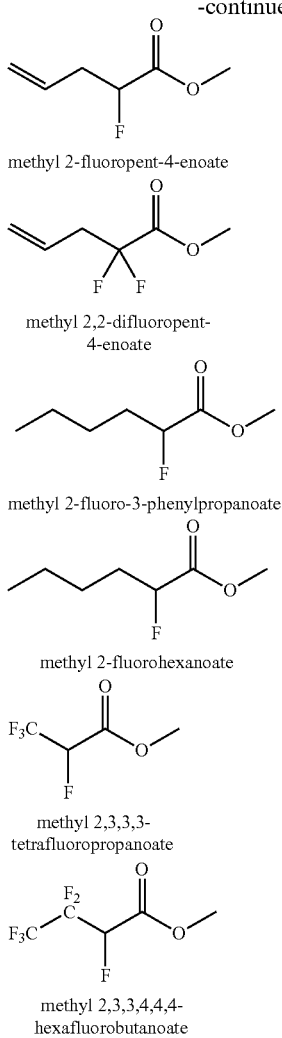

methyl 2-fluoropent-4-enoate methyl 2,2-difluoropent-4-enoate methyl 2-fluoro-3-phenylpropanoate methyl 2-fluorohexanoate methyl 2,3,3,3-tetrafluoropropanoate methyl 2,3,3,4,4,4-hexafluorobutanoate The redox stability of the additive can be controlled through the number of fluorine atoms and through the position of the fluorine-containing substituent. A preferred redox reaction site, i.e. oxidation at the cathode or reduction at the anode can be achieved by tuning of the highest occupied molecular orbital (HOMO) or the lowest unoccupied molecular orbital (LUMO) energy. Further, good solubility of the additive in the carbonate electrolyte can be achieved by introducing polar substituents.

The additives according to the disclosure need to comply with several requirements, for example, the oxidative decomposition at the cathode should be less positive than those of the polar aprotic solvent in the electrolyte, the reductive composition at the anode should be higher than those of the polar aprotic solvent in the electrolyte and a fast and irreversible redox reaction should take place to form a homogenous, thin and dense SEI already during the first charging. Further, reactive groups should be present, either in the molecular core or at the side substituents, to allow oligomerization or polymerization to a thin film at the cathode. Further, the additives should have good solubility in the electrolyte solution.

In an embodiment, the amount of the at least one additive in the non-aqueous electrolyte, which is at least one compound selected from compounds with general formula I, is between 0.001 and 10 wt %, preferably between 0.01 and 5 wt %, more preferably between 0.1 and 3 wt %. In an embodiment, the amount of the at least one additive in the non-aqueous electrolyte, which is at least one compound selected from compounds with general formula I-I, is between 0.001 and 10 wt %, preferably between 0.01 and 5 wt %, more preferably between 0.1 and 3 wt %. In an embodiment, the amount of the at least one additive in the non-aqueous electrolyte, which is at least one compound selected from compounds with general formula I-I, is between 0.01 and 2 wt %, preferably between 0.01 and 1.8 wt % and more preferably between 0.1 and 1.6 wt %. In an embodiment, the amount of the at least one additive in the non-aqueous electrolyte, which is at least one compound selected from compounds with general formula I-II, is between 0.001 and 10 wt %, preferably between 0.01 and 5 wt %, more preferably between 0.1 and 3 wt %. In an embodiment, the amount of the at least one additive in the non-aqueous electrolyte, which is at least one compound selected from compounds with general formula I-III, is between 0.001 and 10 wt %, preferably between 0.01 and 5 wt %, more preferably between 0.1 and 3 wt %. In an embodiment, the amount of the at least one additive in the non-aqueous electrolyte, which is at least one compound selected from compounds with general formula I-IV, is between 0.001 and 10 wt %, preferably between 0.01 and 5 wt %, more preferably between 0.1 and 3 wt %.

In an embodiment, the at least one additive in the non-aqueous electrolyte is a mixture of compounds selected from compounds with general formulas I-I, I-II, I-III and I-IV as described above. In an embodiment, the at least one additive in the non-aqueous electrolyte is a mixture of compounds selected from compounds with general formulas I-I and I-II. In an embodiment, the at least one additive in the non-aqueous electrolyte is a mixture of compounds selected from compounds with general formulas I-I and I-III. In an embodiment, the at least one additive in the non-aqueous electrolyte is a mixture of compounds selected from compounds with general formulas I-I and I-IV. In an embodiment, the at least one additive in the non-aqueous electrolyte is a mixture of compounds selected from compounds with general formulas I-II and I-III. In an embodiment, the at least one additive in the non-aqueous electrolyte is a mixture of compounds selected from compounds with general formulas I-II and I-IV. In an embodiment, the at least one additive in the non-aqueous electrolyte is a mixture of compounds selected from compounds with general formulas I-III and I-IV.

In an embodiment, the least one additive in the non-aqueous electrolyte is a mixture of compounds selected from compounds with general formulas I-I, I-II, I-III and I-IV as described above, in which the total amount of these additives in the non-aqueous electrolyte is between 0.001 and 10 wt %, preferably between 0.01 and 5 wt %, more preferably between 0.1 and 3 wt %. In an embodiment, the at least one additive in the non-aqueous electrolyte is a mixture of compounds selected from compounds with general formulas I-I and I-II, in which the total amount of these additives in the non-aqueous electrolyte is between 0.001 and 10 wt %, preferably between 0.01 and 5 wt %, more preferably between 0.1 and 3 wt %. In an embodiment, the at least one additive in the non-aqueous electrolyte is a mixture of compounds selected from compounds with general formula I-I and I-II, in which the total amount of these additives in the non-aqueous electrolyte is between 0.01 and 2 wt %, preferably between 0.01 and 1.8 wt % and more preferably between 0.1 and 1.6 wt %. In an embodiment, the at least one additive in the non-aqueous electrolyte is a mixture of compounds selected from compounds with general formula I-I and I-III, in which the total amount of these additives in the non-aqueous electrolyte is between 0.001 and 10 wt %, preferably between 0.01 and 5 wt %, more preferably between 0.1 and 3 wt %. In an embodiment, the at least one additive in the non-aqueous electrolyte is a mixture of compounds selected from compounds with general formula I-I and I-III, in which the total amount of these additives in the non-aqueous electrolyte is between 0.01 and 2 wt %, preferably between 0.01 and 1.8 wt % and more preferably between 0.1 and 1.6 wt %. In an embodiment, the at least one additive in the non-aqueous electrolyte is a mixture of compounds selected from compounds with general formula I-I and I-IV, in which the total amount of these additives in the non-aqueous electrolyte is between 0.001 and 10 wt %, preferably between 0.01 and 5 wt %, more preferably between 0.1 and 3 wt %. In an embodiment, the at least one additive in the non-aqueous electrolyte is a mixture of compounds selected from compounds with general formula I-I and I-IV, in which the total amount of these additives in the non-aqueous electrolyte is between 0.01 and 2 wt %, preferably between 0.01 and 1.8 wt % and more preferably between 0.1 and 1.6 wt %. In an embodiment, the at least one additive in the non-aqueous electrolyte is a mixture of compounds selected from compounds with general formula I-II and I-III, in which the total amount of these additives in the non-aqueous electrolyte is between 0.001 and 10 wt %, preferably between 0.01 and 5 wt %, more preferably between 0.1 and 3 wt %. In an embodiment, the at least one additive in the non-aqueous electrolyte is a mixture of compounds selected from compounds with general formula I-II and I-IV, in which the total amount of these additives in the non-aqueous electrolyte is between 0.001 and 10 wt %, preferably between 0.01 and 5 wt %, more preferably between 0.1 and 3 wt %. In an embodiment, the at least one additive in the non-aqueous electrolyte is a mixture of compounds selected from compounds with general formula I-III and I-IV, in which the total amount of these additives in the non-aqueous electrolyte is between 0.001 and 10 wt %, preferably between 0.01 and 5 wt %, more preferably between 0.1 and 3 wt %.

The additives according to the disclosure provide improvement of charge/discharge capacity and coulomb efficiency of the batteries in presence of the additives. Further advantages are enhancement of the electrolyte stability, enhancement of battery-lifetime, increase of battery power density retention, increase of battery capacity retention by cycling at high charging voltage, increase of battery voltage retention in fully charged state during storage by using at least one additive or a mixture of additives according to the disclosure. Additionally, the risk of abuse cases due to reduced swelling of battery during storage decreases.

In an embodiment, the polar aprotic solvent is preferably selected from cyclic ester carbonate(s),
such as, but not limited to, ethylene carbonate (EC), propylene carbonate (PC), and butylene carbonate (BC),
chain ester carbonate(s),
such as, but not limited to, dimethyl carbonate (DMC), diethyl carbonate (DEC), ethyl methyl carbonate (EMC), and methyl propyl carbonate (MPC),
lactone(s),
such as, but not limited to, γ-butyrolactone and γ-valerolactone, chain carboxylic ester(s),
such as, but not limited to, methyl acetate, ethyl acetate, methyl propionate, ethyl propionate, methyl butyrate, methyl isobutyrate, methyl trimethylacetate, and ethyl trimethylacetate,
nitrile(s),
such as, but not limited to, acetonitrile, glutaronitrile, adiponitrile, methoxyacetonitrile, and 3-methoxypropionitrile,
1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidone, N-methyloxazolidinone, N,N'-dimethylimidazolidinone, nitromethane, nitroethane, sulfolane, trimethyl phosphate, and dimethylsulfoxide and further polar aprotic solvents.

Other than this, the non-aqueous solvent may be one or more of unsaturated cyclic ester carbonates, because a stable protective film is thereby formed on the surface of the electrode at the time of charge and discharge, and the decomposition reaction of the electrolytic solution is therefore suppressed.

The alkali metal salt of the non-aqueous-electrolyte may contain, for example, one or more salts, such as lithium salt. However, the electrolyte salt may contain, for example, salt other than the lithium salt. Examples of "salt other than the lithium salt" may include light metal salt other than lithium salt.

In an embodiment, the alkali metal salt is one or more lithium salts (Li salts).

Examples of the lithium salt may include lithium hexafluorophosphate (LiPF), lithium tetrafluoroborate ($LiBF_4$), lithium perchlorate ($LiClO_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithiumhexafluorosilicate ($Li_2SiF_6$), lithium chloride (LiCl), and lithium bromide (LiBr). However, specific examples of the lithium salt are not limited to the compounds described above.

In an embodiment, the non-aqueous electrolyte includes at least one further additive or compound, such as, but not limited to, carbonate(s) and nitrile(s), preferably at least one further additive or compound, such as, but not limited to, cyclic carbonate and nitrile,
more preferably at least one further additive or compound, such as, but not limited to,
ethylene carbonate (EC), propylene carbonate (PC), butylene carbonate (BC), vinylene carbonate (VC), fluoroethylene carbonate (FEC), trifluoromethylethylene carbonate,
acetonitrile, glutaronitrile, adiponitrile, methoxyacetonitrile, and 3-methoxypropionitrile, adipic acid dinitrile, sebacic acid dinitrile, malonic dinitrile and succinonitrile.

In an embodiment, the non-aqueous electrolyte according to the disclosure is a liquid or polymer-gel electrolyte.

As discussed above, the disclosure provides the use of the non-aqueous electrolyte in an electrochemical device,
such as, but not limited to, a secondary battery (such as a secondary Li-ion battery), a super capacitor.

As discussed above, the disclosure provides the use of the non-aqueous electrolyte in an electric device,
such as, but not limited to, a battery pack, an electric vehicle, an electric power storage system, an electric power tool, an electronic apparatus.

As discussed above, the disclosure provides a secondary battery.

A secondary battery according to the disclosure includes:
a cathode,
an anode, and
a non-aqueous electrolyte according to the disclosure.

In an embodiment, the secondary battery according to the disclosure is a secondary Li-ion battery.

In an embodiment, the cathode is an intercalation type cathode including one or more kinds of active cathode material which is capable of reversible inserting and extracting Li ions,
preferably including layered, spinel or olivine structure type transition metal oxide(s), such as, but not limited to, metal(s) selected from Co, Ni, Mn, V, Fe and combinations thereof.

The cathode material may be preferably a lithium-containing compound, because high energy density is obtained thereby. Examples of the lithium-containing compound may include a lithium-transition-metal composite oxide and a lithium-transition-metal-phosphate compound. The lithium-transition-metal composite oxide is an oxide containing lithium and one or more transition metal elements as constituent elements. The lithium-transition-metal-phosphate compound is a phosphate compound containing lithium and one or more transition metal elements as constituent elements. In particular, the transition metal element may be preferably one or more of cobalt (Co), nickel (Ni), manganese (Mn), iron (Fe), and the like, because a higher voltage is obtained thereby. The chemical formula thereof may be expressed, for example, by $Li_xM1O_2$ or by $Li_yM2PO_4$. In the formulas, M1 and M2 represent one or more transition metal elements. Values of x and y vary according to the charge and discharge state, but may be generally in the range of $0.05 \leq x \leq 1.10$ and $0.05 \leq y \leq 1.10$.

Examples of the lithium-transition-metal composite oxide may include $LiCoO_2$, $LiNiO_2$ and a lithium-nickel-based composite oxide represented by the formula:

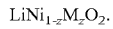

$LiNi_{1-z}M_zO_2$.

Specific examples of the lithium-transition-metal-phosphate compound may include $LiFePO_4$ and $LiFe_{1-u}Mn_uPO_4$ (u<1), because a high battery capacity is thereby obtained and superior cycle characteristics are also obtained.

(M is one or more of cobalt, manganese, iron, aluminum, vanadium (V), tin (Sn), magnesium (Mg), titanium (Ti), strontium (Sr), calcium (Ca), zirconium (Zr), molybdenum (Mo), technetium (Tc), ruthenium (Ru), tantalum (Ta), tungsten (W), rhenium (Re), ytterbium (Yb), copper (Cu), zinc (Zn), barium (Ba), boron (B), chromium (Cr), silicon (Si), gallium (Ga), phosphorus (P), antimony (Sb), and niobium (Nb). z satisfies 0.005<z<0.5.)

In an embodiment, the anode is an intercalation type anode including one or more kinds of active anode material which is capable of reversible inserting and extracting Li ions,
such as, but not limited to, graphitizable carbon, non-graphitizable carbon, graphite, Li-metal, Si, Si oxide, Si alloy, Sn, Sn oxide, $LiTi_2O_5$, Sn alloy.

Examples of the carbon material may include graphitizable carbon, non-graphitizable carbon, and graphite. However, the spacing of (002) plane in the non-graphitizable carbon may be preferably equal to or greater than 0.37 nm, and the spacing of (002) plane in graphite may be preferably equal to or smaller than 0.34 nm. More specifically, examples of the carbon material may include pyrolytic carbons, cokes, glassy carbon fibers, an organic polymer compound fired body, activated carbon, and carbon blacks. Examples of the cokes may include pitch coke, needle coke, and petroleum coke. The organic polymer compound fired body is obtained by firing (carbonizing) a polymer compound such as phenol resin and furan resin at appropriate temperature. In addition thereto, the carbon material may be low crystalline carbon heat-treated at a temperature of about 1000° C. or less, or may be amorphous carbon. It is to be noted that the shape of the carbon material may be any of a fibrous shape, a spherical shape, a granular shape, and a scale-like shape.

Moreover, the anode material may be, for example, a material (a metal-based material) containing one or more of metal elements and metalloid elements as constituent elements, because high energy density is thereby achieved.

The metal-based material may be a simple substance, alloy, or a compound, may be two or more thereof, or may have one or more phases thereof in part or all thereof. "Alloy" includes a material containing one or more metal elements and one or more metalloid elements, in addition to a material configured of two or more metal elements. Further, the "alloy" may contain a non-metallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements capable of forming an alloy with lithium. Specific examples thereof may include magnesium, boron, aluminium, gallium, indium (In), silicon, germanium (Ge), tin (Sn), lead (Pb), bismuth (Bi), cadmium (Cd), silver (Ag), zinc, hafnium (HO, zirconium, yttrium (Y), palladium (Pd), and platinum (Pt).

In particular, silicon, tin, or both may be preferable, because silicon and tin have superior ability of inserting and extracting lithium, and therefore achieve high energy density.

A material containing silicon, tin, or both as constituent elements may be any of a simple substance, alloy, and a compound of silicon, may be any of a simple substance, alloy, and a compound of tin, may be two or more thereof, or may have one or more phases thereof in part or all thereof. It is to be noted that "simple substance" described herein merely refers to a simple substance in a general sense (a small amount of impurity may be therein contained), and does not necessarily refer to a purity 100% simple substance.

The alloys of silicon may contain, for example, one or more of elements such as tin, nickel, copper, iron, cobalt, manganese, zinc, indium, silver, titanium, germanium, bismuth, antimony, and chromium, as a constituent element other than silicon. The compounds of silicon may contain, for example, one or more of carbon (C), oxygen (O), and the like as constituent elements other than Si. It is to be noted that the compounds of silicon may contain, for example, one or more of the series of elements described for the alloys of silicon, as constituent elements other than silicon.

Specific examples of the alloys of silicon and the compounds of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≤2), and LiSiO. v in $SiO_v$ may be in a range of 0.2<v<1.4.

The alloys of tin may contain, for example, one or more of elements such as silicon, nickel, copper, iron, cobalt, manganese, zinc, indium, silver, titanium, germanium, bismuth, antimony, and chromium, as constituent elements other than tin. The compounds of tin may contain, for example, one or more of elements such as carbon and oxygen as constituent elements other than tin. It is to be noted that the compounds of tin may contain, for example, one or more of the series of elements described for the alloys of tin, as constituent elements other than tin.

Figure 2:
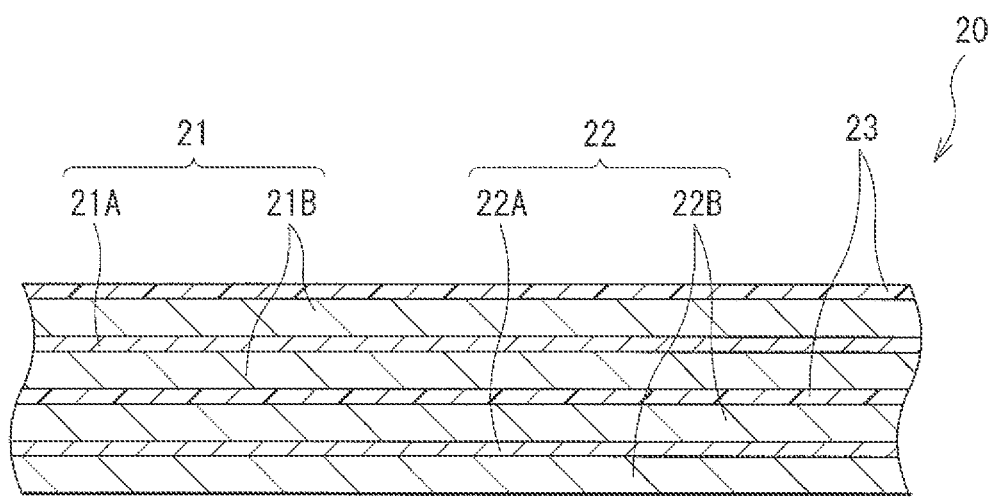
FIG. 2 is a cross-sectional view illustrating an enlarged part of a spirally wound electrode body illustrated in FIG. 1.

FIG. 1 and FIG. 2 each illustrate a cross-sectional configuration of a secondary battery of an embodiment of the present application (in particular a cylindrical type battery). FIG. 2 illustrates an enlarged part of a spirally wound electrode body 20 illustrated in FIG. 1.

The secondary battery described here as an embodiment is a lithium secondary battery (a lithium ion secondary battery) in which a capacity of an anode 22 is obtained by insertion and extraction of lithium as an electrode reactant.

The secondary battery may be, for example, a secondary battery of a so-called cylindrical type. The secondary battery may contain a pair of insulating plates 12 and 13 and a spirally wound electrode body 20 inside a battery can 11 in the shape of a substantially-hollow cylinder. In the spirally wound electrode body 20, for example, a cathode 21 and the anode 22 are laminated with a separator 23 in between and are spirally wound.

The battery can 11 may have a hollow structure in which one end of the battery can 11 is closed and the other end of the battery can 11 is opened. The battery can 11 may be made, for example, of iron (Fe), aluminium (Al), alloy thereof, or the like. The surface of the battery can 11 may be plated with nickel (Ni) or the like. The pair of insulating plates 12 and 13 is arranged to sandwich the spirally wound electrode body 20 in between, and to extend perpendicularly to the spirally wound periphery surface of the spirally wound electrode body 20.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made, for example, of a material similar to that of the battery can 11. The safety valve mechanism 15 and the PTC device 16 are provided inside the battery cover 14. The safety valve mechanism 15 is electrically connected to the battery cover 14 via the PTC device 16. In the safety valve mechanism 15, in the case where the internal pressure becomes a certain level or higher by internal short circuit, external heating, or the like, a disk plate 15A inverts to cut electric connection between the battery cover 14 and the spirally wound electrode body 20. The PTC device 16 prevents abnormal heat generation resulting from a large current. As temperature rises, resistance of the PTC device 16 is increased accordingly. The gasket 17 may be made, for example, of an insulating material. The surface of the gasket 17 may be coated with asphalt.

In the center of the spirally wound electrode body 20, for example, a center pin 24 may be inserted. However, the center pin 24 may not be inserted in the center of the spirally wound electrode body 20. For example, a cathode lead 25 made of a conductive material such as aluminium may be connected to the cathode 21. For example, an anode lead 26 made of a conductive material such as nickel may be connected to the anode 22. For example, the cathode lead 25 may be attached to the safety valve mechanism 15 by welding or the like, and may be electrically connected to the battery cover 14. For example, the anode lead 26 may be attached to the battery can 11 by welding or the like, and may be electrically connected to the battery can 11.

The cathode 21 has a cathode active material layer 21B on a single surface or both surfaces of a cathode current collector 21A. The cathode current collector 21A may be made, for example, of a conductive material such as aluminium, nickel, or stainless steel. The cathode active material layer 21B contains, as a cathode active material, one or more of cathode materials capable of inserting and extracting lithium. It is to be noted that the cathode active material layer 21B may further contain one or more of other materials such as a cathode binder and a cathode electric conductor.

The anode 22 has an anode active material layer 22B on a single surface or both surfaces of an anode current collector 22A.

Figure 3:
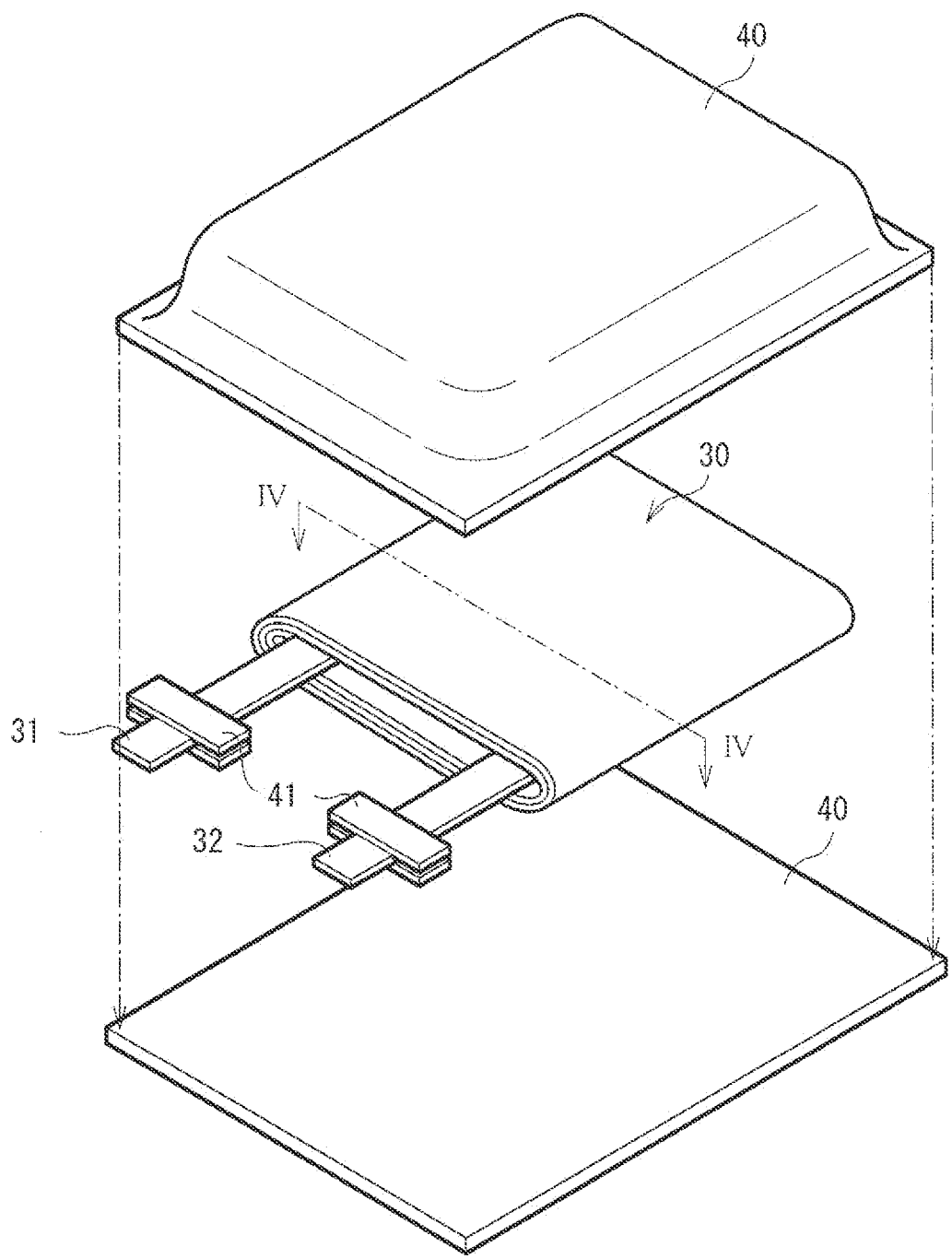
FIG. 3 is a perspective view illustrating a configuration of another secondary battery (of a laminated film type) that uses the non-aqueous electrolytic solution according to an embodiment of the present disclosure.
Figure 4:
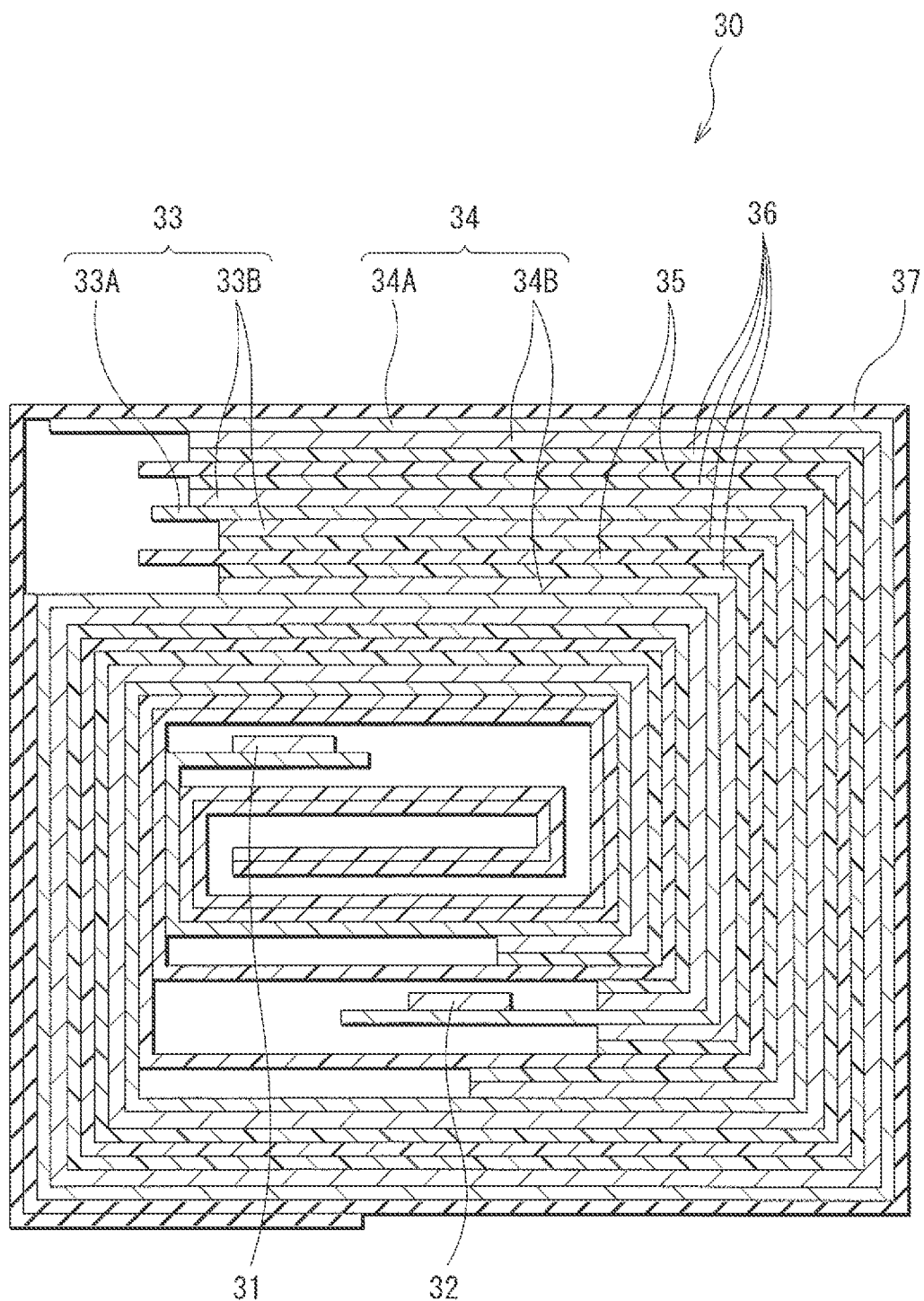
FIG. 4 is a cross-sectional view of a spirally wound electrode body taken along a line IV-IV illustrated in FIG. 3.

FIG. 3 illustrates an exploded perspective configuration of another secondary battery of an embodiment of the present application. FIG. 4 illustrates an enlarged cross-section taken along a line IV-IV of a spirally wound electrode body 30 illustrated in FIG. 3. In the following description, the elements of the cylindrical-type secondary battery described above will be used where appropriate.

The secondary battery described here is a so-called laminated-film-type lithium ion secondary battery. The secondary battery contains the spirally wound electrode body 30 in a film-like outer package member 40. In the spirally wound electrode body 30, a cathode 33 and an anode 34 are laminated with a separator 35 and an electrolyte layer 36 in between and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be made, for example, of an electrically-conductive material such as aluminium, and the anode lead 32 may be made, for example, of an electrically-conducive material such as copper, nickel, and stainless steel. These electrically-conductive materials may be in the shape of, for example, a thin plate or mesh.

The outer package member 40 may be a laminated film in which, for example, a fusion bonding layer, a metal layer, and a surface protective layer are laminated in this order. In the laminated film, outer edges of the two film-shaped fusion bonding layers are fusion bonded so that the fusion bonding layers are opposed to the spirally wound electrode body 30. However, the two films may be bonded to each other by an adhesive, or the like. Examples of the fusion bonding layer may include a film made of one or more of polyethylene, polypropylene, and the like. Examples of the metal layer may include an aluminium foil. Examples of the surface protective layer may include a film made of one or more of nylon, polyethylene terephthalate, and the like.

In particular, the outer package member 40 may be preferably an aluminium laminated film in which a polyethylene film, an aluminium foil, and a nylon film are laminated in this order. However, the outer package member 40 may be a laminated film having other laminated structure, a polymer film such as polypropylene, or a metal film.

For example, a close-attachment film 41 to prevent outside air intrusion may be inserted between the outer package member 40 and the cathode lead 31 and between the outer package member 40 and the anode lead 32. The close-attachment film 41 is made of a material having close-attachment characteristics with respect to the cathode lead 31 and the anode lead 32. Examples of the material having close-attachment characteristics may include polyolefin resin that may include one or more of polyethylene, polypropylene, modified polyethylene, and modified polypropylene.

The cathode 33 may have, for example, a cathode active material layer 33B on one surface or both surfaces of a cathode current collector 33A. The anode 34 may have, for example, an anode active material layer 34B on one surface or both surfaces of an anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively. The configuration of the separator 35 may be, for example, similar to the configuration of the separator 23.

The electrolyte layer 36 includes electrolytic solution and a polymer compound, and the electrolytic solution is held by the polymer compound. The electrolyte layer 36 is a so-called gel electrolyte, because thereby, high ion conductivity (for example, 1 mS/cm or more at room temperature) is obtained and liquid leakage of the electrolytic solution is prevented. The electrolyte layer 36 may further contain other material such as an additive as necessary.

The polymer compound may include, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, a copolymer of vinylidene fluoride and hexafluoropropylene, and the like. In particular, polyvinylidene fluoride or the copolymer of vinylidene fluoride and hexafluoro propylene may be preferable, and polyvinylidene fluoride may be more preferable, because such a polymer compound is electrochemically stable.

For example, the configuration of the electrolytic solution may be similar to the configuration of the electrolytic solution of the cylindrical-type secondary battery. However, in the electrolyte layer 36 as a gel electrolyte, the solvent of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It should be understood that the electrolytic solution may be used as it is instead of the gel electrolyte layer 36. In this case, the spirally wound electrode body 30 is impregnated with the electrolytic solution.

As discussed above, the disclosure provides an electric device including a secondary battery of the disclosure.

The electric device is a battery pack, an electric vehicle, an electric power storage system, an electric power tool or an electronic apparatus.

Figure 5:
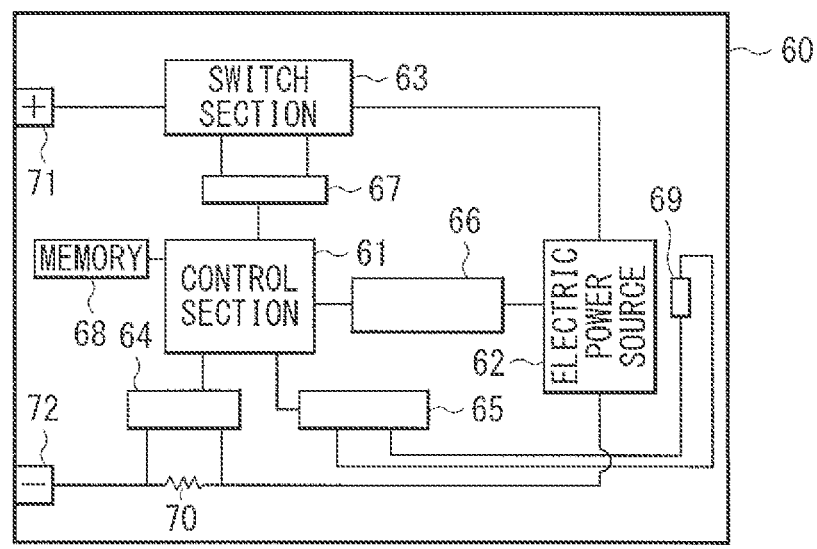
Figure 6:
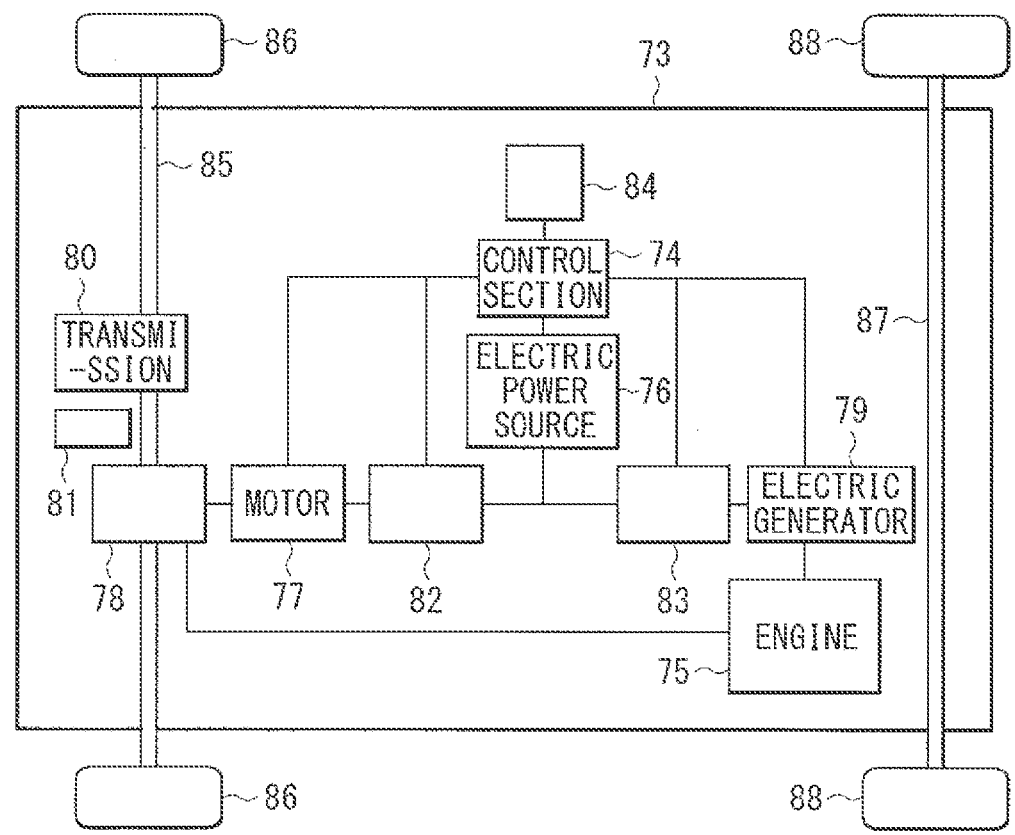
FIG. 6 is a block diagram illustrating a configuration of an application example (an electric vehicle) of the secondary battery according to an embodiment of the present disclosure. For example, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.
Figure 7:
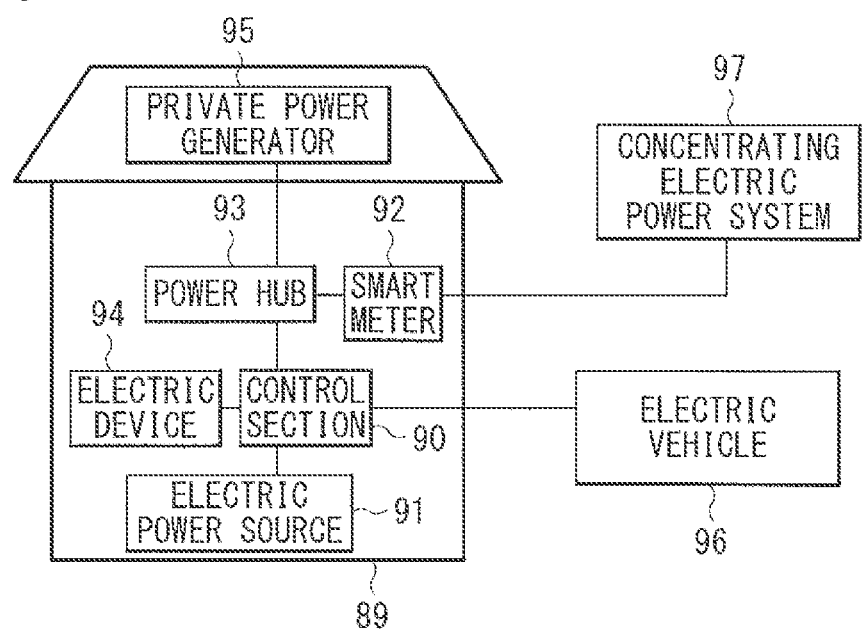
FIG. 7 is a block diagram illustrating a configuration of an application example (an electric power storage system) of the secondary battery according to an embodiment of the present disclosure. For example, the electric power storage system may include a control section 90, an electric power source 91, a smart meter 92, and a power hub 93 inside a house 89 such as a general residence and a commercial building.
Figure 8:
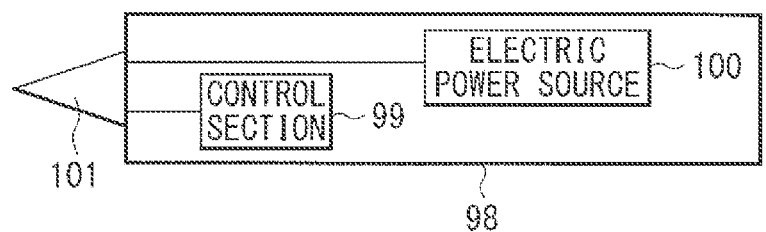
FIG. 8 is a block diagram illustrating a configuration of an application example (an electric power tool) of the secondary battery according to an embodiment of the present disclosure. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

FIG. 5 is a block diagram illustrating a battery pack.
FIG. 6 is a block diagram illustrating an electric vehicle.
FIG. 7 is a block diagram illustrating an electric power storage system.
FIG. 8 is a block diagram illustrating an electric power tool.

In the following, some embodiments of the disclosure are described in detail with reference to the drawings.

First, description is given of a secondary battery-use electrolytic solution (hereinafter simply referred to as "electrolytic solution") according to an embodiment of the disclosure.

The electrolytic solution described herein is mainly used for a secondary battery. The kind of secondary battery is not particularly limited, but non-limiting examples of the secondary battery may include a lithium-ion secondary battery and a lithium metal secondary battery that use lithium as an electrode reactant. The "electrode reactant" is a material involving electrode reaction (charge-discharge reaction). It is to be noted that each of the lithium-ion secondary battery and the lithium metal secondary battery is described in detail later.

First, description is given of a configuration of the electrolytic solution.

(Cyano Compound)

The electrolytic solution includes a cyano compound. The cyano compound includes one or more of compounds represented by the following chemical formula (1).

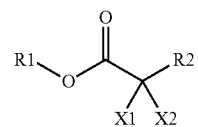

(1)

where R1 is one of a monovalent hydrocarbon group and a monovalent halogenated hydrocarbon group, R2 is one of a cyano group, a monovalent chain hydrocarbon cyano group, and a monovalent halogenated chain hydrocarbon cyano group, X1 is a halogen group, X2 is one of a hydrogen group, a halogen group, a monovalent hydrocarbon group, and a monovalent halogenated hydrocarbon group.

As can be seen from the formula (1), the cyano compound described herein is a compound including an ester bond (R1-O—C(=O)—), a halogen group (—X1), and one of a cyano group and a cyano group-containing group (—R2).

The electrolytic solution includes the cyano compound, which improves chemical stability of the electrolytic solution, thereby suppressing decomposition reaction of the electrolytic solution. This suppresses generation of gas resulting from the decomposition reaction of the electrolytic solution and suppresses an increase in electrical resistance, thereby improving battery characteristics of the secondary battery using the electrolytic solution. In this case, even if the secondary battery is used (charged and discharged) specifically in a hostile environment such as a high temperature environment and the secondary battery is stored in the hostile environment, decomposition reaction of the electrolytic solution is sufficiently suppressed.

Details of a configuration of the cyano compound are as described below.

(R1)

The R1 is one of a monovalent hydrocarbon group and a monovalent halogenated hydrocarbon group, as described above.

(Monovalent Hydrocarbon Group)

The "monovalent hydrocarbon group" is a generic name of a monovalent group including carbon and hydrogen, and may be one of a straight-chain group, a branched group having one or more side chains, and a cyclic group having one or more rings, or a group including two or more thereof. The monovalent hydrocarbon group may include one or more carbon-carbon unsaturated bonds, or may not include the carbon-carbon unsaturated bond. Non-limiting examples of the carbon-carbon unsaturated bond may include a carbon-carbon double bond and a carbon-carbon triple bond.

Specific but non-limiting examples of the monovalent hydrocarbon group may include an alkyl group, an alkenyl group, an alkynyl group, a cycloalkyl group, an aryl group, and a binding group.

The "binding group" may be a monovalent group in which two or more of an alkyl group, an alkenyl group, an alkynyl group, an cycloalkyl group, and an aryl group are bound to one another. Non-limiting examples of the binding group may include a monovalent group in which an alkyl group and an alkenyl group are bound to each other, a monovalent group in which an alkyl group and an alkynyl group are bound to each other, a monovalent group in which an alkenyl group and an alkynyl group are bound to each other, a monovalent group in which an alkyl group and an cycloalkyl group are bound to each other, a monovalent group in which an alkyl group and an aryl group are bound to each other, and a monovalent group in which a cycloalkyl group and an aryl group are bound to each other.

The kind of the alkyl group is not particularly limited; however, non-limiting examples of the alkyl group may include a methyl group, an ethyl group, a propyl group, a butyl group, a pentyl group, a hexyl group, a heptyl group, an octyl group, a nonyl group, and a decyl group.

The kind of the alkenyl group is not particularly limited; however, non-limiting examples of the alkenyl group may include an ethenyl group, a propenyl group, a butenyl group, a pentenyl group, a hexenyl group, a heptenyl group, an octenyl group, a nonenyl group, and a decenyl group.

The kind of the alkynyl group is not particularly limited; however, non-limiting examples of the alkynyl group may include an ethynyl group, a propynyl group, a butynyl group, a pentynyl group, a hexynyl group, a heptynyl group, an octynyl group, a nonynyl group, and a decynyl group.

The kind of the cycloalkyl group is not particularly limited; however, non-limiting examples of the cycloalkyl group may include a cyclopropyl group, a cyclobutyl group, a cyclopentyl group, a cyclohexyl group, and a cyclodecyl group.

The kind of the aryl group is not particularly limited; however, non-limiting examples of the aryl group may include a phenyl group and a naphthyl group.

The number of carbons in the alkyl group is not particularly limited, but may be, for example from 1 to 4. The number of carbons in each of the alkenyl group and the alkynyl group is not particularly limited, but may be, for example, from 2 to 4. The number of carbons in each of the cycloalkyl group and the aryl group is not particularly limited, but may be, for example, from 6 to 10. This improves solubility, compatibility, and other properties of the cyano compound.

The kind of the binding group is not particularly limited; however, non-limiting examples of the binding group may include a benzyl group (Monovalent Halogenated Hydrocarbon Group)

The "monovalent halogenated hydrocarbon group" is a group in which one or more hydrogen groups in the foregoing monovalent hydrocarbon group are substituted by a halogen group. The halogen group included in the monovalent halogenated hydrocarbon group may be, for example, one or more of a fluorine group, a chlorine group, a bromine group, and an iodine group.

In particular, the halogen group included in the monovalent halogenated hydrocarbon group may be preferably a fluorine group, which further improves chemical stability of the electrolytic solution, thereby further suppressing decomposition reaction of the electrolytic solution.

(Preferable R1)

In particular, R1 may be preferably an alkyl group. The number of carbons in the alkyl group may be, for example, as described above, which further improves chemical stability of the electrolytic solution, thereby further suppressing decomposition reaction of the electrolytic solution.

(R2)

R2 is one of a cyano group, a monovalent chain hydrocarbon cyano group, and a monovalent halogenated chain hydrocarbon cyano group, as described above. Each of the monovalent chain hydrocarbon cyano group and the monovalent halogenated chain hydrocarbon cyano group described herein is the "cyano group-containing group" described above.

(Monovalent Chain Hydrocarbon Cyano Group)

The "monovalent chain hydrocarbon cyano group" is a generic name of a group in which one or more cyano groups are introduced into a monovalent chain hydrocarbon group, as described above. In other words, the monovalent chain hydrocarbon cyano group is a group in which one or more hydrogen groups in a monovalent chain hydrocarbon group are substituted by one or more cyano groups. It is to be noted that a position where the one or more cyano groups are introduced into the monovalent chain hydrocarbon group is not particularly limited, and the one or more cyano groups may be introduced into one or both of a middle site of the monovalent chain hydrocarbon group and an end of the monovalent chain hydrocarbon group.

The "monovalent chain hydrocarbon group" described herein is a generic name of a monovalent chain group including carbon and hydrogen, as described above, and may be a straight-chain group or a branched group having one or more side chains. The monovalent chain hydrocarbon group may include one or more carbon-carbon unsaturated bonds, or may not include the carbon-carbon unsaturated bond. Details of the carbon-carbon unsaturated bond are as described above.

In other words, non-limiting examples of the monovalent chain hydrocarbon group may include an alkyl group, an alkenyl group, an alkynyl group, and a chain binding group. Details of each of the alkyl group, the alkenyl group, and the alkynyl group are as described above.

The "chain binding group" is a monovalent group in which two or more of an alkyl group, an alkenyl group, and alkynyl group are bound to one another. Non-limiting examples of the chain binding group may include a monovalent group in which an alkyl group and an alkenyl group are bound to each other, a monovalent group in which an alkyl group and an alkynyl group are bound to each other, and a monovalent group in which an alkyl group, an alkenyl group, and an alkynyl group are bound to one another.

Specific but non-limiting examples of the group in which one or more cyano groups are introduced into an alkyl group may include a group in which one cyano group is introduced into an end of a methyl group, a group in which one cyano group is introduced into a middle site of an methyl group, a group in which one cyano group is introduced into an end of an ethyl group, a group in which one cyano group is introduced into a middle site of an ethyl group, a group in which one cyano group is introduced into an end of a propyl group, a group in which one cyano group is introduced into a middle site of a propyl group, a group in which one cyano group is introduced into an end of a butyl group, and a group in which one cyano group is introduced into a middle site of a butyl group. A case where the number of introduced cyano groups is one is described herein as an example; however, the number of introduced cyano groups may be two or more.

Non-limiting examples of the group in which one or more cyano groups are introduced into an alkenyl group may include a group in which one cyano group is introduced into an end of an ethenyl group, a group in which one cyano group is introduced into a middle site of an ethenyl group, a group in which one cyano group is introduced into an end of a propenyl group, a group in which one cyano group is introduced into a middle of a propenyl group, a group in which one cyano group is introduced into an end of a butenyl group, and a group in which one cyano group is introduced into a middle site of a butenyl group. A case where the number of introduced cyano groups is one is described herein as an example; however, the number of introduced cyano groups may be two or more.

Non-limiting examples of the group in which one or more cyano groups are introduced into an alkynyl group may include a group in which one cyano group is introduced into an end of an ethynyl group, a group in which one cyano group is introduced into a middle site of an ethynyl group, a group in which one cyano group is introduced into an end of a propynyl group, a group in which one cyano group is introduced into a middle site of a propynyl group, a group in which one cyano group is introduced into an end of a butynyl group, and a group in which one cyano group is introduced into a middle site of a butynyl group. A case where the number of introduced cyano groups is one is described herein as an example; however, the number of introduced cyano groups may be two or more.

Details of the number of carbons in each of the alkyl group, the alkenyl group, and the alkynyl group may be, for example, as described above.

Non-limiting examples of the group in which one or more cyano groups are introduced into a chain binding group may include a group in which one cyano group is introduced into an end of a monovalent group in which an ethenyl group and an ethynyl group are bound to each other, and a group in which one cyano group is introduced into a middle of a monovalent group in which an ethenyl group and an ethynyl group are bound to each other. A case where the number of introduced cyano groups is one is described herein as an example; however, the number of introduced cyano groups may be two or more.

(Monovalent Halogenated Chain Hydrocarbon Cyano Group)

The "monovalent halogenated chain hydrocarbon cyano group" is a group in which one or more hydrogen groups in a monovalent chain hydrocarbon cyano group is substituted by a halogen group, as described above. Details of the halogen group included in a monovalent halogenated hydrocarbon cyano group may be similar to, for example, details of the halogen group included in the foregoing monovalent halogenated hydrocarbon group. It goes without saying that the halogen group included in the monovalent halogenated hydrocarbon cyano group may be preferably a fluorine group.

(Preferable R2)

In particular, R2 may be preferably a group in which one or more cyano groups are introduced into an alkyl group, and more preferably a group in which one cyano group is introduced into an end of an alkyl group, which suppresses induced interaction between an ester bond and the cyano group. This further improves chemical stability of the electrolytic solution, thereby further suppressing decomposition reaction of the electrolytic solution.

In this case, the number of carbons in the alkyl group into which one or more cyano groups are introduced is not particularly limited. In particular, the number of carbons in the alkyl group may be preferably as large as possible. Specifically, the number of carbons in the alkyl group may be preferably 3 or more, and more preferably 4 or more. The larger the number of carbons in the alkyl group is, the further the induced interaction between the ester bond and the cyano group is suppressed. This further improves chemical stability of the electrolytic solution, thereby further suppressing decomposition reaction of the electrolytic solution. Note that the number of carbons in the alkyl group may be preferably 5 or less, which secures solubility, compatibility, and other properties of the cyano compound.

(X1)

X1 is a halogen group, as described above. The halogen group may be, for example, one of a fluorine group, a chlorine group, a bromine group, and an iodine group.

(Preferable X1)

In particular, X1 may be preferably a fluorine group, which further improves chemical stability of the electrolytic solution, thereby further suppressing decomposition reaction of the electrolytic solution.

(X2)

X2 is one of a hydrogen group, a halogen group, a monovalent hydrocarbon group, and a monovalent halogenated hydrocarbon group, as described above. Details of the halogen group are similar to those described in a case of X1. Moreover, details of each of the monovalent hydrocarbon group and the monovalent halogenated hydrocarbon group are as described above.

(Preferable X2)

In particular, X2 may be preferably a hydrogen group, which further improves chemical stability of the electrolytic solution, thereby further suppressing decomposition reaction of the electrolytic solution.

(Specific Examples of Cyano Compound)

The kind of the cyano compound is not particularly limited; however, non-limiting examples of the cyano compound may include respective compounds represented by the following chemical formulas (1-1) to (1-18).

(1-1)

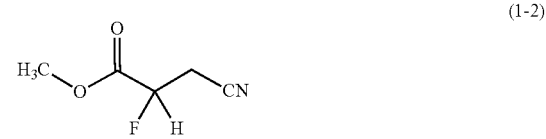

(1-2)

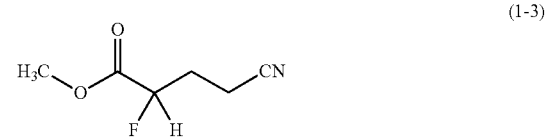

(1-3)

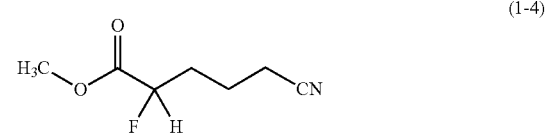

(1-4)

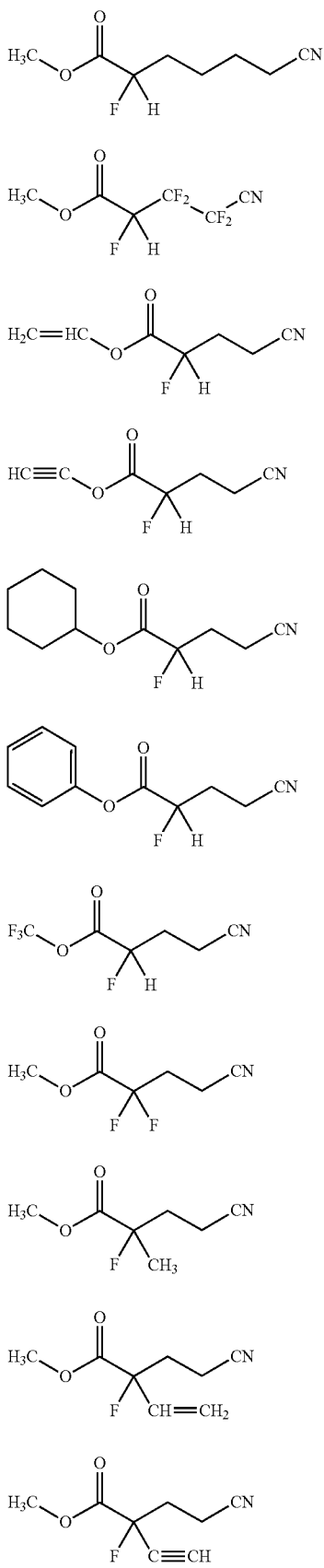
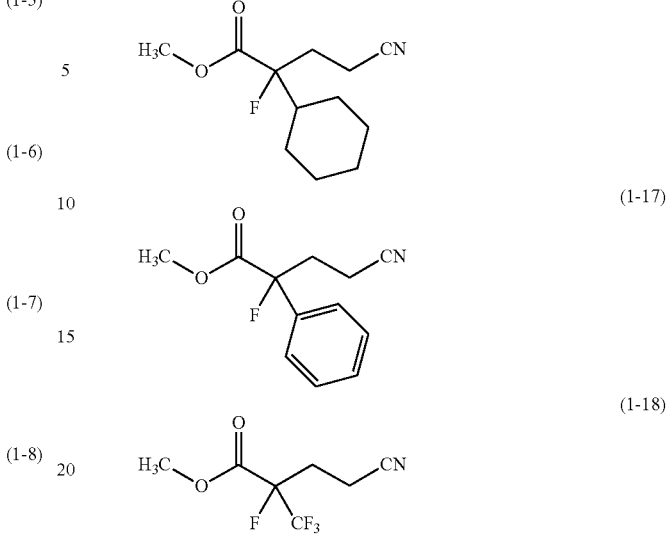

Herein, as described above, R1, R2, X1, and X2 in the formula (1) may be preferably an alkyl group, a group in which one cyano group is introduced into an end of an alkyl group, a fluorine group, and an hydrogen group, respectively.

For this reason, in particular, the cyano compound may be preferably respective compounds represented by the formulas (1-2) to (1-5), more preferably the respective compounds represented by the formulas (1-4) and (1-5), and still more preferably the compound represented by the formula (1-5), which further improves chemical stability of the electrolytic solution, thereby further suppressing decomposition reaction of the electrolytic solution.

A content of the cyano compound in the electrolytic solution is not particularly limited; however, the content of the cyano compound in the electrolytic solution may be specifically preferably within a range from 0.1 wt % to 5 wt % both inclusive. In this case, the content of the cyano compound may be more preferably within a range from 0.5 wt % to 5 wt % both inclusive. Alternatively, the content of the cyano compound may be more preferably within a range from 0.1 wt % to 3 wt % both inclusive, and still more preferably within a range from 0.1 wt % to 1 wt % both inclusive. On the basis of both appropriate ranges, the content of the cyano compound may be more preferably within a range from 0.5 wt % to 3 wt % both inclusive, and still more preferably within a range from 0.5 wt % to 1 wt % both inclusive, which further improves chemical stability of the electrolytic solution while securing solubility, compatibility, and other properties of the cyano compound.

It should be understood that in a case where the electrolytic solution includes two or more cyano compounds, the "content of the cyano compound" described above is a total sum of respective contents of the cyano compounds.

It should be understood that the electrolytic solution may include one or more other materials together with the foregoing cyano compound.

The other materials may include, for example, one or more of solvents such as non-aqueous solvents (organic solvents). An electrolytic solution including the non-aqueous solvent is a so-called non-aqueous electrolytic solution.

Non-limiting examples of the non-aqueous solvent may include a carbonate ester, a chain carboxylate ester, a lactone, and a nitrile (mononitrile) compound, which make it possible to achieve high battery capacity, superior cycle characteristics, superior storage characteristics, and other characteristics.

The carbonate ester may include, for example, one or both of a cyclic carbonate ester and a chain carbonate ester. Specific but non-limiting examples of the cyclic carbonate ester may include ethylene carbonate, propylene carbonate, and butylene carbonate. Specific but non-limiting examples of the chain carbonate ester may include dimethyl carbonate, diethyl carbonate, ethyl methyl carbonate, and methylpropyl carbonate. Specific but non-limiting examples of the chain carboxylate ester may include methyl acetate, ethyl acetate, methyl propionate, ethyl propionate, propyl propionate, methyl butyrate, methyl isobutyrate, methyl trimethylacetate, and ethyl trimethylacetate. Specific but non-limiting examples of the lactone may include γ-butyrolactone and γ-valerolactone. Specific but non-limiting examples of the nitrile compound may include acetonitrile, methoxyacetonitrile, and 3-methoxypropionitrile.

Other than the materials mentioned above, non-limiting examples of the non-aqueous solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethylsulfoxide. These solvents make it possible to achieve similar advantages.

In particular, the non-aqueous solvent may preferably include a carbonate ester. Specifically, the non-aqueous solvent may more preferably include one or more of ethylene carbonate, propylene carbonate, dimethyl carbonate, diethyl carbonate, and ethyl methyl carbonate. These materials make it possible to achieve high battery capacity, superior cycle characteristics, superior storage characteristics, and other characteristics.

More specifically, the carbonate ester may preferably include both the cyclic carbonate ester and the chain carbonate ester. In this case, a combination of a high-viscosity (high dielectric constant) solvent (having, for example, specific dielectric constant ε≥30) such as ethylene carbonate and propylene carbonate and a low-viscosity solvent (having, for example, viscosity 1 mPa·s) such as dimethyl carbonate, ethylmethyl carbonate, and diethyl carbonate may be more preferable. The combination allows for an improvement in the dissociation property of the electrolyte salt and ion mobility.

In particular, the non-aqueous solvent may preferably include one or more of an unsaturated cyclic carbonate ester, a halogenated carbonate ester, a sulfonate ester, an acid anhydride, a multivalent nitrile compound, a diisocyanate compound, and a phosphate ester, which improves chemical stability of the electrolytic solution.

The unsaturated cyclic carbonate ester is a cyclic carbonate ester having one or more carbon-carbon unsaturated bonds (carbon-carbon double bonds), and may be, for example, one or more of respective compounds represented by the following chemical formulas (2) to (4). A content of the unsaturated cyclic carbonate ester in the non-aqueous solvent is not particularly limited, but may be, for example, from 0.01 wt % to 10 wt % both inclusive.

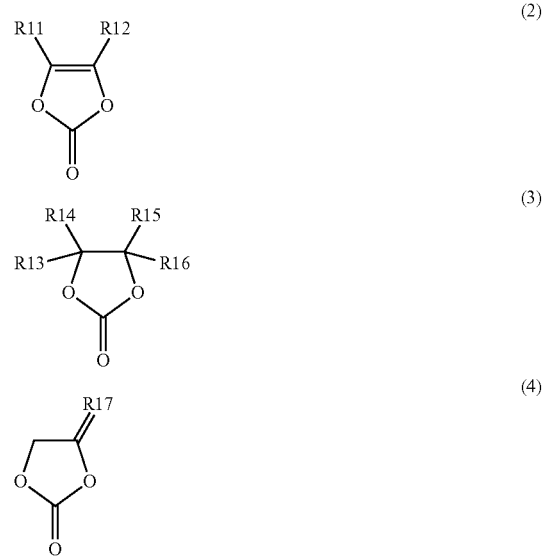

where each of R11 and R12 is one of a hydrogen group and an alkyl group, each of R13 to R16 is one of a hydrogen group, an alkyl group, a vinyl group, and an allyl group, one or more of R13 to R16 are one of the vinyl group and the allyl group, R17 is a group represented by =CR171R172, and each of R171 and R172 is one of a hydrogen group and an alkyl group.

The compound represented by the formula (2) is a vinylene carbonate-based compound. R11 and R12 may be groups of a same kind or groups of different kinds. Details of the alkyl group are as described above. Specific but non-limiting examples of the vinylene carbonate-based compound may include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, and 4,5-diethyl-1,3-dioxol-2-one. In addition, non-limiting examples of the vinylene carbonate-based compound may include 4-fluoro-1,3-dioxol-2-one, and 4-trifluoromethyl-1,3-dioxol-2-one.

The compound represented by the formula (3) is a vinyl ethylene carbonate-based compound. R13 to R16 may be groups of a same kind or groups of different kinds. It goes without saying that some of R13 to R16 may be groups of a same kind. Specific but non-limiting examples of the vinyl ethylene carbonate-based compound may include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one.

The compound represented by the formula (4) is a methylene ethylene carbonate-based compound. R171 and R172 may be groups of a same kind or groups of different kinds. Specific but non-limiting examples of the methylene ethylene carbonate-based compound may include methylene ethylene carbonate (4-methylene-1,3-dioxolane-2-one), 4,4-dimethyl-5-methylene-1,3-dioxolane-2-one, and 4,4-diethyl-5-methylene-1,3-dioxolane-2-one.

In addition, the unsaturated cyclic carbonate ester may be a catechol carbonate having a benzene ring.

The halogenated carbonate ester is a carbonate ester including one or more halogens as constituent elements, and may be, for example, one or both of respective compounds represented by the following chemical formulas (5) and (6). A content of the halogenated carbonate ester in the non-aqueous solvent is not particularly limited, but may be, for example, from 0.01 wt % to 10 wt % both inclusive.

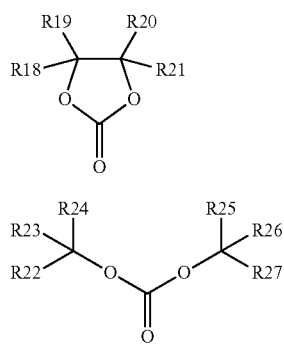

where each of R18 to R21 is one of a hydrogen group, a halogen group, an alkyl group, and a halogenated alkyl group, one or more of R18 to R21 is one of the halogen group and the halogenated alkyl group, each of R22 to R27 is one of a hydrogen group, a halogen group, an alkyl group, and a halogenated alkyl group, and one or more of R22 to R27 is one of the halogen group and the halogenated alkyl group.

The compound represented by the formula (5) is a cyclic halogenated carbonate ester. R18 to R21 may be groups of a same kind or groups of different kinds. It goes without saying that some of R18 to R21 may be groups of a same kind.

The kind of the halogen group is not particularly limited; however, in particular, the halogen group may be preferably one or more of a fluorine group, a chlorine group, a bromine group and an iodine group, and may be more preferably the fluorine group. It is to be noted that the number of halogen groups may be one or two or more.

Details of the alkyl group are as described above. The halogenated alkyl group is a group in which one or more hydrogen groups in the alkyl group are substituted (halogenated) by a halogen group. Details of the halogen group are as described above.

Specific but non-limiting examples of the cyclic halogenated carbonate ester may include respective compounds represented by the following formulas (5-1) to (5-21), which include geometric isomers. In particular, for example, 4-fluoro-1,3-dioxolane-2-one represented by the chemical formula (5-1) and 4,5-difluoro-1,3-dioxolane-2-one represented by the formula (5-3) may be preferable. It is to be noted that as 4,5-difluoro-1,3-dioxolane-2-one, a trans-isomer may be more preferable than a cis-isomer, which is easily available and makes it possible to achieve a higher effect.

(5-1)

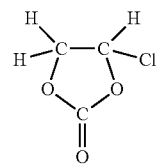

(5-2)

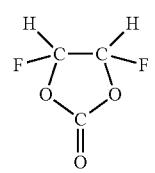

(5-3)

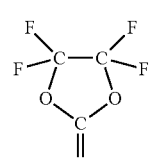

(5-4)

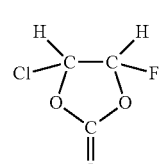

(5-5)

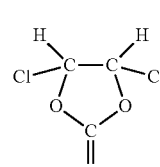

(5-6)

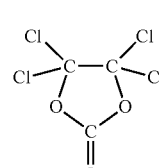

(5-7)

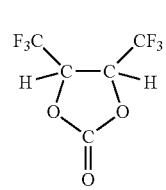

(5-8)

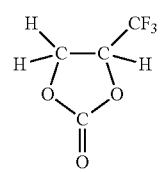

(5-9)

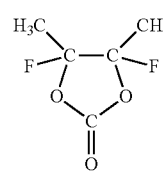

(5-10)

(5-11) 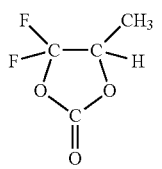

(5-12) 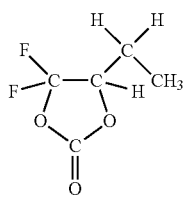

(5-13) 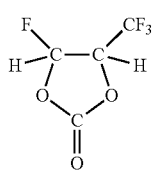

(5-14) 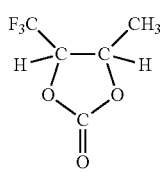

(5-15) 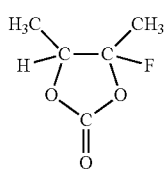

(5-16) 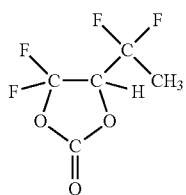

(5-17) 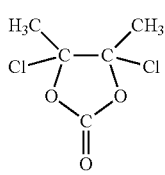

(5-18) 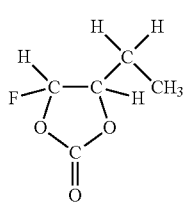

(5-19) 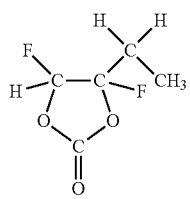

(5-20) 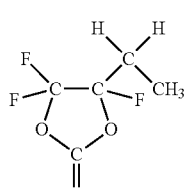

(5-21) 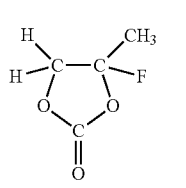

The compound represented by the formula (6) is a halogenated chain carbonate ester. R22 to R27 may be groups of a same kind or groups of different kinds. It goes without saying that some of R22 to R27 may be groups of a same kind.

Specific but non-limiting examples of the halogenated chain carbonate ester may include fluoromethyl methyl carbonate, bis(fluoromethyl) carbonate, and difluoromethyl methyl carbonate.

Non-limiting examples of the sulfonate ester may include a monosulfonate ester and a disulfonate ester. A content of the sulfonate ester in the non-aqueous solvent is not particularly limited, but may be, for example, from 0.01 wt % to 10 wt % both inclusive.

The monosulfonate ester may be a cyclic monosulfonate ester or a chain monosulfonate ester. Specific but non-limiting examples of the cyclic monosulfonate ester may include sultone such as 1,3-propane sultone and 1,3-propene sultone. Specific but non-limiting examples of the chain monosulfonate ester may include a compound in which a cyclic monosulfonate ester is cleaved at a middle site.

The disulfonate ester may be a cyclic disulfonate ester or a chain disulfonate ester. Specific but non-limiting examples of the cyclic disulfonate ester may include respective compounds represented by chemical formulas (7-1) to (7-3). Specific but non-limiting examples of the chain disulfonate ester may include a compound in which a cyclic disulfonate ester is cleaved at a middle site.

(7-1) 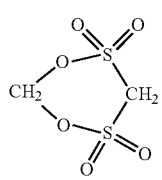

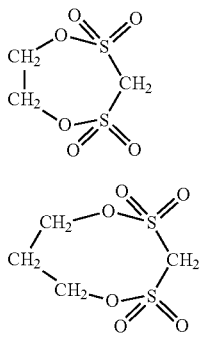

(7-2)

(7-3)

Non-limiting examples of the acid anhydride may include a carboxylic anhydride, a disulfonic anhydride, and a carboxylic-sulfonic anhydride. A content of the acid anhydride in the non-aqueous solvent is not particularly limited, but may be, for example, from 0.01 wt % to 10 wt % both inclusive.

Specific but non-limiting examples of the carboxylic anhydride may include succinic anhydride, glutaric anhydride, and maleic anhydride. Specific but non-limiting examples of the disulfonic anhydride may include ethanedisulfonic anhydride and propanedisulfonic anhydride. Specific but non-limiting examples of the carboxylic-sulfonic anhydride may include sulfobenzoic anhydride, sulfopropionic anhydride, and sulfobutyric anhydride.

The multivalent nitrile compound is a compound having two or more nitrile groups (—CN). Specific but non-limiting examples of the multivalent nitrile compound may include a compound represented by R28-(CN)$_n$, where R28 is an n-valent hydrocarbon group. A content of the multivalent nitrile compound in the non-aqueous solvent is not particularly limited, but may be, for example, from 0.01 wt % to 10 wt % both inclusive, and may be preferably from 0.5 wt % to 5 wt % both inclusive.

The n-valent hydrocarbon group may be, for example, a group in which a number n of hydrogen groups are eliminated from one of alkane, alkene, alkyne, alicyclic hydrocarbon, aromatic hydrocarbon, and a binding compound. The kind of alkane is not particularly limited; however, non-limiting examples of alkane may include methane, ethane, propane, and butane. The kind of alkene is not particularly limited; however, non-limiting examples of alkene may include ethylene (ethene), propylene (propene), and butene. The kind of alkyne is not particularly limited; however, non-limiting examples of alkyne may include ethyne (acetylene), propyne, and butyne. The kind of alicyclic hydrocarbon is not particularly limited; however, non-limiting examples of alicyclic hydrocarbon may include cyclopropane, cyclobutane, cyclopentane, and cyclohexane. The kind of aromatic hydrocarbon is not particularly limited; however, non-limiting examples of aromatic hydrocarbon may include benzene, naphthalene, anthracene, biphenyl, and terphenyl.

Specific but non-limiting examples of the multivalent nitrile compound may include succinonitrile (NC—C$_2$H$_4$—CN), glutaronitrile (NC—C$_3$H(—CN), adiponitrile (NC—C$_4$H$_8$—CN), sebaconitrile (NC—C$_8$H$_{10}$—CN), and phthalonitrile (NC—C$_6$H$_4$CN).

Non-limiting examples of the diisocyanate compound may include a compound represented by OCN—R29-NCO, where R29 is one of an alkylene group and an arylene group. A content of the diisocyanate compound in the non-aqueous solvent is not particularly limited, but may be, for example, from 0.1 wt % to 10 wt % both inclusive.

Details of each of the alkylene group and the arylene group may be, for example, as described above. The number of carbons in the alkylene group is not particularly limited, but may be, for example, from 1 to 18. The number of carbons in the arylene group is not particularly limited, but may be, for example, from 6 to 18. Specific but non-limiting examples of the diisocyanate compound may include OCN—C$_6$H$_{12}$—NCO.

Specific but non-limiting examples of the phosphate ester may include trimethyl phosphate, triethyl phosphate, and triallyl phosphate. A content of the phosphate ester in the non-aqueous solvent is not particularly limited, but may be, for example, from 0.5 wt % to 5 wt % both inclusive.

In particular, the electrolytic solution may preferably include, together with the foregoing cyano compound, one or more of unsaturated cyclic carbonate ester (vinylene carbonate-based compound) represented by the formula (2). A synergistic effect between the cyano compound and the unsaturated cyclic carbonate ester further improves chemical stability of the electrolytic solution. Specific but non-limiting examples of the vinylene carbonate-based compound may include vinylene carbonate, as described above.

Moreover, the other materials may include, for example, one or more of electrolyte salts such as lithium salt. However, the electrolyte salt may include a salt other than the lithium salt. Non-limiting examples of the salt other than the lithium salt may include a salt of a light metal other than lithium.

Specific but non-limiting examples of the lithium salt may include lithium hexafluorophosphate (LiPF$_6$), lithium tetrafluoroborate (LiBF$_4$), lithium perchlorate (LiClO$_4$), lithium hexafluoroarsenate (LiAsF$_6$), lithium tetraphenylborate (LiB(C$_6$H$_5$)$_4$), lithium methanesulfonate (LiCH$_3$SO$_3$), lithium trifluoromethane sulfonate (LiCF$_3$SO$_3$), lithium tetrachloroaluminate (LiAlCl$_4$), dilithium hexafluorosilicate (Li$_2$SiF$_6$), lithium chloride (LiCl), and lithium bromide (LiBr).

In particular, one or more of lithium hexafluorophosphate, lithium tetrafluoroborate, lithium perchlorate, and lithium hexafluoroarsenate may be preferable, and lithium hexafluorophosphate may be more preferable. These lithium salts make it possible to decrease internal resistance.

Moreover, non-limiting examples of the electrolyte salt may include respective compounds represented by the following chemical formulas (8) to (10). R41 and R43 may be groups of a same kind or groups of different kinds. R51 to R53 may be groups of a same kind or groups of different kinds. It goes without saying that some of R51 to R53 may be groups of a same kind. R61 and R62 may be groups of a same kind or groups of different kinds.

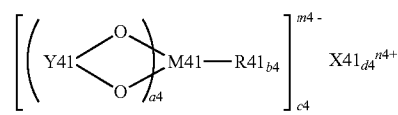

(8)

where X41 is one of Group 1 elements and Group 2 elements in the long form of the periodic table of the elements and aluminum (Al), M41 is one of transition metals, and Group 13 elements, Group 14 elements, and Group 15 elements in the long form of the periodic table of the elements, R41 is a halogen group, Y41 is one of —C(=O)—R42-C(=O)—, —C(=O)—CR43₂—, and —C(=O)—C(=O)—, R42 is one of an alkylene group, a halogenated alkylene group, an arylene group, and a halogenated arylene group, R43 is one of an alkyl group, a halogenated alkyl group, an aryl group, and a halogenated aryl group, a4 is an integer of 1 to 4, b4 is an integer of 0, 2, or 4, and each of c4, d4, m4, and n4 is an integer of 1 to 3.

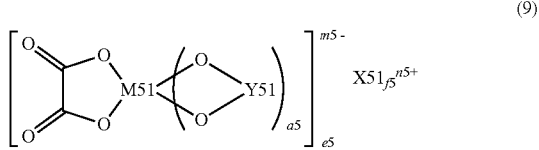

(9)

where X51 is one of Group 1 elements and Group 2 elements in the long form of the periodic table of the elements, M51 is one of transition metals, and Group 13 elements, Group 14 elements, and Group 15 elements in the long form of the periodic table of the elements, Y51 is one of —C(=O)—(CR51$_2$)$_{b5}$-C(=O)—, —R53$_2$C—(CR52$_2$)$_{c5}$-C(=O)—, —R53$_2$C—(CR52$_2$)$_{c5}$-CR53$_2$—, —R53$_2$C—(CR52$_2$)$_{c5}$-S(=O)$_2$—, —S(=O)$_2$—(CR52$_2$)$_{d5}$-S(=O)$_2$—, and —C(=O)—(CR52$_2$)$_{d5}$-S(=O)$_2$—, each of R51 and R53 is one of a hydrogen group, an alkyl group, a halogen group, and a halogenated alkyl group, one or more of R51's are one of the halogen group and the halogenated alkyl group, one or more of R53's are one of the halogen group and the halogenated alkyl group, R52 is one of a hydrogen group, an alkyl group, a halogen group, and a halogenated alkyl group, each of a5, e5, and n5 is an integer of 1 or 2, each of b5 and d5 is an integer of 1 to 4, c5 is an integer of 0 to 4, and each of f5 and m5 is an integer of 1 to 3.

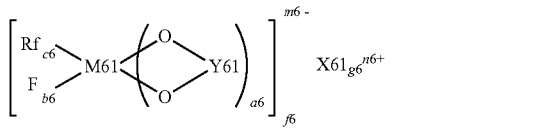

(10)

where X61 is one of Group 1 elements and Group 2 elements in the long form of the periodic table of the elements, M61 is one of transition metals, and Group 13 elements, Group 14 elements, and Group 15 elements in the long form of the periodic table of the elements, Rf is one of a fluorinated alkyl group and a fluorinated aryl group, the number of carbons in each of the fluorinated alkyl group and the fluorinated aryl group is from 1 to 10, Y61 is one of —C(=O)—(CR61$_2$)$_{d6}$-C(=O)—, —R62$_2$C—(CR61$_2$)$_{d6}$-C(=O)—, —R62$_2$C—(CR61$_2$)$_{d6}$-CR62$_2$, —R62$_2$C—(CR61$_2$)$_{d6}$-S(=O)$_2$—, —S(=O)$_2$(CR61$_2$)$_{e6}$-S(=O)$_2$, and —C(=O—(CR61$_2$)$_{e6}$-S(=O)$_2$, R61 is one of a hydrogen group, an alkyl group, a halogen group, and a halogenated alkyl group, R62 is one of a hydrogen group, an alkyl group, a halogen group, and a halogenated alkyl group, one or more of R62's are one of the halogen group and the halogenated alkyl group, each of a6, f6, and n6 is an integer of 1 or 2, each of b6, c6, and e6 is an integer of 1 to 4, d6 is an integer of 0 to 4, and each of g6 and m6 is an integer of 1 to 3.

It should be understood that the Group 1 elements include hydrogen (H), lithium (Li), sodium (Na), potassium (K), rubidium (Rb), cesium (Cs), and francium (Fr). The Group 2 elements include beryllium (Be), magnesium (Mg), calcium (Ca), strontium (Sr), barium (Ba), and radium (Ra). The Group 13 elements include boron (B), aluminum (Al), gallium (Ga), indium (In), and thallium (Tl). The Group 14 elements include carbon (C), silicon (Si), germanium (Ge), tin (Sn), and lead (Pb). The Group 15 elements include nitrogen (N), phosphorus (P), arsenic (As), antimony (Sb), and bismuth (Bi).

Specific but non-limiting examples of the compound represented by the formula (8) may include respective compounds represented by the following formulas (8-1) to (8-6). Specific but non-limiting examples of the compound represented by the formula (9) may include respective compounds represented by the following chemical formulas (9-1) to (9-8). Specific but non-limiting examples of the compound represented by the formula (10) may include a compound represented by the following formula (10-1).

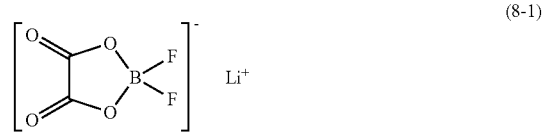

(8-1)

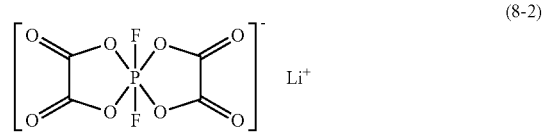

(8-2)

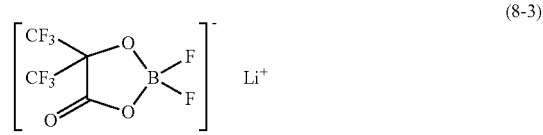

(8-3)

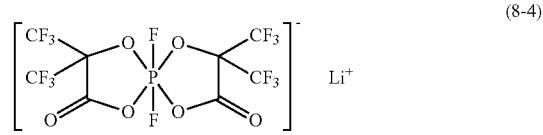

(8-4)

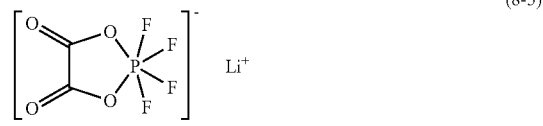

(8-5)

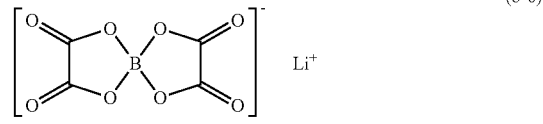

(8-6)

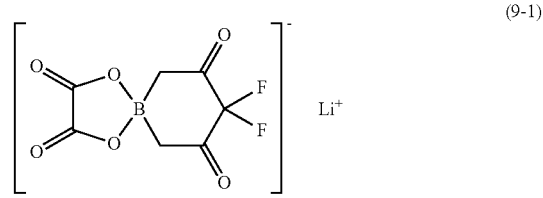

(9-1)

-continued

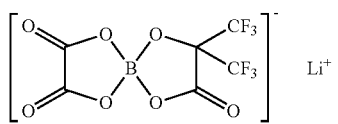 (9-2)

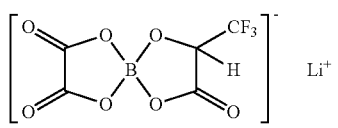 (9-3)

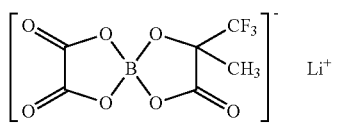 (9-4)

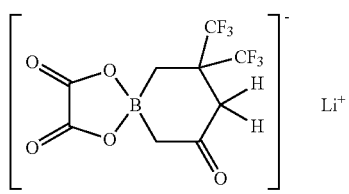 (9-5)

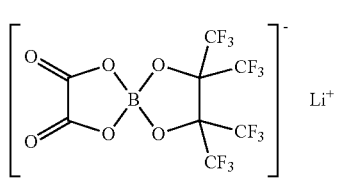 (9-6)

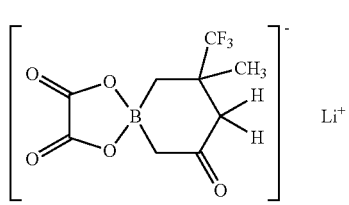 (9-7)

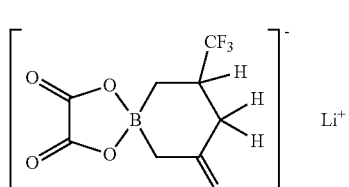 (9-8)

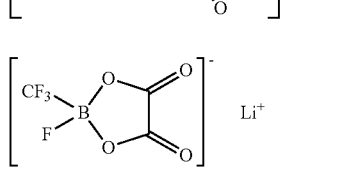 (10-1)

Moreover, the electrolyte salt may be respective compounds represented by the following chemical formulas (11) to (13). Values of m and n may be the same as or different from each other. Values of p, q, and r may be the same as or different from one another. It goes without saying that the values of two of p, q, and r may be the same as each other.

$$\text{LiN}(C_mF_{2m+1}SO_2)(C_nF_{2n+1}SO_2) \quad (11)$$

where each of m and n is an integer of 1 or more.

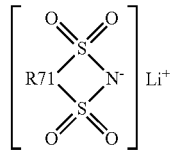 (12)

where R71 is a straight-chain perfluoroalkylene group having 2 to 4 carbons or a branched perfluoroalkylene group having 2 to 4 carbons.

$$\text{LiC}(C_pF_{2p+1}SO_2)(C_qF_{2q+1}SO_2)(C_rF_{2r+1}SO_2) \quad (13)$$

where each of p, q, and r is an integer of 1 or more.

The compound represented by the formula (11) is a chain amide compound. Specific but non-limiting examples of the chain amide compound may include lithium bis(fluorosulfonyl)amide (LiN(SO$_2$F)$_2$), lithium (fluorosulfonyl)(trifluoromethanesulfonyl)amide (LiN(SO$_2$F)(CF$_3$SO$_2$)), lithium bis(trifluoromethanesulfonyl)amide (LiN(CF$_3$SO$_2$)$_2$), lithium bis(pentafluoroethanesulfonyl)amide (LiN(C$_2$F$_5$SO$_2$)$_2$), lithium (trifluoromethanesulfonyl)(pentafluoroethanesulfonyl)amide (LiN(CF$_3$SO$_2$)(C$_2$F$_5$SO$_2$)), lithium (trifluoromethanesulfonyl)(heptafluoropropanesulfonyl) amide (LiN(CF$_3$SO$_2$)(C$_3$F$_7$SO$_2$)), and lithium (trifluoromethanesulfonyl)(nonafluorobutanesulfonyl)amide (LiN(CF$_3$SO$_2$)(C$_4$F$_9$SO$_2$)).

The compound represented by the formula (12) is a cyclic imide compound. Specific but non-limiting examples of the cyclic imide compound may include respective compounds represented by the following chemical formulas (12-1) to (12-4).

(12-1)

(12-2)

(12-3)

(12-4)

The compound represented by the formula (13) is a chain methide compound. Specific but non-limiting examples of the chain methide compound may include lithium tris(trifluoromethanesulfonyl)methide (LiC(CF$_3$SO$_2$)$_3$).

Moreover, the electrolyte salt may be a phosphorus-fluorine-containing salt such as lithium difluorophosphate (LiPF$_2$O$_2$) and lithium fluorophosphate (Li$_2$PFO$_3$).

A content of the electrolyte salt is not particularly limited; however, in particular, the content of the electrolyte salt may be preferably from 0.3 mol/kg to 3.0 mol/kg both inclusive with respect to the solvent. This makes it possible to achieve high ionic conductivity.

Next, description is given of a method of manufacturing the electrolytic solution. The electrolytic solution may be manufactured by the following procedure, for example.

In a case where the electrolytic solution is manufactured, the electrolyte salt may be added to the solvent, and thereafter, the solvent may be stirred to dissolve or disperse the electrolyte salt in the solvent. Subsequently, the cyano compound may be added to the solvent in which the electrolyte salt is dissolved or dispersed, and thereafter, the solvent may be stirred to dissolve or disperse the cyano compound in the solvent. Thus, the electrolytic solution including the cyano compound may be prepared.

<1-3. Action and Effects>

The electrolytic solution includes the foregoing cyano compound. In this case, as compared with a case where the electrolytic solution does not include the cyano compound and a case where the electrolytic solution includes any other compound in place of the cyano compound, chemical stability of the electrolytic solution is improved, as described above. Non-limiting examples of the "other compound" may include respective compounds represented by the following chemical formulas (14-1) and (14-2). Accordingly, decomposition reaction of the electrolytic solution is suppressed, which makes it possible to improve battery characteristics of a secondary battery using the electrolytic solution.

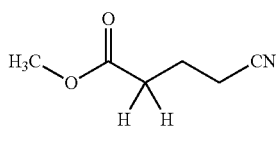

(14-1)

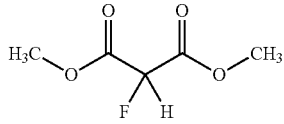

(14-2)

In particular, in a case where, with regard to R2 in the formula (1), the monovalent chain hydrocarbon cyano group is a group in which one or more cyano groups are introduced into an alkyl group, decomposition reaction of the electrolytic solution is further suppressed. This makes it possible to achieve a higher effect.

In this case, in a case where the monovalent chain hydrocarbon cyano group is a group in which one cyano group is introduced into an end of the alkyl group, induced interaction between the ester bond and the cyano group is suppressed, thereby further suppressing decomposition reaction of the electrolytic solution. This makes it possible to achieve a higher effect. Moreover, in a case where the number of carbons in the alkyl group is 3 or more, induced interaction between the ester bond and the cyano group is suppressed, thereby further suppressing decomposition reaction of the electrolytic solution. This makes it possible to achieve an extremely high effect.

Further, in a case where, with regard to R1 and X2 in the formula (1), the monovalent hydrocarbon group is a group such as an alkyl group, and with regard to X1 and X2 in the formula (1), the halogen group is a group such as a fluorine group, decomposition reaction of the electrolytic solution is further suppressed. This makes it possible to achieve a higher effect.

Furthermore, in a case where R1 is an alkyl group, R2 is a group in which one cyano group is introduced into an end of an alkyl group, X1 is a fluorine group, and X2 is a hydrogen group, decomposition reaction of the electrolytic solution is further suppressed. This makes it possible to achieve a higher effect.

In addition, in a case where the content of the cyano compound in the electrolytic solution is from 0.1 wt % to 5 wt % both inclusive, decomposition reaction of the electrolytic solution is further suppressed. This makes it possible to achieve a higher effect.

Next, description is given of a secondary battery according to an embodiment of the disclosure using the foregoing electrolytic solution.

Figure 9:
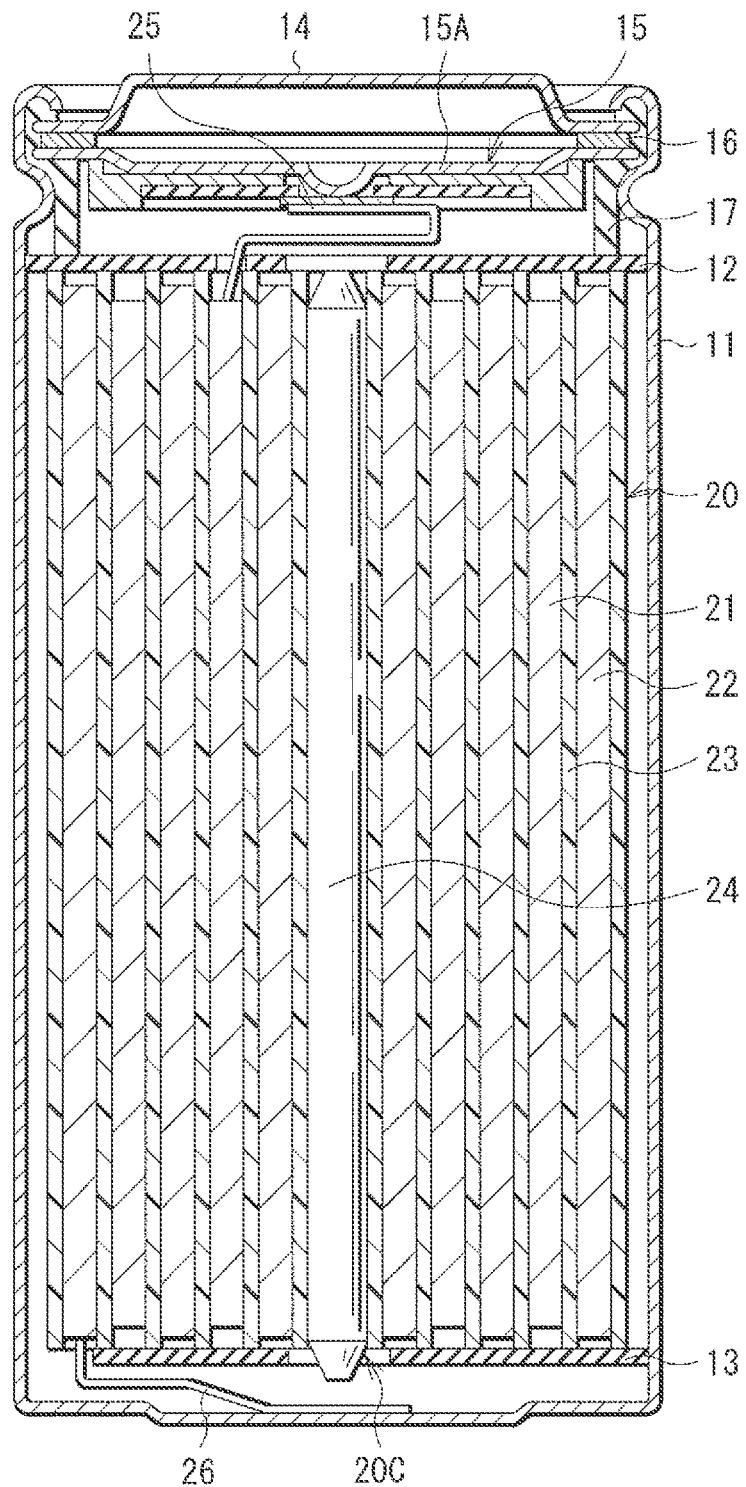
FIG. 9 is a cross-sectional view illustrating a configuration of a secondary battery (of a cylindrical type) according to an embodiment of the present disclosure.
Figure 10:
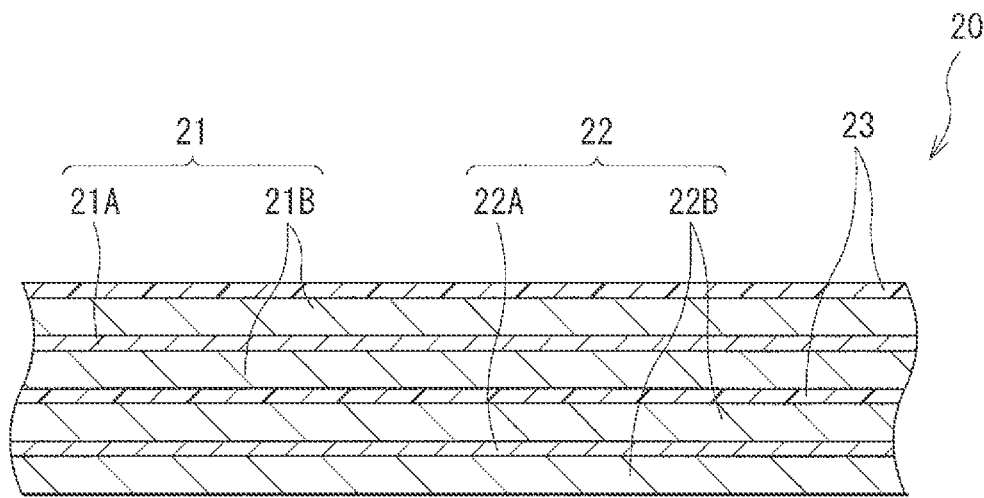
FIG. 10 is a cross-sectional view illustrating an enlarged part of a spirally wound electrode body illustrated in FIG. 9.

FIG. 9 illustrates a cross-sectional configuration of the secondary battery. FIG. 10 is an enlarged view of a part of a cross-sectional configuration of a spirally wound electrode body 20 illustrated in FIG. 9.

The secondary battery described herein may be, for example, a lithium-ion secondary battery in which battery capacity (capacity of an anode 22) is obtained with use of a lithium insertion phenomenon and a lithium extraction phenomenon.

The secondary battery may be, for example, a secondary battery of a cylindrical type in which the spirally wound electrode body 20 as a battery element is contained inside a battery can 11 in the shape of a substantially-hollow cylinder, as illustrated in FIG. 9.

Specifically, the secondary battery may contain, for example, a pair of insulating plates 12 and 13 and the spirally wound electrode body 20 inside the battery can 11. The spirally wound electrode body 20 may be formed as follows. For example, a cathode 21 and the anode 22 may be laminated with a separator 23 in between, and the cathode 21, the anode 22, and the separator 23 may be spirally wound to form the spirally wound electrode body 20. The spirally wound electrode body 20 may be impregnated with, for example, an electrolytic solution that is a liquid electrolyte.

The battery can 11 may have, for example, a hollow structure in which one end of the battery can 11 is closed and the other end of the battery can 11 is opened. The battery can 11 may include, for example, one or more of iron, aluminum, and an alloy thereof. A surface of the battery can 11 may be plated with, for example, a metal material such as nickel. Note that the pair of insulating plates 12 and 13 may be so disposed as to sandwich the spirally wound electrode body 20 in between and extend perpendicularly to a spirally wound periphery surface of the spirally wound electrode body 20.

At the open end of the battery can 11, a battery cover 14, a safety valve mechanism 15, and a positive temperature coefficient device (PTC device) 16 may be swaged with a gasket 17, by which the battery can 11 is hermetically sealed. A formation material of the battery cover 14 may be similar to, for example, a formation material of the battery can 11. Each of the safety valve mechanism 15 and the PTC device 16 may be provided on the inner side of the battery cover 14, and the safety valve mechanism 15 may be electrically coupled to the battery cover 14 via the PTC device 16. In the safety valve mechanism 15, when an internal pressure of the battery can 11 reaches a certain level or higher as a result of, for example, internal short circuit or heating from outside, a disk plate 15A inverts. This cuts electric connection between the battery cover 14 and the spirally wound electrode body 20. In order to prevent abnormal heat generation resulting from a large current, resistance of the PTC device 16 increases as a temperature rises. The gasket 17 may include, for example, an insulating material. A surface of the gasket 17 may be coated with, for example, asphalt.

For example, a center pin 24 may be inserted in a space provided at a center of the spirally wound electrode body 20. However, the center pin 24 may be omitted. A cathode lead 25 may be attached to the cathode 21, and an anode lead 26 may be attached to the anode 22. The cathode lead 25 may include, for example, a conductive material such as aluminum. For example, the cathode lead 25 may be attached to the safety valve mechanism 15, which may be thereby electrically coupled to the battery cover 14. The anode lead 26 may include, for example, a conductive material such as nickel. For example, the anode lead 26 may be attached to the battery can 11, which may be thereby electrically coupled to the battery can 11.

The cathode 21 may include, for example, a cathode current collector 21A and two cathode active material layers 21B provided on both surfaces of the cathode current collector 21A, as illustrated in FIG. 10. Alternatively, only one cathode active material layer 21B may be provided on a single surface of the cathode current collector 21A.

The cathode current collector 21A may include, for example, one or more of conductive materials. The kind of the conductive materials is not particularly limited; however, non-limiting examples of the conductive materials may include metal materials such as aluminum, nickel, and stainless steel. The cathode current collector 21A may be configured of a single layer or may be configured of multiple layers.

The cathode active material layer 21B may include, as a cathode active material, one or more of cathode materials capable of inserting and extracting lithium. It is to be noted that the cathode active material layer 21B may further include one or more of other materials such as a cathode binder and a cathode conductor.

The cathode material may be preferably a lithium-containing compound, which makes it possible to achieve high energy density. The kind of the lithium-containing compound is not particularly limited; however, non-limiting examples of the lithium-containing compounds may include a lithium-containing composite oxide and a lithium-containing phosphate compound.

The lithium-containing composite oxide is an oxide that includes lithium and one or more other elements as constituent elements. The lithium-containing composite oxide may have, for example, one of crystal structures such as a layered rock-salt crystal structure and a spinel crystal structure. The lithium-containing phosphate compound is a phosphate compound that includes lithium and one or more other elements as constituent elements. The lithium-containing phosphate compound may have, for example, a crystal structure such as an olivine crystal structure.

It should be understood that the "other elements" mentioned above are elements other than lithium. The kind of the other elements is not particularly limited as long as the other elements are one or more of optional elements; however, non-limiting examples of the other elements may include elements that belong to Groups 2 to 15 in the long form of the periodic table of the elements. More specifically, the other elements may be preferably nickel (Ni), cobalt (Co), manganese (Mn), iron (Fe), etc., which make it possible to obtain a high voltage.

Non-limiting examples of the lithium-containing composite oxide having the layered rock-salt crystal structure may include respective compounds represented by the following formulas (21) to (23).

$$Li_aMn_{(1-b-c)}Ni_bM11_cO_{(2-d)}F_e \tag{21}$$

where M11 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), "a" to "e" satisfy $0.8 \le a \le 1.2$, $0 < b < 0.5$, $0 \le c \le 0.5$, $(b+c)<1$, $-0.1 \le d \le 0.2$, and $0 \le e \le 0.1$, it is to be noted that the composition of lithium varies depending on charge and discharge states, and "a" is a value in a completely-discharged state.

$$Li_aNi_{(1-b)}M12_bO_{(2-c)}F_d \tag{22}$$

where M12 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \le a \le 1.2$, $0.005 \le b \le 0.5$, $-0.1 \le c \le 0.2$, and $0 \le d \le 0.1$, it is to be noted that the composition of lithium varies depending on charge and discharge states, and "a" is a value in a completely-discharged state.

$$Li_aCo_{(1-b)}M13_bO_{(2-c)}F_d \tag{23}$$

where M13 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \le a \le 1.2$, $0 \le b < 0.5$, $-0.1 \le c \le 0.2$, and $0 \le d \le 0.1$, it is to be noted that the composition of lithium varies depending on charge and discharge states, and "a" is a value in a completely-discharged state.

Specific but non-limiting examples of the lithium-containing composite oxide having the layered rock-salt crystal structure may include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.5}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

It should be understood that in a case where the lithium-containing composite oxide having the layered rock-salt crystal structure includes nickel, cobalt, manganese, and aluminum as constituent elements, an atomic ratio of nickel may be preferably 50 at % or more, which makes it possible to achieve high energy density.

Non-limiting examples of the lithium-containing composite oxide having the spinel crystal structure may include a compound represented by the following formula (24).

$$Li_aMn_{(2-b)}M14_bO_cF_d \tag{24}$$

where M14 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy 0.9≤a≤1.1, 0≤b≤0.6, 3.7≤c≤4.1, and 0≤d≤0.1, it is to be noted that the composition of lithium varies depending on charge and discharge states, and "a" is a value in a completely-discharged state.

Specific but non-limiting examples of the lithium-containing composite oxide having the spinel crystal structure may include LiMn$_2$O$_4$.

Non-limiting examples of the lithium-containing phosphate compound having the olivine crystal structure may include a compound represented by the following formula (25).

$$Li_aM15PO_4 \qquad (25)$$

where M15 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), "a" satisfies 0.9≤a≤1.1, it is to be noted that the composition of lithium varies depending on charge and discharge states, and "a" is a value in a completely-discharged state.

Specific but non-limiting examples of the lithium-containing phosphate compound having the olivine crystal structure may include LiFePO$_4$, LiMnPO$_4$, LiFe$_{0.5}$Mn$_{0.5}$PO$_4$, and LiFe$_{0.3}$Mn$_{0.7}$PO$_4$.

It should be understood that the lithium-containing composite oxide may be, for example, a compound represented by the following formula (26).

$$(Li_2MnO_3)_x(LiMnO_2)_{1-x} \qquad (26)$$

where "x" satisfies 0≤x≤1, it is to be noted that the composition of lithium varies depending on charge and discharge states, and "x" is a value in a completely-discharged state.

Moreover, non-limiting examples of the cathode materials may include an oxide, a disulfide, a chalcogenide, and a conductive polymer. Non-limiting examples of the oxide may include titanium oxide, vanadium oxide, and manganese dioxide. Non-limiting examples of the disulfide may include titanium disulfide and molybdenum sulfide. Non-limiting examples of the chalcogenide may include niobium selenide. Non-limiting examples of the conductive polymer may include sulfur, polyaniline, and polythiophene.

The cathode binder may include, for example, one or more of synthetic rubbers and polymer compounds. Non-limiting examples of the synthetic rubbers may include a styrene-butadiene-based rubber, a fluorine-based rubber, and ethylene propylene diene. Non-limiting examples of the polymer compounds may include polyvinylidene fluoride and polyimide.

The cathode conductor may include, for example, one or more of conductive materials such as carbon materials. Non-limiting examples of the carbon materials may include graphite, carbon black, acetylene black, and Ketjen black. Alternatively, the cathode conductor may be any other material such as a metal material and a conductive polymer, as long as the cathode conductor is a material having conductivity.

The anode 22 may include, for example, an anode current collector 22A and two anode active material layers 22B provided on both surfaces of the anode current collector 22A. Alternatively, only one anode active material layer 22B may be provided on a single surface of the anode current collector 22A.

The anode current collector 22A may include, for example, one or more of conductive materials. The kind of the conductive materials is not particularly limited; however, non-limiting examples of the conductive materials may include metal materials such as copper, aluminum, nickel, and stainless steel. The anode current collector 22A may be configured of a single layer or may be configured of multiple layers.

A surface of the anode current collector 22A may be preferably roughened. This makes it possible to improve adhesibility of the anode active material layers 22B with respect to the anode current collector 22A by a so-called anchor effect. In this case, it may be only necessary to roughen the surface of the anode current collector 22A at least in a region facing each of the anode active material layers 22B. Non-limiting examples of a roughening method may include a method of forming fine particles with use of electrolytic treatment. Through the electrolytic treatment, fine particles are formed on the surface of the anode current collector 22A in an electrolytic bath by an electrolytic method to make the surface of the anode current collector 22A rough. A copper foil fabricated by the electrolytic method is generally called "electrolytic copper foil".

The anode active material layers 22B may include, as an anode active material, one or more of anode materials capable of inserting and extracting lithium. It is to be noted that the anode active material layers 22B may further include one or more of other materials such as an anode binder and an anode conductor.

In order to prevent lithium from being unintentionally precipitated on the anode 22 in the middle of charge, chargeable capacity of the anode material may be preferably larger than discharge capacity of the cathode 21. In other words, electrochemical equivalent of the anode material capable of inserting and extracting lithium may be preferably larger than electrochemical equivalent of the cathode 21.

The kind of the anode material is not particularly limited; however, non-liming examples of the anode material may include a carbon material and a metal-based material.

The carbon material is a generic name of a material including carbon as a constituent element. The carbon material causes an extremely-small change in a crystal structure thereof during insertion and extraction of lithium, which stably achieves high energy density. Further, the carbon material also serves as the anode conductor, which improves conductivity of the anode active material layer 22B.

Non-limiting examples of the carbon material may include graphitizable carbon, nongraphitizable carbon, and graphite. The spacing of (002) plane in nongraphitizable carbon may be preferably equal to or greater than 0.37 nm, and the spacing of (002) plane in graphite may be preferably equal to or smaller than 0.34 nm. More specific examples of the carbon material may include pyrolytic carbons, cokes, glassy carbon fibers, an organic polymer compound fired body, activated carbon, and carbon blacks. Non-limiting examples of the cokes may include pitch coke, needle coke, and petroleum coke. The organic polymer compound fired body is a polymer compound fired (carbonized) at an appropriate temperature. Non-limiting examples of the polymer compound may include phenol resin and furan resin. Other than the materials mentioned above, the carbon material may be low crystalline carbon heat-treated at a temperature of about 1000° C. or less, or may be amorphous carbon. It is to be noted that the shape of the carbon material may be one or more of a fibrous shape, a spherical shape, a granular shape, and a scale-like shape.

The metal-based material is a generic name of a material including one or more of metal elements and metalloid elements as constituent elements, and the metal-based material achieves high energy density.

The metal-based material may be one of a simple substance, an alloy, and a compound, may be two or more thereof, or may have one or more phases thereof. It is to be noted that the "alloy" also encompasses a material that includes one or more metal elements and one or more metalloid elements, in addition to a material includes two or more metal elements. Further, the alloy may include a non-metallic element. Non-limiting examples of the structure of the metal-based material may include a solid solution, a eutectic crystal (a eutectic mixture), an intermetallic compound, and a structure in which two or more thereof coexist.

The metal elements and the metalloid elements may be, for example, one or more of metal elements and metalloid elements that are capable of forming an alloy with lithium. Specific but non-limiting examples of the metal elements and the metalloid elements may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon, tin, or both may be preferable, and silicon may be more preferable. Silicon and tin have superior ability of inserting and extracting lithium, and achieve remarkably high energy density accordingly.

A material containing silicon, tin, or both as constituent elements may be any of a simple substance, an alloy, and a compound of silicon, may be any of a simple substance, an alloy, and a compound of tin, may be two or more thereof, or may be a material that has one or more phases thereof. The "simple substance" described herein merely refers to a simple substance in a general sense (a small amount of impurity may be therein contained), and does not necessarily refer to a purity 100% simple substance.

The alloy of silicon may contain, for example, one or more of elements such as tin, nickel, copper, iron, cobalt, manganese, zinc, indium, silver, titanium, germanium, bismuth, antimony, and chromium, as constituent elements other than silicon. The compound of silicon may contain, for example, one or more of elements such as carbon and oxygen, as constituent elements other than silicon. It is to be noted that the compound of silicon may contain, for example, one or more of the elements described for the alloy of silicon, as constituent elements other than silicon.

Specific but non-limiting examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≤2), and LiSiO. It is to be noted that "v" in $SiO_v$ may be, for example, within a range of 0.2<v<1.4.

The alloy of tin may contain, for example, one or more of elements such as silicon, nickel, copper, iron, cobalt, manganese, zinc, indium, silver, titanium, germanium, bismuth, antimony, and chromium, as constituent elements other than tin. The compound of tin may contain, for example, one or more of elements such as carbon and oxygen, as constituent elements other than tin. It is to be noted that the compound of tin may contain, for example, one or more of the elements described for the alloy of tin, as constituent elements other than tin.

Specific but non-limiting examples of the alloy of tin and the compound of tin may include $SnO_w$ (0<w≤2), $SnSiO_3$, $LiSnO$, and $Mg_2Sn$.

In particular, the material containing tin as a constituent element may be preferably, for example, a material (tin-containing material) that contains, together with tin as a first constituent element, a second constituent element and a third constituent element. The second constituent element may include, for example, one or more of elements such as cobalt, iron, magnesium, titanium, vanadium, chromium, manganese, nickel, copper, zinc, gallium, zirconium, niobium, molybdenum, silver, indium, cesium (Ce), hafnium (HO, tantalum, tungsten, bismuth, and silicon. The third constituent element may include, for example, one or more of elements such as boron, carbon, aluminum, and phosphorus. The tin-containing material containing the second constituent element and the third constituent element makes it possible to achieve high battery capacity, superior cycle characteristics, and other characteristics.

In particular, the tin-containing material may be preferably a material that contains tin, cobalt, and carbon as constituent elements (a tin-cobalt-carbon-containing material). In the tin-cobalt-carbon-containing material, for example, a content of carbon may be from 9.9 mass % to 29.7 mass % both inclusive, and a ratio of contents of tin and cobalt (Co/(Sn+Co)) may be from 20 mass % to 70 mass % both inclusive. This makes it possible to achieve high energy density.

The tin-cobalt-carbon-containing material may have a phase that contains tin, cobalt, and carbon. Such a phase may be preferably low crystalline or amorphous. This phase is a reaction phase that is able to react with lithium. Hence, existence of the reaction phase results in achievement of superior characteristics. A half width (a diffraction angle 2θ) of a diffraction peak obtained by X-ray diffraction of this reaction phase may be preferably 1° or larger in a case where a CuKα ray is used as a specific X-ray, and an insertion rate is 1°/min. This makes it possible to insert and extract lithium more smoothly, and to decrease reactivity of the tin-cobalt-carbon-containing material with the electrolytic solution. It is to be noted that, in some cases, the tin-cobalt-carbon-containing material may include a phase that contains simple substances of the respective constituent elements or part thereof in addition to the low-crystalline phase or the amorphous phase.

Comparison between X-ray diffraction charts before and after an electrochemical reaction with lithium makes it possible to easily determine whether the diffraction peak obtained by the X-ray diffraction corresponds to the reaction phase that is able to react with lithium. For example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase may be seen within a range of 2θ that is from 20° to 50° both inclusive. Such a reaction phase may include, for example, the respective constituent elements mentioned above, and it may be considered that such a reaction phase has become low crystalline or amorphous mainly because of existence of carbon.

In the tin-cobalt-carbon-containing material, part or all of carbon that is the constituent element thereof may be preferably bound to one of a metal element and a metalloid element that are other constituent elements thereof. Binding part or all of carbon suppresses cohesion or crystallization of tin, etc. It is possible to confirm a binding state of the elements, for example, by X-ray photoelectron spectroscopy (XPS). In a commercially-available apparatus, for example, an Al-Kα ray or a Mg-Kα ray may be used as a soft X-ray. In a case where part or all of carbon is bound to one of the metal element, the metalloid element, and any other element, a peak of a synthetic wave of is orbit of carbon (CIs) appears in an energy region lower than 284.5 eV. It is to be noted that energy calibration is so made that a peak of 4f orbit of a gold atom (Au4f) is obtained at 84.0 eV. In this case, in general, surface contamination carbon exists on the material surface. Hence, a peak of CIs of the surface contamination carbon is regarded to be at 284.8 eV, and this peak is used as energy standard. In XPS measurement, a waveform of the peak of CIs is obtained as a form that includes the peak of the surface contamination carbon and the peak of the carbon in the tin-cobalt-carbon-containing material. The two peaks may be therefore separated from each other, for example, by analysis with use of commercially-available software. In the analysis of the waveform, a position of the main peak that exists on the lowest bound energy side is regarded as the energy standard (284.8 eV).

The tin-cobalt-carbon-containing material is not limited to a material that contains only tin, cobalt, and carbon as constituent elements. The tin-cobalt-carbon-containing material may further contain one or more of elements such as silicon, iron, nickel, chromium, indium, niobium, germanium, titanium, molybdenum, aluminum, phosphorus, gallium, and bismuth, as constituent elements, in addition to tin, cobalt, and carbon.

Other than the tin-cobalt-carbon-containing material, a material that contains tin, cobalt, iron, and carbon as constituent elements (a tin-cobalt-iron-carbon-containing material) may be also preferable. Any composition of the tin-cobalt-iron-carbon-containing material may be adopted. To give an example, in a case where a content of iron is set smaller, a content of carbon may be from 9.9 mass % to 29.7 mass % both inclusive, a content of iron may be from 0.3 mass % to 5.9 mass % both inclusive, and a ratio of contents of tin and cobalt (Co/(Sn+Co)) may be from 30 mass % to 70 mass % both inclusive. Alternatively, in a case where the content of iron is set larger, the content of carbon may be from 11.9 mass % to 29.7 mass % both inclusive, the ratio of contents of tin, cobalt, and iron ((Co+Fe)/(Sn+Co+Fe)) may be from 26.4 mass % to 48.5 mass % both inclusive, and the ratio of contents of cobalt and iron (Co/(Co+Fe)) may be from 9.9 mass % to 79.5 mass % both inclusive. Such composition ranges allow for achievement of high energy density. It is to be noted that physical properties (such as a half width) of the tin-cobalt-iron-carbon-containing material are similar to physical properties of the foregoing tin-cobalt-carbon-containing material.

Other than the materials mentioned above, non-limiting examples of the anode material may include a metal oxide and a polymer compound. Non-limiting examples of the metal oxide may include iron oxide, ruthenium oxide, and molybdenum oxide. Non-limiting examples of the polymer compound may include polyacetylene, polyaniline, and polypyrrole.

In particular, the anode material may preferably include both the carbon material and the metal-based material for a reason to be described below.

The metal-based material, in particular, the material containing one or both of silicon and tin as constituent elements has a concern that such a material is easily and radically expanded or contracted during charge and discharge, whereas such a material has an advantage of high theoretical capacity. In contrast, the carbon material has an advantage that the carbon material is less prone to be expanded or contracted during charge and discharge, whereas the carbon material has a concern of low theoretical capacity. Hence, using both of the carbon material and the metal-based material makes it possible to suppress expansion and contraction during charge and discharge while achieving high theoretical capacity (in other words, high battery capacity).

Details of the anode binder may be similar to, for example, details of the foregoing cathode binder. Moreover, details of the anode conductor may be similar to, for example, details of the foregoing cathode conductor.

In the secondary battery, as described above, in order to prevent lithium metal from being unintentionally precipitated on a surface of the anode 22 in the middle of charge, the electrochemical equivalent of the anode material capable of inserting and extracting lithium may be preferably larger than the electrochemical equivalent of the cathode. In a case where an open circuit voltage (that is, a battery voltage) in a completely-charged state is equal to or higher than 4.25 V, an extraction amount of lithium per unit mass is larger than that in a case where the open circuit voltage is 4.20 V, even if the same cathode active material is used. Hence, amounts of the cathode active material and the anode active material are adjusted in accordance therewith. As a result, high energy density is achieved.

The separator 23 may be provided, for example, between the cathode 21 and the anode 22, as illustrated in FIG. 10. The separator 23 passes lithium ions therethrough while preventing current short circuit that results from contact between the cathode 21 and the anode 22.

More specifically, the separator 23 may include, for example, one or more of porous films such as porous films of a synthetic resin and ceramics. The separator 23 may be a laminated film in which two or more porous films are laminated. Non-limiting examples of the synthetic resin may include polytetrafluoroethylene, polypropylene, and polyethylene.

In particular, the separator 23 may include, for example, the foregoing porous film (a base layer) and a polymer compound layer provided on a single surface or both surfaces of the base layer. This makes it possible to improve adhesibility of the separator 23 with respect to each of the cathode 21 and the anode 22, thereby suppressing deformation of the spirally wound electrode body 20. This makes it possible to suppress decomposition reaction of the electrolytic solution and to suppress liquid leakage of the electrolytic solution with which the base layer is impregnated. Accordingly, even if charge and discharge are repeated, resistance is less prone to increase, and the secondary battery is less prone to swell.

The polymer compound layer may include, for example, one or more of polymer compounds such as polyvinylidene fluoride, which has high physical strength and is electrochemically stable. In order to form the polymer compound layer, for example, the base layer may be coated with a solution prepared by dissolving the polymer compound in a solvent such as an organic solvent, and thereafter, the base layer may be dried. Alternatively, the base layer may be immersed in the solution, and thereafter the base layer may be dried.

The polymer compound layer may include, for example, one or more of insulating particles such as inorganic particles. This makes it possible to improve safety. The kind of the inorganic particles may be, for example, aluminum oxide and aluminum nitride.

The spirally wound electrode body 20 may be impregnated with the electrolytic solution, as described above. Since the electrolytic solution has a configuration similar to that of the foregoing electrolytic solution according to the embodiment of the disclosure, the electrolytic solution includes a cyano compound.

The secondary battery may operate as follows, for example.

When the secondary battery is charged, lithium ions are extracted from the cathode 21, and the extracted lithium ions are inserted in the anode 22 through the electrolytic solution. In contrast, when the secondary battery is discharged, lithium ions are extracted from the anode 22, and the extracted lithium ions are inserted in the cathode 21 through the electrolytic solution.

(Manufacturing Method)

The secondary battery may be manufactured by the following procedure, for example.

In a case where the cathode 21 is fabricated, first, the cathode active material, and, on as-necessary basis, any other material such as the cathode binder and the cathode conductor may be mixed to obtain a cathode mixture. Subsequently, the cathode mixture may be dispersed in a solvent such as an organic solvent to obtain paste cathode mixture slurry. Lastly, both surfaces of the cathode current collector 21A may be coated with the cathode mixture slurry, and thereafter, the coated cathode mixture slurry may be dried to form the cathode active material layers 21B. Thereafter, the cathode active material layers 21B may be compression-molded with use of, for example, a roll pressing machine on as-necessary basis. In this case, the cathode active material layers 21B may be heated, or may be compression-molded a plurality of times.

In a case where the anode 22 is fabricated, the anode active material layers 22B may be formed on both surfaces of the anode current collector 22A by a procedure similar to the foregoing procedure of fabricating the cathode 21. More specifically, the anode active material, and any other material such as the anode binder and the anode conductor may be mixed to obtain an anode mixture. Subsequently, the anode mixture may be dispersed in a solvent such as an organic solvent to obtain paste anode mixture slurry. Next, both surfaces of the anode current collector 22A may be coated with the anode mixture slurry, and thereafter, the coated anode mixture slurry may be dried to form the anode active material layers 22B. Thereafter, the anode active material layers 22B may be compression-molded with use of, for example, a roll pressing machine on as-necessary basis.

A method of forming the anode active material layer 22B is not particularly limited; however, the anode active material layer 22B may be formed by, for example, one or more of a coating method, a vapor-phase method, a liquid-phase method, a spraying method, and a firing method (sintering method). The coating method may be, for example, a method in which, after, for example, a particulate (powder) anode active material are mixed with, for example, an anode binder to form a mixture, the mixture is dissolved or dispersed in a solvent such as an organic solvent to prepare a solution, and the solution is applied onto the anode current collector 22A. Non-limiting examples of the vapor-phase method may include a physical deposition method and a chemical deposition method. More specifically, non-limiting examples thereof may include a vacuum evaporation method, a sputtering method, an ion plating method, a laser ablation method, a thermal chemical vapor deposition method, a chemical vapor deposition (CVD) method, and a plasma chemical vapor deposition method. Non-limiting examples of the liquid-phase method may include an electrolytic plating method and an electroless plating method. The spraying method is a method in which an anode active material in a fused state or a semi-fused state is sprayed to the anode current collector 22A. The firing method may be, for example, a method in which, after the solution is applied onto the anode current collector 22A by the coating method, the solution is heat-treated at a temperature higher than a melting point of the anode binder, etc. Non-limiting examples of the firing method may include an atmosphere firing method, a reactive firing method, and a hot press firing method.

In a case where the secondary battery is assembled, the cathode lead 25 may be attached to the cathode current collector 21A by a method such as a welding method, and the anode lead 26 may be attached to the anode current collector 22A by a method such as a welding method. Subsequently, the cathode 21 and the anode 22 may be laminated with the separator 23 in between, and the cathode 21, the anode 22, and the separator 23 may be spirally wound to form a spirally wound body. Thereafter, the center pin 24 may be inserted in a space provided at the center of the spirally wound body.

Subsequently, the spirally wound body may be sandwiched between the pair of insulating plates 12 and 13, and may be contained inside the battery can 11. In this case, an end of the cathode lead 25 may be attached to the safety valve mechanism 15 by a method such as a welding method, and an end of the anode lead 26 may be attached to the battery can 11 by a method such as a welding method. Subsequently, the electrolytic solution may be injected inside the battery can 11, and the spirally wound body may be impregnated with the injected electrolytic solution, thereby forming the spirally wound electrode body 20. Lastly, the battery cover 14, the safety valve mechanism 15, and the PTC device 16 may be swaged with the gasket 17 at the open end of the battery can 11, thereby enclosing the spirally wound electrode body 20 in the battery can 11. Thus, the cylindrical type secondary battery is completed.

According to the cylindrical type secondary battery, the electrolytic solution has a configuration similar to that of the foregoing electrolytic solution according to the embodiment of the disclosure. Accordingly, chemical stability of the electrolytic solution is improved as described above, thereby suppressing decomposition reaction of the electrolytic solution. This makes it possible to improve battery characteristics.

Action and effects related to the cylindrical type secondary battery other than those described above are similar to action and effects related to the electrolytic solution according to the embodiment of the disclosure.

Figure 11:
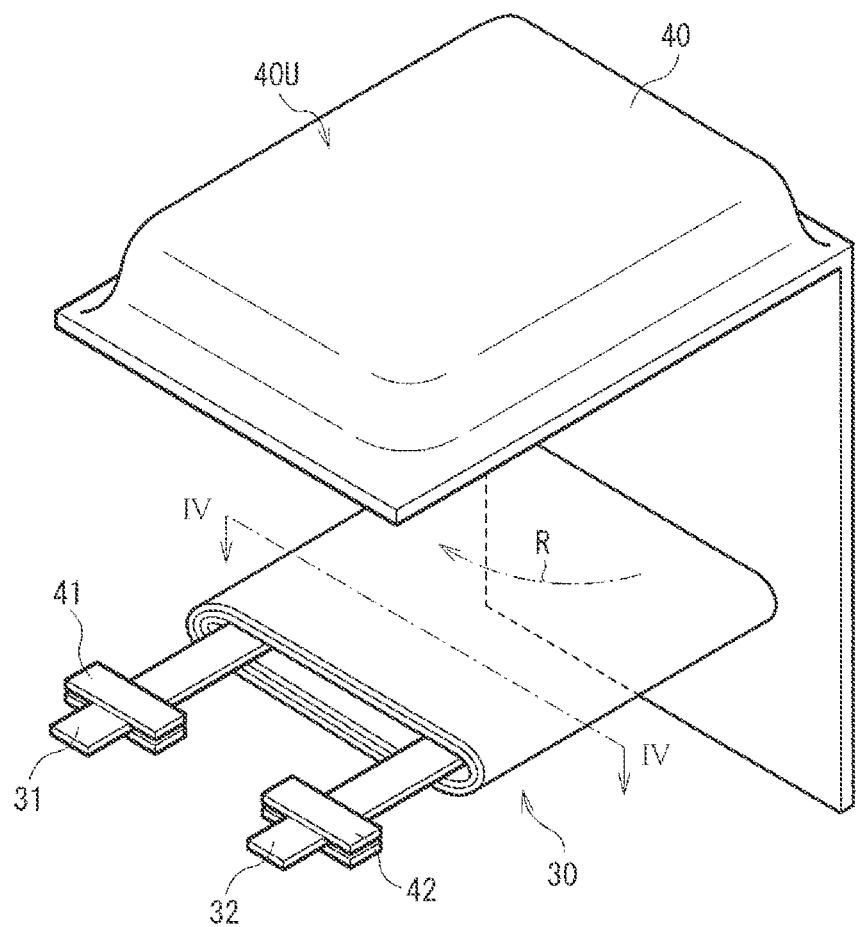
FIG. 11 is a perspective view illustrating a configuration of a secondary battery (of a laminated film type) according to an embodiment of the present disclosure.
Figure 12:
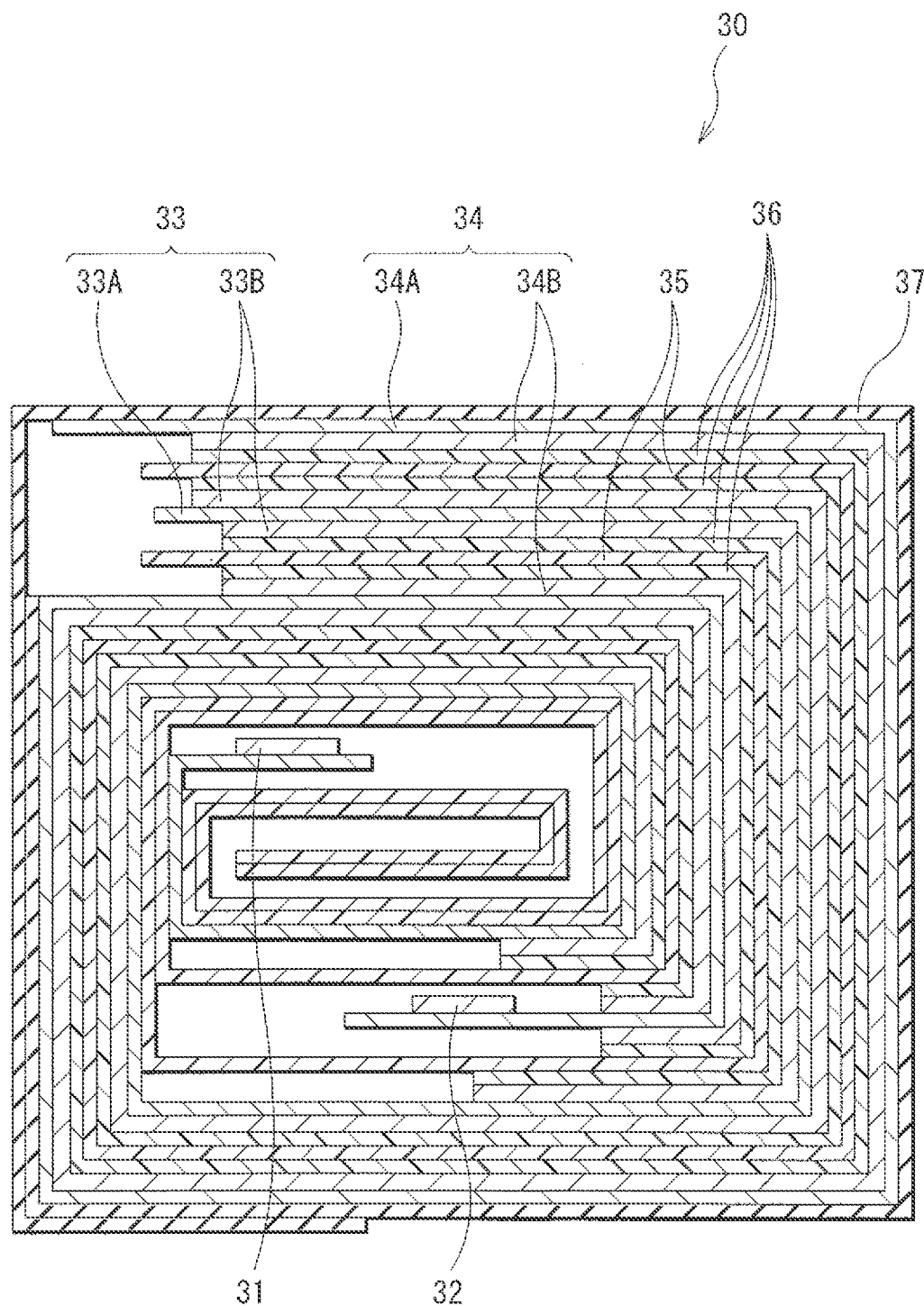
FIG. 12 is a cross-sectional view of a spirally wound electrode body taken along a line IV-IV illustrated in FIG. 11.

FIG. 11 illustrates a perspective configuration of another secondary battery. FIG. 12 illustrates a cross-sectional configuration taken along a line IV-IV of a spirally wound electrode body 30 illustrated in FIG. 11. It is to be noted that FIG. 11 illustrates a state in which the spirally wound electrode body 30 and an outer package member 40 are separated from each other.

In the following description, the elements of the cylindrical type secondary battery that have been already described will be used where appropriate.

As can be seen from FIG. 11, the secondary battery may be, for example, a laminated film type secondary battery (lithium-ion secondary battery) in which the spirally wound electrode body 30 as a battery element is contained inside the film-like outer package member 40.

More specifically, for example, the secondary battery may include the spirally wound electrode body 30 inside the film-like outer package member 40. The spirally wound electrode body 30 may be formed as follows, for example. A cathode 33 and an anode 34 may be laminated with a separator 35 and an electrolyte layer 36 in between, and the cathode 33, the anode 34, the separator 35, and the electrolyte layer 36 may be spirally wound to form the spirally wound electrode body 30. The electrolyte layer 36 may be interposed, for example, between the cathode 33 and the separator 35 and may be interposed, for example, between the anode 34 and the separator 35. A cathode lead 31 may be attached to the cathode 33, and an anode lead 32 may be attached to the anode 34. An outermost periphery of the spirally wound electrode body 30 may be protected by a protective tape 37.

The cathode lead 31 may be led out from inside to outside of the outer package member 40, for example. The cathode lead 31 may include, for example, one or more of conductive materials such as aluminum (Al), and the cathode lead 31 may be in the shape of, for example, a thin plate or mesh.

The anode lead 32 may be led out from inside to outside of the outer package member 40 in a direction similar to that in the cathode lead 31, for example. The anode lead 32 may include, for example, one or more of conductive materials such as copper (Cu), nickel (Ni), and stainless steel, and the anode lead 32 may be in the shape of, for example, a thin plate or mesh.

The outer package member 40 may be, for example, one film that is foldable in a direction of an arrow R illustrated in FIG. 11, and the outer package member 40 may have a depression for containing of the spirally wound electrode body 30.

The outer package member 40 may be a laminated film in which a fusion bonding layer, a metal layer, and a surface protective layer are laminated in this order, for example. In a process of manufacturing the secondary battery, the outer package member 40 may be folded so that portions of the fusion-bonding layer face each other with the spirally wound electrode body 30 in between, and thereafter outer edges of the portions of the fusion bonding layer may be fusion-bonded. The fusion bonding layer may include one or more of films of polyethylene, polypropylene, and other materials. The metal layer may include, for example, one or more of an aluminum foil and other metal materials. The surface protective layer may include, for example, one or more of films of nylon, polyethylene terephthalate, and other materials. Alternatively, two laminated films bonded to each other by, for example, an adhesive may form the outer package member 40.

In particular, the outer package member 40 may be preferably an aluminum laminated film in which a nylon film, an aluminum foil, and a polyethylene film are laminated in this order. Alternatively, the outer package member 40 may be a laminated film having any other laminated structure, a polymer film such as polypropylene, or a metal film.

For example, an close-attachment film 41 to prevent outside air intrusion may be inserted between the outer package member 40 and the cathode lead 31. Moreover, for example, the foregoing close-attachment film 41 may be inserted between the outer package member 40 and the anode lead 32. The close-attachment film 41 may include a polymer material having adhesibility with respect to both the cathode lead 31 and the anode lead 32. Non-limiting examples of the polymer material may include a polyolefin resin. More specifically, the polymer material may include one or more of polyethylene, polypropylene, modified polyethylene, and modified polypropylene.

The cathode 33 may include, for example, a cathode current collector 33A and a cathode active material layer 33B. The anode 34 may include, for example, an anode current collector 34A and an anode active material layer 34B. The configurations of the cathode current collector 33A, the cathode active material layer 33B, the anode current collector 34A, and the anode active material layer 34B may be similar to, for example, the configurations of the cathode current collector 21A, the cathode active material layer 21B, the anode current collector 22A, and the anode active material layer 22B, respectively. Moreover, the configuration of the separator 35 may be similar to, for example, the configuration of the separator 23.

The electrolyte layer 36 may include an electrolytic solution and a polymer compound. The configuration of the electrolytic solution may be similar to, for example, the configuration of the electrolytic solution in the foregoing cylindrical type secondary battery. In other words, the electrolytic solution may include the cyano compound. The electrolyte layer 36 described herein may be a so-called gel electrolyte, and the electrolytic solution may be held by the polymer compound. The gel electrolyte achieves high ionic conductivity (for example, 1 mS/cm or more at room temperature), and prevents liquid leakage of the electrolytic solution. It is to be noted that the electrolyte layer 36 may further include one or more of other materials such as an additive.

The polymer material may include, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acid, polymethacrylic acid, styrene-butadiene rubber, nitrile-butadiene rubber, polystyrene, and polycarbonate. In addition thereto, the polymer material may be a copolymer. The copolymer may be, for example, a copolymer of vinylidene fluoride and hexafluoropylene. In particular, polyvinylidene fluoride may be preferable as a homopolymer, and a copolymer of vinylidene fluoride and hexafluoropylene may be preferable as a copolymer. Such polymer compounds are electrochemically stable.

In the electrolyte layer 36 that is a gel electrolyte, the solvent included in the electrolytic solution refers to a wide concept including not only a liquid material but also a material having ionic conductivity capable of dissociating the electrolyte salt. Hence, in a case where a polymer compound having ionic conductivity is used, the polymer compound is also included in the solvent.

It is to be noted that the electrolytic solution may be used as it is instead of the electrolyte layer 36. In this case, the spirally wound electrode body 30 (the cathode 33, the anode 34, and the separator 35) is impregnated with the electrolytic solution.

The secondary battery may operate as follows, for example.

When the secondary battery is charged, lithium ions are extracted from the cathode 33, and the extracted lithium ions are inserted in the anode 34 through the electrolyte layer 36. In contrast, when the secondary battery is discharged, lithium ions are extracted from the anode 34, and the extracted lithium ions are inserted in the cathode 33 through the electrolyte layer 36.

The secondary battery including the gel electrolyte layer 36 may be manufactured, for example, by one of the following three procedures.

In a first procedure, first, the cathode 33 and the anode 34 may be fabricated by a fabrication procedure similar to that of the cathode 21 and the anode 22. More specifically, the cathode 33 may be fabricated by forming the cathode active material layers 33B on both surfaces of the cathode current collector 33A, and the anode 34 may be fabricated by forming the anode active material layers 34B on both surfaces of the anode current collector 34A. Subsequently, the electrolytic solution, the polymer compound, an organic solvent, etc. may be mixed to prepare a precursor solution. Subsequently, the cathode 33 may be coated with the precursor solution, and the coated precursor solution may be dried to form the gel electrolyte layer 36. Further, the anode 34 may be coated with the precursor solution, and the coated precursor solution may be dried to form the gel electrolyte layer 36. Subsequently, the cathode lead 31 may be attached to the cathode current collector 33A by a method such as a welding method, and the anode lead 32 may be attached to the anode current collector 34A by a method such as a welding method. Subsequently, the cathode 33 and the anode 34 may be laminated with the separator 35 in between, and thereafter, the cathode 33, the anode 34, and the separator 35 may be spirally wound to fabricate the spirally wound electrode body 30. Thereafter, the protective tape 37 may be attached onto the outermost periphery of the spirally wound electrode body 30. Lastly, the outer package member 40 may be folded to interpose the spirally wound electrode body 30, and thereafter, the outer edges of the outer package member 40 may be bonded by a method such as a thermal fusion bonding method to enclose the spirally wound electrode body 30 in the outer package member 40. In this case, the close-attachment film 41 may be inserted between the cathode lead 31 and the outer package member 40, and the close-attachment film 41 may be inserted between the anode lead 32 and the outer package member 40.

In a second procedure, first, the cathode 33 and the anode 34 may be fabricated, and thereafter the cathode lead 31 may be attached to the cathode 33, and the anode lead 32 may be attached to the anode 34. Subsequently, the cathode 33 and the anode 34 may be laminated with the separator 35 in between, and thereafter may be spirally wound to fabricate a spirally wound body. Thereafter, the protective tape 37 may be adhered to the outermost periphery of the spirally wound body. Subsequently, the outer package member 40 may be folded to interpose the spirally wound body, and thereafter, the outer edges other than one side of the outer package member 40 may be bonded by a method such as a thermal fusion bonding method to contain the spirally wound body inside a pouch formed of the outer package member 40. Subsequently, the electrolytic solution, monomers that are raw materials of the polymer compound, a polymerization initiator, and, on as-necessary basis, other materials such as a polymerization inhibitor may be mixed to prepare a composition for electrolyte. Subsequently, the composition for electrolyte may be injected inside the pouch formed of the outer package member 40. Thereafter, the pouch formed of the outer package member 40 may be hermetically sealed by a method such as a thermal fusion bonding method. Lastly, the monomers may be thermally polymerized to form the polymer compound. Accordingly, the electrolytic solution may be held by the polymer compound to form the gel electrolyte layer 36.

In a third procedure, first, the spirally wound body may be fabricated, and then contained inside the pouch formed of the outer package member 40 by a procedure similar to the second procedure, except that the separator 35 in which the polymer compound layer is provided on the base layer is used. Subsequently, the electrolytic solution may be injected inside the pouch formed of the outer package member 40. Thereafter, an opening of the pouch formed of the outer package member 40 may be hermetically sealed by a method such as a thermal fusion bonding method. Lastly, the outer package member 40 may be heated while a weight is applied to the outer package member 40 to cause the separator 35 to be closely attached to the cathode 33 with the polymer compound layer in between and to be closely attached to the anode 34 with the polymer compound layer in between. Through this heating treatment, each of the polymer compound layers may be impregnated with the electrolytic solution, and each of the polymer compound layers may be gelated. Accordingly, the electrolyte layer 36 may be formed.

In the third procedure, swollenness of the secondary battery is suppressed more than in the first procedure. Further, in the third procedure, for example, the non-aqueous solvent and the monomers (the raw materials of the polymer compound) are hardly left in the electrolyte layer 36, as compared with the second procedure. Accordingly, the formation process of the polymer compound is favorably controlled. As a result, each of the cathode 33, the anode 34, and the separator 35 is sufficiently and closely attached to the electrolyte layer 36.

According to the laminated film type secondary battery, the electrolyte layer 36 includes the electrolytic solution, and the electrolytic solution has a configuration similar to that of the foregoing electrolytic solution according to the embodiment of the disclosure. This makes it possible to achieve superior battery characteristics for a reason similar to the reason in the cylindrical type secondary battery. Action and effects related to the laminated film type secondary battery other than those described above are similar to action and effects related to the electrolytic solution according to the embodiment of the disclosure.

Next, description is given of a secondary battery according to another embodiment, that uses the electrolytic solution according to the embodiment of the disclosure. The secondary battery described herein is a cylindrical type lithium metal secondary battery in which battery capacity (capacity of the anode 22) is obtained with use of a lithium precipitation phenomenon and a lithium dissolution phenomenon.

The secondary battery may have a configuration similar to that of the foregoing cylindrical type lithium-ion secondary battery, and may be manufactured by a procedure similar to the procedure of manufacturing the cylindrical type lithium-ion secondary battery, except that the anode active material layer 22B includes the lithium metal.

In the secondary battery, the lithium metal may be used as an anode active material, which makes it possible to achieve high energy density. The anode active material layer 22B may exist at the time of assembling, or the anode active material layer 22B may not necessarily exist at the time of assembling and may include the lithium metal precipitated during charge. Further, the anode active material layer 22B may be used as a current collector, and the anode current collector 22A may be omitted.

The secondary battery may operate, for example, as follows. When the secondary battery is charged, lithium ions may be extracted from the cathode 21, and the extracted lithium ions may be precipitated as the lithium metal on the surface of the anode current collector 22A through the electrolytic solution. In contrast, when the secondary battery is discharged, the lithium metal may be eluded as lithium ions from the anode active material layer 22B into the electrolytic solution, and may be inserted in the cathode 21 through the electrolytic solution.

According to the cylindrical type lithium metal secondary battery, the electrolytic solution has a configuration similar to that of the electrolytic solution according to the embodiment of the disclosure. This makes it possible to achieve superior battery characteristics for a reason similar to the reason in the foregoing cylindrical type secondary battery. Action and effects related to the cylindrical type lithium metal secondary battery other than those described above are similar to the action and the effects related to the electrolytic solution according to the embodiment of the disclosure.

It is to be noted that the lithium metal secondary battery described herein is not limited to the cylindrical type secondary battery, and may be a laminated film type secondary battery. Even in this case, similar effects are achievable.

Next, description is given of application examples of any of the secondary batteries mentioned above.

Applications of the secondary battery are not particularly limited as long as the secondary battery is applied to, for example, a machine, a device, an instrument, an apparatus, and a system (a collective entity of, for example, a plurality of devices) that are able to use the secondary battery as a driving power source, an electric power storage source for electric power accumulation, or any other source. The secondary battery used as the electric power source may be a main electric power source or an auxiliary electric power source. The main electric power source is an electric power source used preferentially irrespective of presence or absence of any other electric power source. The auxiliary electric power source may be an electric power source used instead of the main electric power source or used being switched from the main electric power source on as-necessary basis. In a case where the secondary battery is used as the auxiliary power source, the kind of the main power source is not limited to the secondary battery.

Non-limiting examples of the applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further non-limiting examples thereof may include: a mobile lifestyle appliance such as an electric shaver; a storage device such as a backup electric power source and a memory card; an electric power tool such as an electric drill and an electric saw; a battery pack used as an attachable and detachable electric power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications mentioned above.

In particular, the secondary battery may be effectively applicable to, for example, the battery pack, the electric vehicle, the electric power storage system, the electric power tool, and the electronic apparatus. In these applications, superior battery characteristics are demanded, and using the secondary battery of any of the embodiments of the disclosure makes it possible to effectively improve performance. It is to be noted that the battery pack is an electric power source that uses the secondary battery, and may use, for example, a single battery and an assembled battery, as described later. The electric vehicle is a vehicle that operates (runs) using the secondary battery as a driving electric power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving electric power source. The electronic apparatus is an apparatus that executes various functions with use of the secondary battery as a driving electric power source (an electric power supply source).

Hereinafter, specific description is given of some application examples of the secondary battery. It is to be noted that configurations of the respective application examples described below are mere examples, and may be changed as appropriate.

Figure 13:
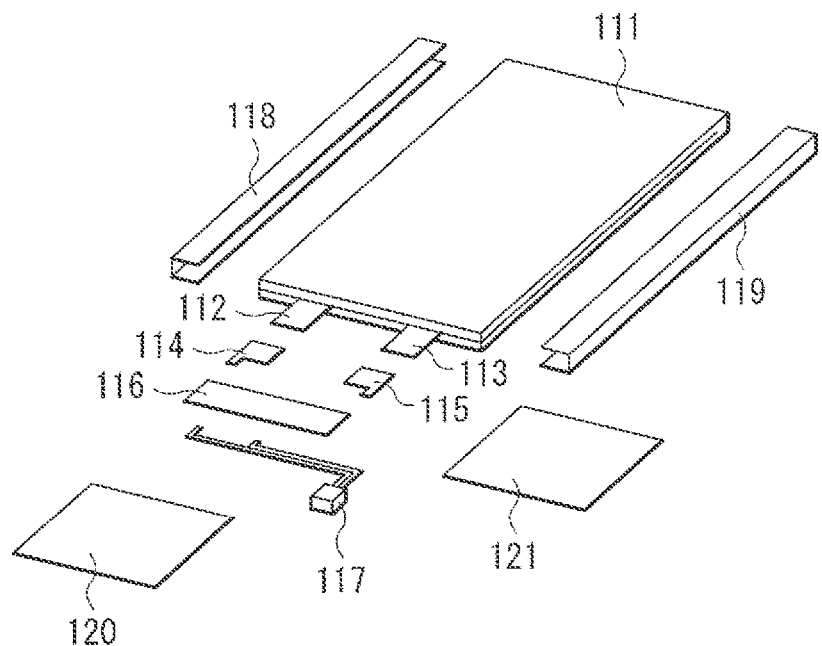
FIG. 13 is a perspective view of a configuration of an application example (a battery pack: single battery) of the secondary battery according to an embodiment of the present disclosure.
Figure 14:
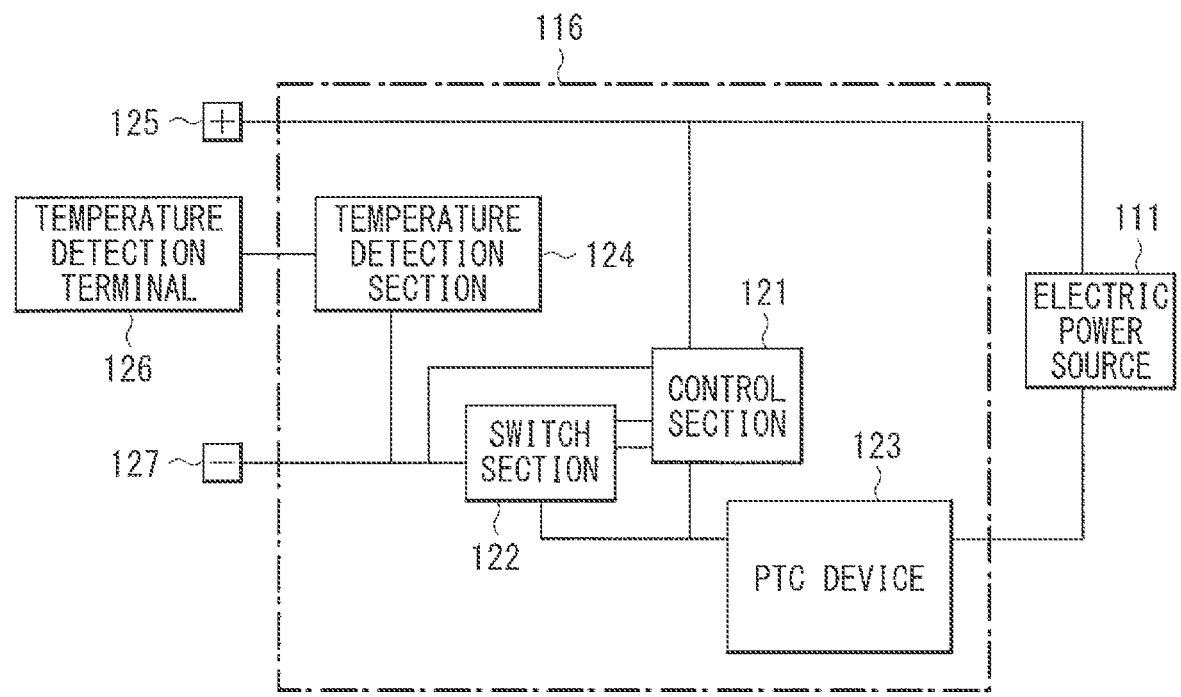
FIG. 14 is a block diagram illustrating a configuration of the battery pack illustrated in FIG. 13.

FIG. 13 illustrates a perspective configuration of a battery pack using a single battery. FIG. 14 illustrates a block configuration of the battery pack illustrated in FIG. 13. It is to be noted that FIG. 13 illustrates the battery pack in an exploded state.

The battery pack described herein is a simple battery pack using one secondary battery (a so-called soft pack), and may be mounted in, for example, an electronic apparatus typified by a smartphone. For example, the battery pack may include an electric power source 111 that is the laminated film type secondary battery, and a circuit board 116 coupled to the electric power source 111, as illustrated in FIG. 13. A cathode lead 112 and an anode lead 113 may be attached to the electric power source 111.

A pair of adhesive tapes 118 and 119 may be adhered to both side surfaces of the electric power source 111. A protection circuit module (PCM) may be provided in the circuit board 116. The circuit board 116 may be coupled to the cathode lead 112 through a tab 114, and be coupled to the anode lead 113 through a tab 115. Moreover, the circuit board 116 may be coupled to a lead 117 provided with a connector for external connection. It is to be noted that while the circuit board 116 is coupled to the electric power source 111, the circuit board 116 may be protected by a label 120 and an insulating sheet 121. The label 120 may be used to fix the circuit board 116, the insulating sheet 121, etc.

Moreover, for example, the battery pack may include the electric power source 111 and the circuit board 116 as illustrated in FIG. 14. The circuit board 116 may include, for example, a control section 121, a switch section 122, a PTC device 123, and a temperature detection section 124. The electric power source 111 may be connectable to outside through a cathode terminal 125 and an anode terminal 127, and may be thereby charged and discharged through the cathode terminal 125 and the anode terminal 127. The temperature detection section 124 may detect a temperature with use of a temperature detection terminal (a so-called T terminal) 126.

The control section 121 may control an operation of the entire battery pack (including a used state of the electric power source 111), and may include, for example, a central processing unit (CPU) and a memory.

For example, in a case where a battery voltage reaches an overcharge detection voltage, the control section 121 may so cause the switch section 122 to be disconnected that a charge current does not flow into a current path of the electric power source 111. Moreover, for example, in a case where a large current flows during charge, the control section 121 may cause the switch section 122 to be disconnected, thereby blocking the charge current.

In contrast, for example, in a case where the battery voltage reaches an overdischarge detection voltage, the control section 121 may so cause the switch section 122 to be disconnected that a discharge current does not flow into the current path of the electric power source 111. Moreover, for example, in a case where a large current flows during discharge, the control section 121 may cause the switch section 122 to be disconnected, thereby blocking the discharge current.

It is to be noted that the overcharge detection voltage is not particularly limited, but may be, for example, 4.2 V±0.05 V, and the overdischarge detection voltage is not particularly limited, but may be, for example, 2.4 V±0.1 V.

The switch section 122 may switch the used state of the electric power source 111, that is, presence or absence of connection of the electric power source 111 to an external device in accordance with an instruction from the control section 121. The switch section 122 may include, for example, a charge control switch and a discharge control switch. The charge control switch and the discharge control switch each may be, for example, a semiconductor switch such as a field-effect transistor using a metal oxide semiconductor (MOSFET). It is to be noted that the charge current and the discharge current may be detected on the basis of on-resistance of the switch section 122.

The temperature detection section 124 may measure a temperature of the electric power source 111, and output a result of the measurement to the control section 121. The temperature detection section 124 may include, for example, a temperature detecting element such as a thermistor. It is to be noted that the result of the measurement by the temperature detection section 124 may be used, for example, in a case where the control section 121 performs charge and discharge control at the time of abnormal heat generation and in a case where the control section 121 performs a correction process at the time of calculating remaining capacity.

It is to be noted that the circuit board 116 may not include the PTC device 123. In this case, a PTC device may be separately attached to the circuit board 116.

Figure 15:
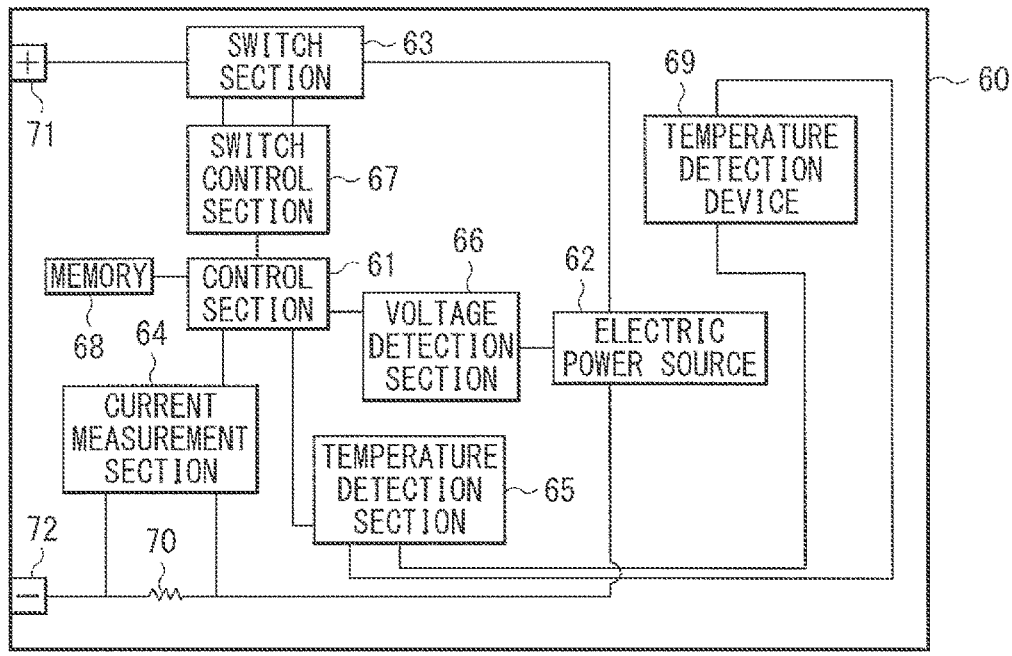
FIG. 15 is a block diagram illustrating a configuration of an application example (a battery pack: assembled battery) of the secondary battery according to an embodiment of the present disclosure.

FIG. 15 illustrates a block configuration of a battery pack using an assembled battery.

For example, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60. The housing 60 may include, for example, a plastic material.

The control section 61 may control an operation of the entire battery pack (including a used state of the electric power source 62). The control section 61 may include, for example, a CPU. The electric power source 62 may be, for example, an assembled battery that includes two or more secondary batteries. The secondary batteries may be connected in series, in parallel, or in series-parallel combination.

To give an example, the electric power source 62 may include six secondary batteries in which two sets of series-connected three batteries are connected in parallel to each other.

The switch section 63 may switch the used state of the electric power source 62, that is, presence or absence of connection of the electric power source 62 to an external device in accordance with an instruction from the control section 61. The switch section 63 may include, for example, a charge control switch, a discharge control switch, a charging diode, and a discharging diode. The charge control switch and the discharge control switch each may be, for example, a semiconductor switch such as a field-effect transistor that uses a metal oxide semiconductor (a MOSFET).

The current measurement section 64 may measure a current with use of the current detection resistance 70, and output a result of the measurement to the control section 61. The temperature detection section 65 may measure a temperature with use of the temperature detection device 69, and output a result of the measurement to the control section 61. The result of the temperature measurement may be used, for example, in a case where the control section 61 performs charge and discharge control at the time of abnormal heat generation and in a case where the control section 61 performs a correction process at the time of calculating remaining capacity. The voltage detection section 66 may measure a voltage of the electric power source 62 (the secondary batteries), and supply, to the control section 61, a result of the measurement of the voltage having subjected to analog-to-digital conversion.

The switch control section 67 may control an operation of the switch section 63 in accordance with signals inputted from the current measurement section 64 and the voltage detection section 66.

For example, in a case where a battery voltage reaches an overcharge detection voltage, the switch control section 67 may so cause the switch section 63 (the charge control switch) to be disconnected that a charge current does not flow into a current path of the electric power source 62. This makes it possible to perform only discharge through the discharging diode in the electric power source 62. It is to be noted that, for example, in a case where a large current flows during charge, the switch control section 67 may block the charge current.

Further, for example, in a case where the battery voltage reaches an overdischarge detection voltage, the switch control section 67 may so cause the switch section 63 (the discharge control switch) to be disconnected that a discharge current does not flow into the current path of the electric power source 62. This makes it possible to perform only charge through the charging diode in the electric power source 62. It is to be noted that, for example, in a case where a large current flows during discharge, the switch control section 67 may block the discharge current.

It is to be noted that the overcharge detection voltage is not particularly limited, but may be, for example, 4.2 V±0.05 V, and the overdischarge detection voltage is not particularly limited, but may be, for example, 2.4 V±0.1 V.

The memory 68 may include, for example, an EEPROM that is a non-volatile memory. The memory 68 may hold, for example, numerical values calculated by the control section 61 and information of the secondary battery measured in a manufacturing process (such as internal resistance in an initial state). It is to be noted that, in a case where the memory 68 holds full charge capacity of the secondary battery, the control section 61 is allowed to comprehend information such as remaining capacity.

The temperature detection device 69 may measure a temperature of the electric power source 62, and output a result of the measurement to the control section 61. The temperature detection device 69 may include, for example, a thermistor.

The cathode terminal 71 and the anode terminal 72 are terminals that may be coupled to, for example, an external device (such as a notebook personal computer) driven with use of the battery pack or an external device (such as a battery charger) used for charge of the battery pack. The electric power source 62 may be charged and discharged via the cathode terminal 71 and the anode terminal 72.

Figure 16:
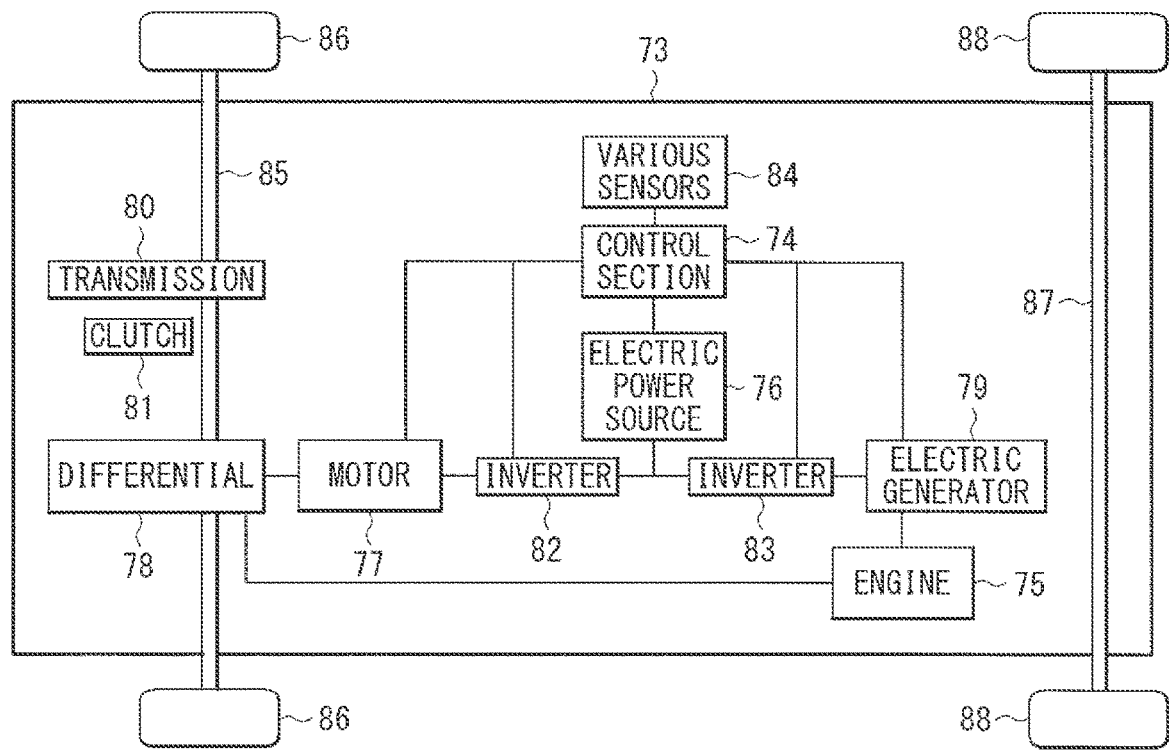
FIG. 16 is a block diagram illustrating a configuration of an application example (an electric vehicle) of the secondary battery according to an embodiment of the present disclosure.

FIG. 16 illustrates a block configuration of a hybrid automobile that is an example of an electric vehicle.

The electric vehicle may include, for example, a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are coupled to the differential 78 and the transmission 80, and a rear drive shaft 87, and a rear tire 88.

The electric vehicle may be runnable with use of one of the engine 75 and the motor 77 as a drive source, for example. The engine 75 is a main power source, and may be, for example, a petrol engine. In a case where the engine 75 is used as the power source, drive power (torque) of the engine 75 may be transferred to the front tire 86 or the rear tire 88 via the differential 78, the transmission 80, and the clutch 81 that are drive sections, for example. It is to be noted that the torque of the engine 75 may be also transferred to the electric generator 79. With use of the torque, the electric generator 79 may generate alternating-current electric power. The generated alternating-current electric power may be converted into direct-current electric power via the inverter 83, and the direct-current electric power is accumulated in the electric power source 76. In a case where the motor 77 that is a conversion section is used as the power source, electric power (direct-current electric power) supplied from the electric power source 76 is converted into alternating-current electric power via the inverter 82, and the motor 77 is driven with use of the alternating-current electric power. Drive power (torque) obtained by converting the electric power by the motor 77 may be transferred to the front tire 86 or the rear tire 8 via the differential 78, the transmission 80, and the clutch 81 that are the drive sections, for example.

It is to be noted that in a case where speed of the electric vehicle is reduced by a brake mechanism, resistance at the time of speed reduction may be transferred to the motor 77 as torque, and the motor 77 may generate alternating-current electric power by utilizing the torque. It may be preferable that this alternating-current electric power be converted into direct-current electric power via the inverter 82, and the direct-current regenerative electric power be accumulated in the electric power source 76.

The control section 74 may control an operation of the entire electric vehicle, and may include, for example, a CPU. The electric power source 76 includes one or more secondary batteries. The electric power source 76 may be coupled to an external electric power source. In this case, the electric power source 76 may be allowed to accumulate electric power by receiving electric power supply from the external power source. The various sensors 84 may be used, for example, for control of the number of revolutions of the engine 75 and for control of an opening level (a throttle opening level) of a throttle valve. The various sensors 84 may include, for example, a speed sensor, an acceleration sensor, and an engine frequency sensor.

It is to be noted that, although the description has been given with reference to an example in which the electric vehicle is the hybrid automobile, the electric vehicle may be a vehicle (an electric automobile) that operates with use of only the electric power source 76 and the motor 77 and without using the engine 75.

Figure 17:
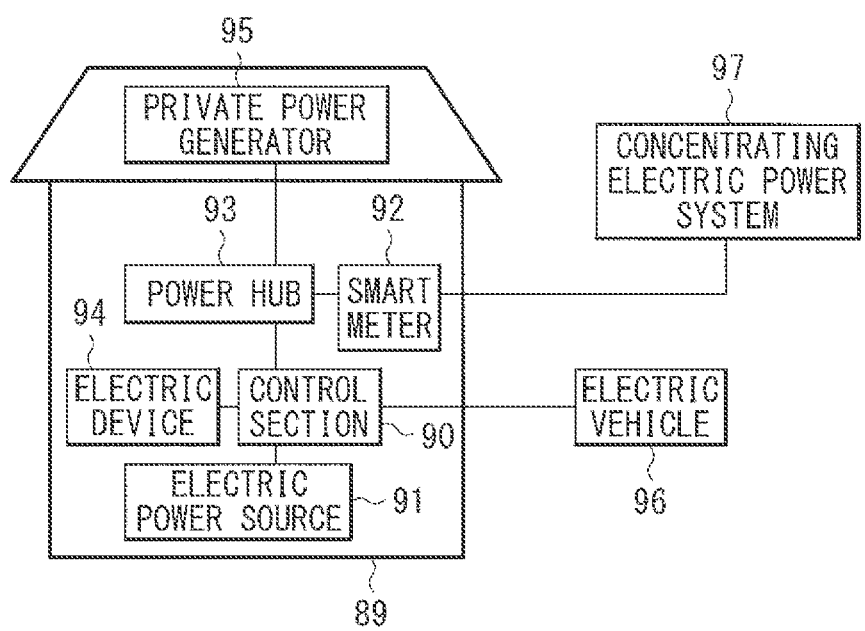
FIG. 17 is a block diagram illustrating a configuration of an application example (an electric power storage system) of the secondary battery according to an embodiment of the present disclosure.

FIG. 17 illustrates a block configuration of an electric power storage system.

The electric power storage system may include, for example, a control section 90, an electric power source 91, a smart meter 92, and a power hub 93 inside a house 89 such as a general residence or a commercial building.

In this example, the electric power source 91 may be coupled to an electric device 94 provided inside the house 89 and may be allowed to be coupled to an electric vehicle 96 parked outside the house 89, for example. Further, for example, the electric power source 91 may be connectable to a private power generator 95 provided in the house 89 via the power hub 93, and may be connectable to an outside concentrating electric power system 97 via the smart meter 92 and the power hub 93.

It is to be noted that the electric device 94 may include, for example, one or more home electric products. Non-limiting examples of the home electric products may include a refrigerator, an air conditioner, a television, and a water heater. The private power generator 95 may include, for example, one or more of a solar power generator, a wind power generator, and other power generators. The electric vehicle 96 may include, for example, one or more of an electric automobile, an electric motorcycle, a hybrid automobile, and other electric vehicles. The concentrating electric power system 97 may include, for example, one or more of a thermal power plant, an atomic power plant, a hydraulic power plant, a wind power plant, and other power plants.

The control section 90 may control an operation of the entire electric power storage system (including a used state of the electric power source 91), and may include, for example, a CPU. The electric power source 91 includes one or more secondary batteries. The smart meter 92 may be an electric power meter that is compatible with a network and is provided in the house 89 demanding electric power, and may be communicable with an electric power supplier, for example. Accordingly, for example, while the smart meter 92 communicates with outside, the smart meter 92 may control balance between supply and demand in the house 89, which allows for effective and stable energy supply.

In the electric power storage system, for example, electric power may be accumulated in the electric power source 91 from the concentrating electric power system 97, that is an external electric power source, via the smart meter 92 and the power hub 93, and electric power may be accumulated in the electric power source 91 from the private power generator 95, that is an independent electric power source, via the power hub 93. The electric power accumulated in the electric power source 91 may be supplied to the electric device 94 and the electric vehicle 96 in accordance with an instruction from the control section 90. This allows the electric device 94 to be operable, and allows the electric vehicle 96 to be chargeable. In other words, the electric power storage system is a system that makes it possible to accumulate and supply electric power in the house 89 with use of the electric power source 91.

The electric power accumulated in the electric power source 91 is allowed to be utilized optionally. Hence, for example, electric power may be accumulated in the electric power source 91 from the concentrating electric power system 97 in the middle of night when an electric rate is inexpensive, and the electric power accumulated in the electric power source 91 may be used during daytime hours when the electric rate is expensive.

It should be understood that the foregoing electric power storage system may be provided for each household (each family unit), or may be provided for a plurality of households (a plurality of family units).

Figure 18:
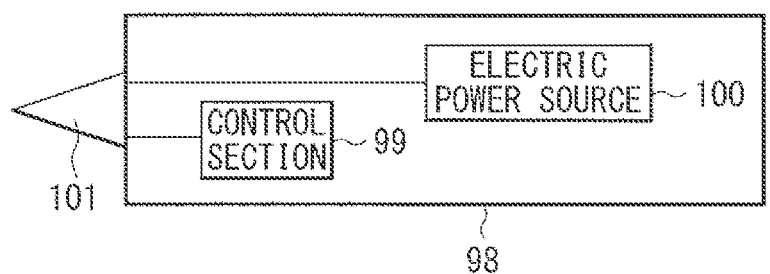
FIG. 18 is a block diagram illustrating a configuration of an application example (an electric power tool) of the secondary battery according to an embodiment of the present disclosure.

FIG. 18 illustrates a block configuration of an electric power tool.

The electric power tool described herein may be, for example, an electric drill. The electric power tool may include a control section 99 and an electric power source 100 inside a tool body 98, for example. A drill section 101 that is a movable section may be attached to the tool body 98 in an operable (rotatable) manner, for example.

The tool body 98 may include, for example, a plastic material. The control section 99 may control an operation of the entire electric power tool (including a used state of the electric power source 100), and may include, for example, a CPU. The electric power source 100 includes one or more secondary batteries. The control section 99 may allow electric power to be supplied from the electric power source 100 to the drill section 101 in accordance with an operation by an operation switch.

EXAMPLES

Function of malonate-based, diketone-based, ketoester-based or ester-based electrolyte additives and the synthesis procedure thereof are demonstrated by the following examples. Following cells were prepared and characterized in order to examine the influence of the additives on the battery characteristics.

Example 1: Malonate-Based Additives

Cell type:
  Anode active material: Si(Gr)-composite
  Cathode active material: $LiCoO_2$
  Electrolyte: 1 M $LiPF_6$ in EC/EMC (30/70 w)

Table 1 summarizes the influence of malonate-based additives on the initial Coulomb efficiency of Si/LCO-cells after the first charge/discharge cycle

TABLE 1

| | Initial coulomb efficiency: | | |
|---|---|---|---|
| Compound name of additive | Formula | Content of additive (% wt) | First cycle Coulomb efficiency, relative to first cycle Coulomb efficiency with blank electrolyte (with no additive) |
| Blank electrolyte (no additive) | n.a. | 0 | 1 |
| Dimethylfluoro-malonate | $H_3CO$-C(=O)-CF(H)-C(=O)-$OCH_3$ | 1 | 1.04 |
| Diethylfluoro-malonate | $C_2H_5O$-C(=O)-CF(H)-C(=O)-$OC_2H_5$ | 1 | 1.03 |
| Dimethyl-2-(2-cyanoethyl)-2-fluoromalonate | $H_3CO$-C(=O)-CF(CH$_2$CH$_2$CN)-C(=O)-$OCH_3$ | 1 | 1.02 |
| Bis[2,2,2-trifluoroethyl] 2-fluoromalonate | $F_3CH_2CO$-C(=O)-CF(H)-C(=O)-$OCH_2CF_3$ | 1 | 1.01 |
| Bis[4,4,4,3,3,-pentafluorobutyl] 2-fluoromalonate | $C_2F_5C_2H_4O$-C(=O)-CF(H)-C(=O)-$OC_2H_4C_2F_5$ | 1 | 1.01 |

Improvement of the first cycle Coulomb efficiency, relative to first cycle Coulomb efficiency with blank electrolyte, was observed in the presence of 1 wt % of the selected additives dimethylfluoromalonate, diethylfluoromalonate, dimethyl-2-(2-cyanoethyl)-2-fluoromalonate, bis[12, 2, 2-trifluoroethyl] 2-fluoromalonate and bis[4,4,4,3,3,-pentafluorobutyl] 2-fluoromalonate.

Example 2: Synthesis Procedure

Experimental procedure—Synthesis of dimethyl fluoromalonate (in accordance with A. Harsanyi, G. Sandford, "Fluorine gas for life science syntheses: green metrics to assess selective direct fluorination for the synthesis of 2-fluoromalonate esters", Green Chem., 2015, 17, 3000-3009.):

Dimethyl malonate (22.85 mL, 200 mmol) and copper nitrate hydrate ($Cu(NO_3)_2 \cdot 2.5H_2O$, 4.65 g, 20 mmol) were dissolved in acetonitrile (100 mL) and placed in a 250 mL fluorination vessel.

The reaction mixture was cooled to approx. 2° C., stirred at 650 rpm using an overhead stirrer and, after purging the system with N2 for 5 minutes, fluorine gas (20% v/v in N2, 80 mL min-1, 235 mmol) was introduced into the solution for 5 hours and 30 minutes.

The reactor was purged with N2 for 10 minutes, the solvent removed in vacuo, the residue portioned between water (50 mL) and ethyl acetate (50 mL) and the aqueous layer was extracted with ethyl acetate (50 mL).

The combined organic layers were washed with saturated $NaHCO_3$ (3×20 mL) and brine (3×20 mL) and then dried over $MgSO_4$. The solvent was removed in vacuo leaving crude product. The crude product was purified via vacuum distillation to give dimethyl 2-fluoromalonate (17.28 g, 58% yield, 99% purity) as clear, transparent oil.

Spectroscopic measurements gave the following peaks: 6H NMR ($CDCl_3$, 400 MHz): 5.32 (1H, d, $^2J$=48.1 Hz, CFH), 3.88 (6H, s, $CH_3$); $\delta_F$ ($CDCl_3$, 376 MHz): −195.21 (d, $^2J_{HF}$ 48.1, CHF); $\delta_C$ ($CDCl_3$, 101 MHz): 164.42 (d, $^3J_{CF}$ 24.1, C=O), 85.27 (d, $^2J_{CF}$ 197.3, CF), 53.54 ($CH_3$); m/z (GC-EI$^+$), 151 (9%, [M+H]$^+$), 119 (36%, [M-$CH_3O$]$^+$), 91 (51%, [M-$CO_2CH_3$]$^+$), 59 (100%, [M-$CHFCO_2CH_3$]$^+$.

In the following, description is given of examples of the disclosure.

Experimental Examples 1 to 11

The laminated film type secondary batteries as illustrated in FIGS. 11 and 12 were fabricated by the following procedure.

The cathode 33 was fabricated as follows. First, 91 parts by mass of a cathode active material (lithium cobalt oxide ($LiCoO_2$)), 3 parts by mass of a cathode binder (polyvinylidene fluoride), and 6 parts by mass of a cathode conductor (graphite) were mixed to obtain a cathode mixture. Subsequently, the cathode mixture was put into an organic solvent (N-methyl-2-pyrrolidone), and thereafter, the organic solvent was stirred to prepare paste cathode mixture slurry. Subsequently, both surfaces of the cathode current collector 33A (a strip-shaped aluminum foil having a thickness of 12 μm) were coated with the cathode mixture slurry with use of a coating apparatus, and thereafter, the cathode mixture slurry was dried to form the cathode active material layers 33B. Lastly, the cathode active material layers 33B were compression-molded with use of a roll pressing machine.

The anode 34 was fabricated as follows. First, 95 parts by mass of an anode active material (graphite having a median diameter D50 of 20 μm) and 5 parts by mass of an anode binder (polyvinylidene fluoride) were mixed to obtain an anode mixture. Subsequently, the anode mixture was put into an organic solvent (N-methyl-2-pyrrolidone), and thereafter, the organic solvent was stirred to obtain paste anode mixture slurry. Subsequently, both surfaces of the anode current collector 34A (a strip-shaped copper foil having a thickness of 15 μm) were coated with the anode mixture slurry with use of a coating apparatus, and thereafter, the anode mixture slurry was dried to form the anode active material layers 34B. Lastly, the anode active material layers 34B were compression-molded with use of a roll pressing machine.

An electrolytic solution was prepared as follows. An electrolyte salt (lithium hexafluorophosphate ($LiPF_6$)) was added to a solvent (ethylene carbonate and propylene carbonate), and the solvent was stirred. Thereafter, another solvent (vinylene carbonate (VC) that was unsaturated cyclic carbonate ester) and a cyano compound (each of the compounds represented by the formulas (1-3) to (1-5)) were further added to the solvent, and the solvent was stirred. In this case, a mixture ratio (weight ratio) of the solvent was ethylene carbonate:propylene carbonate=50:50, and a content of the electrolyte salt was 1 mol/kg with respect to the solvent. A content (wt %) of the unsaturated cyclic carbonate ester in the electrolytic solution and a content (wt %) of the cyano compound in the electrolytic solution are as illustrated in Table 1.

In this case, for comparison, an electrolytic solution was prepared by a similar procedure, except that the cyano compound was not used. Moreover, for comparison, an electrolytic solution was prepared by a similar procedure, except that another compound (each of the compounds represented by the formulas (14-1) and (14-2)) was used in place of the cyano compound. The kind of the other compound and the content of the other compound in the electrolytic solution are as illustrated in Table 1.

Herein, as the compound represented by the formula (14-1), a compound available from Astatech, Inc. was used. In contrast, a procedure of synthesizing the compounds represented by the formulas (1-3) to (1-5) and (14-2) are as follows.

The compound represented by the formula (1-3) was synthesized as follows. First, a solution in which 0.01 g of sodium methoxide was dissolved in 20 ml (=20 dm$^3$) of methanol was prepared, and thereafter, 0.3 g of dimethyl fluoromalonate was added to the solution. Subsequently, 0.52 g of acrylonitrile was added to the solution, and thereafter, the solution (at a temperature of 60° C.) was stirred (for a stirring time of 1 hour). Next, a solvent was removed from the solution in a vacuum atmosphere to obtain a residue. Subsequently, 30 ml of water was added to the residue three times to disperse the residue. Next, the residue was extracted with use of 30 ml of ethyl acetate three times, and thereafter, the residue was washed with use of 30 ml of salt water three times. Subsequently, the residue was dried with use of magnesium sulfate ($MgSO_4$), and thereafter, the dried residue was concentrated in a vacuum atmosphere to obtain a yellow oily component. Next, the oily component was distilled with use of a kugelrohr to obtain a compound A (dimethyl 2-(2-cyanoethyl)-2-fluoromalonate) (a synthesization amount of 0.24 g and 59% yield). Subsequently, 5 g of the compound A, 2.09 g of lithium chloride, and 0.58 g of water was added to 100 ml of dimethylsulfoxide to obtain a reaction mixture. Next, the reaction mixture was heated to a temperature of 110° C., and thereafter, the reaction mixture was kept at the temperature (for a keeping time of 1.5 hours). Subsequently, 300 ml of water was added to the reaction mixture, and thereafter, extraction was performed with use of 50 ml of diethyl ether six times to sort an organic layer. Next, the organic layer was washed with use of 30 ml of water three times, and thereafter, the organic layer was washed with use of 30 ml of salt water three times. Subsequently, the organic layer was dried with use of magnesium sulfate, and thereafter, the solvent was removed from the organic layer in a vacuum atmosphere to obtain a crude product. Lastly, the crude product was distilled with use of a kugelrohr (at 110° C. and 15 mbar) to obtain the compound represented by the formula (1-3) (a synthesization amount of 1.64 g and 46% yield).

Analysis of the compound represented by the formula (1-3) synthesized by the procedure described above with use of a nuclear magnetic resonance (NMR) apparatus gave the following result (NMR spectrum).

$\delta$H (CDCl3, 400 MHz) 5.04 (1H, ddd, $2J_{HF}$=48.3 Hz, 3JHH=7.9 Hz, 3JHH=4.0 Hz, CFH), 3.84 (3H, s, $CH_3$), 2.64-2.49 (2H, m, $CFHCH_2$), 2.42-2.18 (2H, m, $CH_2CN$); $\delta$F (CDCl3, 376 MHz) −194.70 (ddd, 2JHF=48.4 Hz, 3JHF=26.1 Hz, 3JHF=20.5 Hz); $\delta$C (CDCl3, 101 MHz) 168.66 (d, 2JCF=23.3 Hz, C=O), 118.02 (s, CN), 86.56 (d, 1JCF=187.0 Hz, CF), 52.79 (s, $CH_3$), 28.32 (d, 2JCF=21.3 Hz, CHF—$CH_2$), 12.74 (d, 3JCF=4.7 Hz, $CH_2CN$)

Moreover, a result (GCEI+) of analysis of the compound represented by the formula (1-3) with use of a gas chromatograph mass spectrometer (GCMS) was m/z=146.1 (1%, [M+H]+), 114.1 (5%, [M-$OCH_3$]+), 86.1 (21%, [M-$O_2CH_3$]+).

In a case where the compound represented by the formula (1-4) was synthesized, a procedure similar to that in the case where the compound represented by the formula (1-3) was synthesized was performed (33% yield), except that bromobutyronitrile was used in place of acrylonitrile, and 3 g of a compound B (dimethyl 2-(3-cyanopropyl)-2-fluoromalonate) was obtained in place of 5 g of the compound A (dimethyl 2-(2-cyanoethyl)-2-fluoromalonate).

In a case where the compound represented by the formula (1-5) was synthesized, a procedure similar to that in the case where the compound represented by the formula (1-3) was synthesized was performed (33% yield), except that bromopentylonitrile was used in place of acrylonitrile, and 3 g of a compound C (dimethyl 2-(3-cyanobutyl)-2-fluoromalonate) was obtained in place of 5 g of (dimethyl 2-(2-cyanoethyl)-2-fluoromalonate).

The compound represented by the formula (14-2) was synthesized as follows. First, a solution in which 22.85 ml of dimethyl malonate and 4.65 g of copper (II) nitrate hydrate was dissolved in 100 ml of acetonitrile was put into a 250 ml fluorination vessel to obtain a reaction mixture. Subsequently, the reaction mixture was cooled to a temperature of about 2° C., and thereafter, the reaction mixture was stirred (a rotation speed of 650 rpm) with use of an overhead stirrer. Next, purging from the fluorination vessel was performed with use of nitrogen gas (for 5 minutes), and thereafter, fluorine gas (20 vol % in nitrogen, 235 mmol) was introduced into the fluorination vessel (at a flow velocity of 80 ml/min for an introduction time of 5.5 hours). Subsequently, the solvent was removed from the reaction mixture in a vacuum atmosphere to obtain residue. Next, the residue was separated and extracted with use of 50 ml of water and 50 ml of ethyl acetate, and thereafter, an aqueous layer was extracted with use of 50 ml of ethyl acetate. Subsequently, an organic layer was washed with use of 20 ml of a saturated sodium hydrogen carbonate ($NaHCO_3$) water solution three times, and thereafter, the organic layer was washed with use of 20 ml of salt water three times. Next, the organic layer was dried with use of magnesium sulfate, and thereafter, the solvent was removed from the organic layer in a vacuum atmosphere to obtain a crude product. Lastly, the crude product was distilled with use of a kugelrohr (at 110° C. and 15 mbar) to obtain the compound represented by the formula (14-2) (a synthesization amount of 17.28 g and 58% yield).

Analysis of the compound represented by the formula (14-2) synthesized by the procedure described above with use of a nuclear magnetic resonance (NMR) apparatus gave the following result (NMR spectrum).

$\delta$H (CDCl3, 400 MHz) 5.32 (1H, d, $2J_{HF}$ 48.1 Hz, CFH), 3.88 (6H, s, $CH_3$) $\delta$F (CDCl3, 376 MHz) −195.21 (d, $2J_{HF}$ 48.1, CHF); $\delta$C (CDCl3, 101 MHz) 164.42 (d, 3JCF 24.1, C=O), 85.27 (d, 2JCF 197.3, CF), 53.54 ($CH_3$)

Moreover, a result (GCEI+) of analysis of the compound represented by the formula (14-2) with use of a gas chromatograph mass spectrometer (GCMS) was m/z=151 (9%, [M+H]+), 119 (36%, [M-$CH_3O$]+), 91 (51%, [M-$CO_2CH_3$]$^+$), 59 (100%, [M-$CHFCO_2CH_3$]+).

The secondary battery was assembled as follows. First, the cathode lead 31 made of aluminum was attached to the cathode current collector 33A by welding, and the anode lead 32 made of copper was attached to the anode current collector 34A by welding. Subsequently, the cathode 33 and the anode 34 were laminated with the separator 35 (a microporous polyethylene film having a thickness of 15 μm) in between to obtain a laminated body. Next, the laminated body was spirally wound in a longitudinal direction, and the protective tape 37 was attached onto the outermost periphery of the spirally wound laminated body to fabricate a spirally wound body. Lastly, the outer package member 40 (outside: a nylon film having a thickness of 25 μm/an aluminum foil having a thickness of 40 μm/a polypropylene film having a thickness of 30 μm: inside) was folded to interpose the spirally wound body, and thereafter, the outer edges on three sides of the outer package member 40 were thermally fusion-bonded to form a pouch. In this case, the close-attachment film 41 was inserted between the cathode lead 31 and the outer package member 40, and the close-attachment film 41 was inserted between the anode lead 32 and the outer package member 40. Lastly, the electrolytic solution was injected inside the pouch formed of the outer package member 40 to impregnate the spirally wound body with the electrolytic solution, and thereafter, outer edges on the remaining one side of the outer package member 40 were thermally fusion-bonded in a reduced-pressure environment.

Thus, the spirally wound electrode body 30 was formed, and the spirally wound electrode body 30 was sealed inside the outer package member 40 to complete the laminated film type secondary battery. In a case where the secondary battery was fabricated, the amount of the cathode active material and the amount of the anode active material were adjusted to cause a voltage (so-called battery voltage) at a fully charged state to be 4.45 V.

Swollenness characteristics after storage and electrical resistance characteristics after storage were examined to evaluate battery characteristics of the secondary batteries, and results illustrated in Table 1 were thereby obtained.

The swollenness characteristics were examined as follows. First, each of the secondary batteries were charged and discharged in an ordinary temperature environment (at a temperature of 23° C.) to stabilize the state of each of the secondary batteries. Subsequently, each of the secondary batteries was charged in the same environment, and thereafter, a thickness (a thickness before storage) of each of the secondary batteries was measured. Next, each of the secondary batteries in a charged state was stored for 200 h in a high temperature environment (at a temperature of 60° C.), and thereafter, the thickness (thickness after storage) of each of the secondary batteries was measured. Subsequently, a swollenness rate (%) after storage=[(the thickness after storage−the thickness before storage)/the thickness before storage]×100 was calculated. Lastly, the swollenness rate after storage was evaluated. In this case, a case where the swollenness rate after storage is equal to or smaller than 30% is "A", a case where the swollenness rate after storage is greater than 30% and equal to or smaller than 35% is "B", a case where the swollenness rate after storage is greater than 35% and equal to or smaller than 40% is "C", and a case where swollenness rate after storage is greater than 40% is "D".

It should be understood that when each of the secondary batteries was charged, each of the secondary batteries was charged at a current density of 1 mA/cm$^2$ and a constant current until the voltage reached 4.45 V, and thereafter, each of the secondary batteries was charged at a constant voltage of 4.45 V until the current density reached 0.02 mA/cm$^2$. When each of the secondary batteries was discharged, each of the secondary batteries was discharged at a current density of 1 mA/cm$^2$ until the voltage reached 3 V.

The electrical resistance characteristics after storage were examined as follows. First, the state of each of the secondary batteries was stabilized by the procedure described above. Subsequently, one cycle of charge and discharge was performed on each of the secondary batteries in an ordinary temperature environment (at a temperature of 23° C.), and thereafter, electrical resistance (electrical resistance before storage) of each of the secondary batteries was measured. Next, each of the secondary batteries were stored in a high temperature environment (at a temperature of 60° C.), and thereafter, electrical resistance (electrical resistance after storage) of each of the secondary batteries was measured. Subsequently, an electrical resistance ratio after storage=the electrical resistance after storage/electrical resistance before storage was calculated. It is to be noted that charge and discharge conditions were similar to the charge and discharge conditions in a case where the swollenness characteristics after storage were examined.

Table 1 shows, together with values of the swollenness rates after storage, determination results based on the values of the swollenness rates after storage. Moreover, a value of the electrical resistance ratio after storage was normalized with a value of the electrical resistance ratio after storage in an experimental example 9 taken as 1.00.

TABLE 1

| Experimental Example | Cyano Compound Other Compound Kind | Content (wt %) | Unsaturated Cyclic Carbonate Ester Kind | Content (wt %) | Swollenness Characteristics After Storage Determination Result | Swollenness Rate After Storage (%) | Electrical Resistance Characteristics After Storage Electrical Resistance Ratio After Storage (Normalized) |
|---|---|---|---|---|---|---|---|
| 1 | Formula (1-3) | 0.1 | VC | 1 | B | 35 | 0.99 |
| 2 |  | 0.5 |  | 1 | A | 30 | 0.99 |
| 3 |  | 1 |  | 1 | A | 29 | 0.99 |
| 4 |  | 3 |  | 1 | A | 26 | 1.07 |
| 5 |  | 5 |  | 1 | A | 22 | 1.50 |
| 6 | Formula (1-4) | 1 |  | 1 | A | 20 | 0.95 |
| 7 |  | 1 |  | 0 | A | 20 | 1.00 |
| 8 | Formula (1-5) | 1 |  | 1 | A | 12 | 0.94 |
| 9 | — | — | VC | 1 | D | 105 | 1.00 |
| 10 | Formula (14-1) | 1 |  | 1 | C | 38 | 1.08 |
| 11 | Formula (14-2) | 1 |  | 1 | D | 101 | 1.10 |

As can be seen from Table 1, the battery characteristics were largely varied depending on the kind of an additive included in the electrolytic solution. In the following, an evaluation result (the swollenness rate after storage) and the electrical resistance ratio after storage of the experimental example 9 in which the electrolytic solution included neither the cyano compound nor the other compound are regarded as comparison criteria.

More specifically, in a case where the electrolytic solution included the other compound (experimental examples 10 and 11), the swollenness rate after storage was slightly improved in some cases, and the electrical resistance ratio after storage was increased.

In contrast, in a case where the electrolytic solution included the cyano compound (experimental examples 1 to 8), independent of the kind of the cyano compound, the swollenness rate after storage was largely improved, while suppressing an excessive increase in the electrical resistance ratio after storage.

In this case, in a case where the content of the cyano compound in the electrolytic solution was from 0.1 wt % to 5 wt % both inclusive, the swollenness rate after storage was sufficiently improved. In particular, in a case where the content was from 0.5 wt % to 5 wt % both inclusive, the swollenness rate after storage was further improved. Alternatively, in a case where the content was from 0.1 wt % to 3 wt % both inclusive, the electrical resistance ratio after storage was further decreased while maintaining a favorable swollenness rate after storage, and in a case where the content was from 0.1 wt % to 1 wt % both inclusive, the electrical resistance ratio after storage was still further decreased while maintaining a favorable swollenness rate after storage. Accordingly, in a case where the content was from 0.5 wt % to 3 wt % both inclusive, the electrical resistance ratio after storage was further decreased while largely improving the swollenness rate after storage, and in a case where the content was from 0.5 wt % to 1 wt % both inclusive, the electrical resistance ratio after storage was still further decreased while largely improving the swollenness rate after storage.

Moreover, in the case where the electrolytic solution included the unsaturated cyclic carbonate ester together with the cyano compound, the electrical resistance ratio after storage was further decreased while maintaining the swollenness rate after storage.

As can be seen from the results in Table 1, in a case where the electrolytic solution included the cyano compound, the swollenness characteristics after storage and the electrical resistance characteristics after storage were both improved. Accordingly, superior battery characteristics were achieved in the secondary battery.

Although the disclosure has been described above with reference to some embodiments and examples, the disclosure is not limited thereto, and may be modified in a variety of ways.

More specifically, description has been given with reference to the cylindrical type secondary battery and the laminated film type secondary battery; however, the secondary battery is not limited thereto, and may be, for example, any other secondary battery such as a square type secondary battery and a coin type secondary battery.

Moreover, description has been given with reference to an example in which the battery element has the spirally wound structure. However, the structure of the battery element is not limited thereto. For example, the battery element may have any other structure such as a laminated structure.

Further, description has been given with reference to the lithium-ion secondary battery and the lithium metal secondary battery; however, the secondary battery is not limited thereto. The secondary battery may be, for example, a secondary battery in which capacity of an anode active material capable of inserting and extracting lithium is set smaller than capacity of a cathode to obtain capacity of an anode by the sum of capacity derived from a lithium insertion phenomenon and a lithium extraction phenomenon and capacity derived from a lithium precipitation phenomenon and a lithium dissolution phenomenon.

Furthermore, description has been given with reference to the secondary battery using lithium as the electrode reactant; however, the electrode reactant is not limited to lithium. The electrode reactant may be, for example, any of other Group 1 elements such as sodium and potassium in the long form of the periodic table of the elements, Group 2 elements such as magnesium and calcium in the long form of the periodic table of the elements, and other light-metals such as aluminum.

It should be understood that the effects described in the present specification are illustrative and non-limiting. The disclosure may have effects other than those described in the present specification.

In addition, the present technology can also take the following constituent features.

(1)

A non-aqueous electrolyte for secondary batteries including:
a polar aprotic solvent;
an alkali metal salt; and
at least one additive in which the additive is at least one compound selected from compounds with general formula I

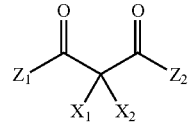

in which $Z_1$, $Z_2$ is alkyl (—$C_nH_{2n+1}$), cycloalkyl, alkenyl ($C_nH_{2n}$), aryl (—Ar), heteroaryl; halogenated alkyl ((—$C_nX_{2n+1}$) or (—$CH_2$—$C_nX_{2n+1}$)), halogenated cycloalkyl ((—$C_nX_{2n}$) or (—$CH_2$—$C_nX_{2n}$)), halogenated alkenyl ($C_nX_n$), halogenated aryl (—Ar—X), halogenated heteroaryl with halogen X being F, Cl, Br or I; alkoxy, aryloxy, heteroaryloxy, halogenated aryloxy; —CN-substituted-alkyl, -cycloalkyl, -aryl, -heteroaryl; —$NO_2$-substituted-alkyl, -cycloalkyl, -aryl, -heteroaryl; halogen (—F, —Cl, —Br, —I) or nitrile (—CN);

in which X1, X2 is H; halogen X (X being F, Cl, Br, I); halogenated alkyl, -alkenyl, -aryl, -heteroaryl; —CN-substituted-alkyl, -alkenyl, -aryl, -heteroaryl; —$NO_2$-substituted-alkyl, -alkenyl, -aryl or -heteroaryl;

but in which $X_1$ and $X_2$ are not hydrogen H concurrently;

in which $Z_1$ and $Z_2$ can be equal or different; and in which $X_1$ and $X_2$ can be equal or different.

(2)

The non-aqueous electrolyte for secondary batteries according to (1), in which the at least one additive is at least one compound selected from compounds with general formula I-I

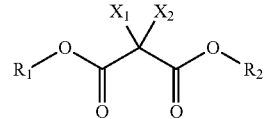

in which $R_1$, $R_2$ is alkyl (—$C_nH_{2n+1}$), cycloalkyl, alkenyl ($C_nH_{2n}$), aryl (—Ar), heteroaryl; halogenated alkyl ((—$C_nX_{2n+1}$) or (—$CH_2$—$C_nX_{2n+1}$)), halogenated cycloalkyl ((—$C_nX_{2n}$) or (—$CH_2$—$C_nX_{2n}$)), halogenated alkenyl ($C_nX_n$), halogenated aryl (—Ar—X) or halogenated heteroaryl with halogen X being F, Cl, Br or I; and in which $R_1$ and $R_2$ do not form a cyclic compound together; and in which $X_1$, $X_2$ is H; halogen X (X being F, Cl, Br or I); halogenated alkyl, -alkenyl, -aryl, -heteroaryl; —CN-substituted-alkyl, -alkenyl, -aryl, -heteroaryl; —$NO_2$-substituted-alkyl, -alkenyl, -aryl or -heteroaryl;

in which $X_1$ and $X_2$ are not hydrogen H concurrently;

in which R1, R2 can be equal or different; and in which $X_1$, $X_2$ can be equal or different.

(3)

The non-aqueous electrolyte for secondary batteries according to (1), in which the at least one additive is at least one compound selected from compounds with general formula I-II

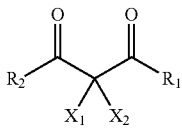

in which $R_1$, $R_2$ is alkyl ($-C_nH_{2n+1}$), cycloalkyl, alkenyl ($C_nH_{2n}$), aryl ($-Ar$), heteroaryl; halogenated alkyl (($-C_nX_{2n+1}$) or ($-CH_2-C_nX_{2n+1}$)), halogenated cycloalkyl (($-C_nX_{2n}$) or ($-CH_2-C_nX_{2n}$)), halogenated alkenyl ($C_nX_n$), halogenated aryl ($-Ar-X$), halogenated heteroaryl with halogen X being F, Cl, Br or I; $-CN$-substituted-alkyl, -cycloalkyl, -aryl, -heteroaryl; $-NO_2$-substituted-alkyl, -cycloalkyl, -aryl, -heteroaryl; halogen ($-F$, $-Cl$, $-Br$, $-I$) or nitrile ($-CN$); and in which $X_1$, $X_2$ is H; halogen X (X being F, Cl, Br or I); halogenated alkyl, -alkenyl, -aryl, -heteroaryl; $-CN$-substituted-alkyl, -alkenyl, -aryl, -heteroaryl; $-NO_2$-substituted-alkyl, -alkenyl, -aryl or -heteroaryl;

in which $R_1$, $R_2$ can be equal or different; and in which $X_1$, $X_2$ can be equal or different.

(4)

The non-aqueous electrolyte for secondary batteries according to (1), in which the at least one additive is at least one compound selected from compounds with general formula I-III

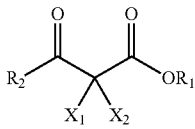

in which $R_1$ is alkyl ($-C_nH_{2n+1}$), cycloalkyl, alkenyl ($C_nH_{2n}$), aryl ($-Ar$), heteroaryl; halogenated alkyl (($-C_nX_{2n+1}$) or ($-CH_2-C_nX_{2n+1}$)), halogenated cycloalkyl (($-C_nX_{2n}$) or ($-CH_2-C_nX_{2n}$)), halogenated alkenyl ($C_nX_n$), halogenated aryl ($-Ar-X$), halogenated heteroaryl with halogen X being F, Cl, Br or I;

in which $R_2$ is alkyl ($-C_nH_{2n+1}$), cycloalkyl, alkenyl ($C_nH_{2n}$), aryl ($-Ar$), heteroaryl; halogenated alkyl (($-C_nX_{2n+1}$) or ($-CH_2-C_nX_{2n+1}$)), halogenated cycloalkyl (($-C_nX_{2n}$) or ($-CH_2-C_nX_{2n}$)), halogenated alkenyl ($C_nX_n$), halogenated aryl ($-Ar-X$), halogenated heteroaryl with halogen X being F, Cl, Br or I; $-CN$-substituted-alkyl, -cycloalkyl, -aryl, -heteroaryl; $-NO_2$-substituted-alkyl, -cycloalkyl, -aryl, -heteroaryl; halogen ($-F$, $-Cl$, $-Br$, $-I$) or nitrile ($-CN$); and in which $X_1$, $X_2$ is H; halogen X (X being F, Cl, Br or I); halogenated alkyl, -alkenyl, -aryl, -heteroaryl; $-CN$-substituted-alkyl, -alkenyl, -aryl, -heteroaryl; $-NO_2$-substituted-alkyl, -alkenyl, -aryl or -heteroaryl;

in which $R_1$, $R_2$ can be equal or different; and in which $X_1$, $X_2$ can be equal or different.

(5)

A non-aqueous electrolyte for secondary batteries including:

a polar aprotic solvent;

an alkali metal salt; and at least one additive in which the additive is at least one compound selected from compounds with general formula I-IV

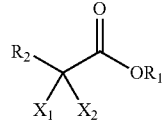

in which $R_1$ is alkyl ($-C_nH_{2n+1}$), cycloalkyl, alkenyl ($C_nH_{2n}$), aryl ($-Ar$), heteroaryl; halogenated cycloalkyl (($-C_nX_{2n}$) or ($-CH_2-C_nX_{2n}$)), halogenated alkenyl ($C_nX_n$), halogenated aryl ($-Ar-X$), halogenated heteroaryl with halogen X being F, Cl, Br or I; halogen ($-F$, $-Cl$, $-Br$, $-I$) or nitrile ($-CN$);

in which $R_2$ is alkyl ($-C_nH_{2n+1}$), cycloalkyl, alkenyl ($C_nH_{2n}$), aryl ($-Ar$), heteroaryl; halogenated cycloalkyl (($-C_nX_{2n}$) or ($-CH_2-C_nX_{2n}$)), halogenated alkenyl ($C_nX_n$), halogenated aryl ($-Ar-X$), halogenated heteroaryl with halogen X being F, Cl, Br or I; alkoxy, aryloxy, heteroaryloxy, halogenated aryloxy; $-CN$-substituted-alkyl, -cycloalkyl, -aryl, -heteroaryl; $-NO_2$-substituted-alkyl, -cycloalkyl, -aryl, -heteroaryl; halogen ($-F$, $-Cl$, $-Br$, $-I$) or nitrile ($-CN$);

but in which $R_1$, $R_2$ is each not a halogenated alkyl;

in which $X_1$, $X_2$ is H; halogen X (X being F, Cl, Br or I); halogenated alkyl, -alkenyl, -aryl, -heteroaryl; $-CN$-substituted-alkyl, -alkenyl, -aryl, -heteroaryl; $-NO_2$-substituted-alkyl, -alkenyl, -aryl or -heteroaryl;

but in which $X_1$ and $X_2$ are not hydrogen H concurrently;

in which $R_1$, $R_2$ can be equal or different; and in which $X_1$, $X_2$ can be equal or different.

(6)

The non-aqueous electrolyte for secondary batteries according to any one of the preceding claims, in which the amount of the at least one additive in the non-aqueous electrolyte is between 0.001 and 10 wt %, preferably between 0.01 and 5 wt %, more preferably between 0.1 and 3 wt %.

(7)

The non-aqueous electrolyte for secondary batteries according to any one of the preceding claims, in which the amount of the at least one additive in the non-aqueous electrolyte is between 0.01 and 2 wt %, preferably between 0.01 and 1.8 wt %, more preferably between 0.1 and 1.6 wt %.

(8)

The non-aqueous electrolyte for secondary batteries according to any one of the preceding claims, in which the at least one additive in the non-aqueous electrolyte is a mixture of compounds selected from compounds with general formulas I-I, I-II, or I-III.

(9)

The non-aqueous electrolyte for secondary batteries according to any one of the preceding claims, including at least one further additive or compound, such as, but not limited to, vinylene carbonate, fluoroethylene carbonate, trifluoromethylethylene carbonate, succinonitrile.

(10)

The non-aqueous electrolyte for secondary batteries according to any one of the preceding claims, which is a liquid or polymer-gel electrolyte.

(11)
The non-aqueous electrolyte for secondary batteries according to any one of the preceding claims, in which the polar aprotic solvent is particularly selected from cyclic ester carbonate(s), chain ester carbonate(s), lactone(s), chain carboxylic ester(s), and further polar aprotic solvents.

(12)
The non-aqueous electrolyte for secondary batteries according to any one of the preceding claims, in which the alkali metal salt is one or more Li salts.

(13)
A secondary battery including:
a cathode,
an anode, and
an non-aqueous electrolyte according to any one of (1) to (12),
in which the secondary battery is particularly a secondary Li-ion battery.

(14)
The secondary battery according to (13),
in which the cathode is an intercalation type cathode including one or more kinds of active cathode material which is capable of reversible inserting and extracting Li ions,
particularly including layered, spinel or olivine structure type transition metal oxide(s), such as, but not limited to, metal(s) selected from Co, Ni, Mn, V, Fe and combinations thereof;
and/or in which the anode is an intercalation type anode including one or more kinds of active anode material which is capable of reversible inserting and entrancing Li ions,
such as, but not limited to, graphitizable carbon, non-graphitizable carbon, graphite, Li-metal, Si, Si oxide, Si alloy, Sn, Sn oxide, $LiTi_2O_5$, Sn alloy.

(15)
An electric device including a secondary battery according to (13) or (14), in which the electric device is a battery pack, an electric vehicle, an electric power storage system, an electric power tool or an electronic apparatus.

(16)
Use of the non-aqueous electrolyte according to any one (1) to (12), in an electrochemical device,
such as, but not limited to, a secondary battery, a super capacitor, an electric device,
such as, but not limited to, a battery pack, an electric vehicle, an electric power storage system, an electric power tool, an electronic apparatus.

(17)
A secondary battery, including:
a cathode;
an anode; and
an electrolytic solution including a cyano compound represented by the following formula (1)

[Chem. 18]

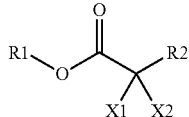

(1)

where R1 is one of a monovalent hydrocarbon group and a monovalent halogenated hydrocarbon group, R2 is one of a cyano group, a monovalent chain hydrocarbon cyano group, and a monovalent halogenated chain hydrocarbon cyano group, $X_1$ is a halogen group, $X_2$ is one of a hydrogen group, a halogen group, a monovalent hydrocarbon group, and a monovalent halogenated hydrocarbon group.

(18)
The secondary battery according to (17), in which in the R2, the monovalent chain hydrocarbon cyano group is a group in which one or more cyano groups are introduced into an alkyl group.

(19)
The secondary battery according to (18), in which the monovalent chain hydrocarbon cyano group is a group in which one cyano group is introduced into an end of the alkyl group.

(20)
The secondary battery according to (19), in which number of carbons in the alkyl group is 3 or more.

(21)
The secondary battery according to any one of (17) to (20), in which
in the R1 and the X2, the monovalent hydrocarbon group is one of an alkyl group, an alkenyl group, an alkynyl group, a cycloalkyl group, an aryl group, and a monovalent group in which two or more of these groups are bound to one another, and
in the X1 and the X2, the halogen group is one of a fluorine group, a chlorine group, a bromine group, and a iodine group.

(22)
The secondary battery according to any one of (17) to (21), in which
the R1 is an alkyl group,
the R2 is a group in which one cyano group is introduced into an end of an alkyl group,
the X1 is a fluorine group, and
the X2 is a hydrogen group.

(23)
The secondary battery according to any one of (17) to (22), in which a content of the cyano compound in the electrolytic solution is within a range from 0.1 wt % to 5 wt % both inclusive.

(24)
The secondary battery according to any one of (17) to (23), in which the secondary battery is a lithium-ion secondary battery.

(25)
A secondary battery-use electrolytic solution, including a cyano compound represented by the following formula (1),

[Chem. 19]

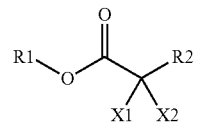

(1)

where R1 is one of a monovalent hydrocarbon group and a monovalent halogenated hydrocarbon group, R2 is one of a cyano group, a monovalent chain hydrocarbon cyano group, and a monovalent halogenated chain hydrocarbon cyano group, $X_1$ is a halogen group, $X_2$ is one of a hydrogen group, a halogen group, a monovalent hydrocarbon group, and a monovalent halogenated hydrocarbon group.

(26)
A battery pack, including:
the secondary battery according to any one of (17) to (24);
a control section that controls an operation of the secondary battery; and
a switch section that switches the operation of the secondary battery in accordance with an instruction from the control section.

(27)
An electric vehicle, including:
the secondary battery according to any one of (17) to (24);
a conversion section that converts electric power supplied from the secondary battery into drive power;
a drive section that operates in accordance with the drive power; and
a control section that controls an operation of the secondary battery.

(28)
An electric power storage system, including:
the secondary battery according to any one of (17) to (24);
one or more electric devices that are supplied with electric power from the secondary battery; and
a control section that controls the supplying of the electric power from the secondary battery to the one or more electric devices.

(29)
An electric power tool, including:
the secondary battery according to any one of (17) to (24); and
a movable section that is supplied with electric power from the secondary battery.

(30)
An electronic apparatus including the secondary battery according to any one of (17) to (24) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A secondary battery, comprising:
a cathode;
an anode; and
an electrolytic solution including a cyano compound represented by chemical formula (1) and an unsaturated cyclic carbonate ester represented by chemical formula (2),

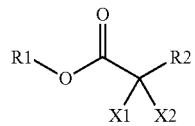

(1)

wherein R1 represents one of a monovalent hydrocarbon group and a monovalent halogenated hydrocarbon group, R2 represents a monovalent chain hydrocarbon cyano group in which the monovalent chain hydrocarbon cyano group comprises a group having one cyano group that is introduced into an end of a straight-chain alkyl group having a number of carbons of two to four both inclusive, X1 represents a halogen group, and X2 represents one of a hydrogen group, a halogen group, a monovalent hydrocarbon group, and a monovalent halogenated hydrocarbon group, and

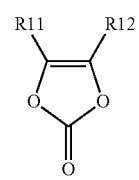

(2)

wherein each of R11 and R12 is one of a hydrogen group and an alkyl group.

2. The secondary battery according to claim 1, wherein the monovalent hydrocarbon group for the R1 and the monovalent hydrocarbon group for the X2 each include one of an alkyl group, an alkenyl group, an alkynyl group, a cycloalkyl group, an aryl group, and wherein the halogen group for the X1 and the halogen group for the X2 each include one of a fluorine group, a chlorine group, a bromine group, and a iodine group.

3. The secondary battery according to claim 1, wherein X1 is fluorine, and wherein X2 is hydrogen.

4. The secondary battery according to claim 3, wherein the straight-chain alkyl group includes 3 or 4 carbons.

5. The secondary battery according to claim 3, wherein an amount of the cyano compound in the electrolytic solution is from 0.1 wt % to 5 wt %.

6. The secondary battery according to claim 5, wherein the amount of the cyano compound in the electrolytic solution is from 0.5 wt % to 3 wt %.

7. The secondary battery according to claim 6, wherein the amount of the cyano compound in the electrolytic solution is from 0.5 wt % to 1 wt %.

8. The secondary battery according to claim 1, wherein the electrolytic solution including a non-aqueous solvent is a non-aqueous electrolytic solution, and
a content of the unsaturated cyclic carbonate ester in the non-aqueous solvent is from 0.01 wt % to 10 wt %.

* * * * *